(12) United States Patent
Di Girolamo et al.

(10) Patent No.: US 11,445,435 B2
(45) Date of Patent: Sep. 13, 2022

(54) MANAGING NETWORK ENROLLMENT AND REDIRECTION FOR INTERNET-OF-THINGS AND LIKE DEVICES

(71) Applicant: IPLA HOLDINGS, INC., New York, NY (US)

(72) Inventors: Rocco Di Girolamo, Laval (CA); Michael F. Starsinic, Newtown, PA (US); Catalina Mihaela Mladin, Hatboro, PA (US); Hongkun Li, Malvern, PA (US); Dale N. Seed, Allentown, PA (US)

(73) Assignee: IPLA HOLDINGS, INC., New York, NY (US)

( * ) Notice: Subject to any disclaimer, the term of this patent is extended or adjusted under 35 U.S.C. 154(b) by 0 days.

(21) Appl. No.: 16/957,582

(22) PCT Filed: Jan. 2, 2019

(86) PCT No.: PCT/US2019/012022
§ 371 (c)(1),
(2) Date: Jun. 24, 2020

(87) PCT Pub. No.: WO2019/136044
PCT Pub. Date: Jul. 11, 2019

(65) Prior Publication Data
US 2020/0322884 A1    Oct. 8, 2020

Related U.S. Application Data

(60) Provisional application No. 62/612,854, filed on Jan. 2, 2018.

(51) Int. Cl.
*H04W 48/18*    (2009.01)
*H04W 4/70*    (2018.01)
(Continued)

(52) U.S. Cl.
CPC .......... *H04W 48/18* (2013.01); *H04W 4/50* (2018.02); *H04W 4/70* (2018.02); *H04W 8/20* (2013.01); *H04W 12/06* (2013.01); *H04W 12/37* (2021.01)

(58) Field of Classification Search
CPC ........ H04W 48/18; H04W 4/50; H04W 4/70; H04W 8/20; H04W 12/06; H04W 12/37
(Continued)

(56) References Cited

U.S. PATENT DOCUMENTS

2005/0272449 A1*  12/2005  Gallagher ............. H04W 36/14
                                                                     455/458
2006/0209675 A1    9/2006  Jacobson
(Continued)

OTHER PUBLICATIONS

3GPP, Technical Specification Group Services and System Aspects, Service requirements for the 5G system, Stage 1, (Release 16), Sep. 2017.
(Continued)

*Primary Examiner* — Joel Ajayi
(74) *Attorney, Agent, or Firm* — Chip Law Group

(57) ABSTRACT

The network registrations of Internet-of-Things and like devices may be managed through the exchange of subscriber identity module and public land mobile network information. An exposure function may receive information regarding a device that needs cellular on-boarding, and pass the information to an operator subscription manager, and monitor a registration attempt of the device. The exposure function may process a request to allow transfer of ownership of a device, and such a request may include an expiration time, and an action to be taken upon expiry. The exposure function may also dis-enroll (off-board) devices. A central Equipment Identity Register (EIR) may store information relating to the home networks of devices, along with eSIM operating profiles of the device. An operator subscription manager
(Continued)

may retrieve device information from a manufacturer server, create an eSIM operating profile, assign an IMSI, and exchange such information with entities such as user equipment and EIR.

2 Claims, 39 Drawing Sheets

(51) Int. Cl.
 *H04W 4/50* (2018.01)
 *H04W 8/20* (2009.01)
 *H04W 12/06* (2021.01)
 *H04W 12/37* (2021.01)

(58) Field of Classification Search
 USPC .................................................. 455/435.1
 See application file for complete search history.

(56) References Cited

U.S. PATENT DOCUMENTS

2010/0265893 A1* 10/2010 Dwyer .................... H04W 8/06
 370/329
2013/0053044 A1* 2/2013 Davies ................ H04W 72/048
 455/438
2015/0359026 A1 12/2015 Iwai et al.
2016/0100451 A1 4/2016 Wass et al.
2018/0049108 A1* 2/2018 Yang .................... H04L 47/2475
2019/0182654 A1* 6/2019 Jerichow ............... H04W 8/183

OTHER PUBLICATIONS

3rd Generation Partnership Project; Telecommunication management; Subscription Management (SuM) requirements, 3GPP TS 32.140, V14.0.0.
3rd Generation Partnership Project; Vocabulary for 3GPP Specification, 3GPP TS 21.905 V14.1.1.
Iam Smith: "Embedded SIM Remote Provisioning Architecture", Jan. 30, 2014, XP055507564.
OneM2M TS-0001, OneM2M Functional Architecture Baseline Draft, Aug. 2014, 297 pages.
Remote Provisioning Architecture for embedded UICC Technical Specification v3.1, May 27, 2016.
Smart Cards; Embedded UICC; Requirements Specification Release 12), TS 103 383-V12.0.0, (Feb. 2013), 4 pages.

* cited by examiner

MANAGING NETWORK ENROLLMENT AND REDIRECTION FOR INTERNET-OF-THINGS AND LIKE DEVICES

CROSS-REFERENCE TO RELATED APPLICATIONS

This application is the National Stage Application of International Patent Application No. PCT/US2019/012022 filed Jan. 2, 2019, which claims the benefit of U.S. Provisional Application No. 62/612,854 filed Jan. 2, 2018, the contents of which are hereby incorporated by reference in their entirety.

BACKGROUND

Machine-To-Machine (M2M), Internet-of-Things (IoT), and Web-of-Things (WoT) network deployments may include nodes such as M2M/IoT/WoT servers, gateways, and devices which host M2M/IoT/WoT applications and services. Such network deployments may include, for example, constrained networks, wireless sensor networks, wireless mesh networks, mobile ad-hoc networks, and wireless sensor and actuator networks. Operations of devices in such networks may accord with such standards as: the oneM2M-TS-0001 oneM2M Functional Architecture; 3GPP TS 21.905 Vocabulary for 3GPP Specifications, V 14.1.1; Remote Provisioning Architecture for Embedded UICC Technical Specification v3.1, May 27, 2016; Embedded SIM Remote Provisioning Architecture, Version 1.1, Dec. 17, 2013; 3GPP TS 22.261 Service Requirements for the 5G System; ETSI TS 103 383 V12.0.0 (2013-02) Smart Cards; Embedded UICC; Requirements Specification; (Release 12); and 3GPP TS 32.140 Telecommunication management; Subscription Management (SuM) requirements, V 14.0.0.

SUMMARY

An exposure function in a cellular network, such as a Network Exposure Function (NEF) or Services Capabilities Exposure Function, may receive information from an entity such as an M2M/IoT server or service capability layer, where the information regards one or more devices that need to complete cellular on-boarding. The exposure function may then provide such information to an operator subscription manager. The information may include, for example, device capability and allowed network slices.

The exposure function may receive a request to monitor a registration attempt of a device, such as a user equipment, that is using an eSIM provisioning profile. The exposure function may then send an indication to a remote SIM provisioning system when the device registers.

The exposure function may receive a request to allow a transfer of ownership of a device. Such a request may include an expiration time, and an action to be taken upon expiry.

The exposure function may receive a request to dis-enroll (off-board) one or more devices, and accordingly add such devices to a list of blacklisted devices.

A central Equipment Identity Register (EIR) may store information relating to the home network of various devices. When a cellular network creates an eSIM operating profile for a device, the network may provide the home network information for a device to the EIR. When a cellular network needs to know the home network of a device, it may query the EIR.

An operator subscription manager may retrieve device information from a manufacturer server. This information may include a device identification such as a PEI/IMEI or EID, an authentication key, a device radio capability, and a device network capability. The operator subscription manager may then create the eSIM operating profile and pushes the profile to the network entities/functions. The operator subscription manager may assign IMSI by reusing the MSIN and authentication key of the eSIM provisioning profile, and by swapping out the PLMN-ID. The operator subscription manager may store the device's home network information (PLMN-ID) in the central EIR/5G-EIR A device, such as a UE, may register using an eSIM provisioning profile, and thereafter be moved to the home network through a registration reject message that includes a Public Land Mobile Network (PLMN) identification of the home network of the device, or through an inter-PLMN handover.

An operator subscription manager of a first cellular network may request an operator subscription profile, including the eSIM operating profile for a device from a second cellular network. The operator subscription manager may thereby obtain a profile containing device radio and network capability, UE location, and UE policies that are used by the UE to comply with network operator's rules, such as streaming policies, for example. The operator subscription manager may then generate new operator subscription profiles, including a new eSIM operating profiles, for the first cellular network based on information received from second cellular network, and send the new eSIM operating profiles to the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1:
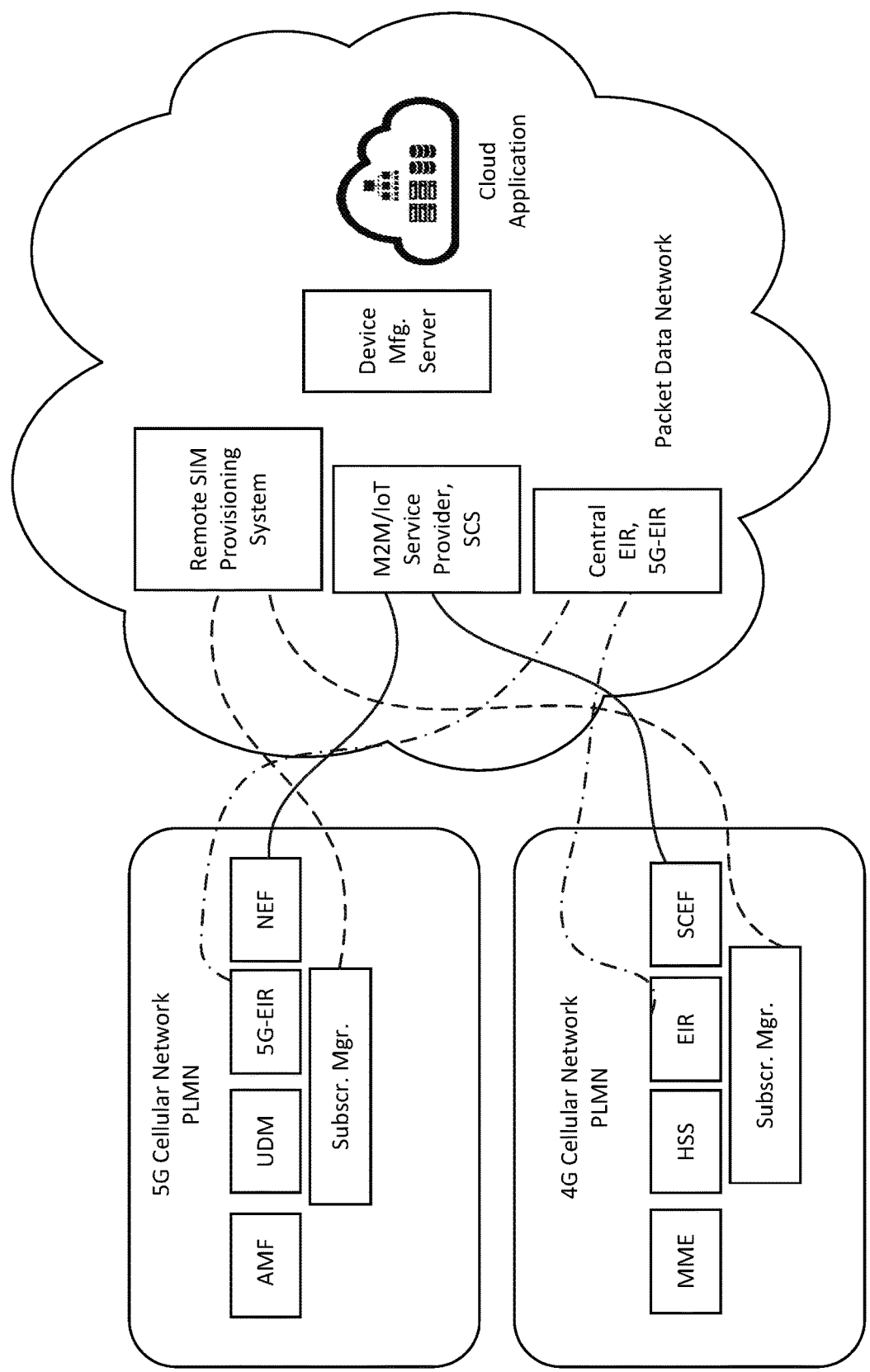
FIG. 1 illustrates an example of relevant cellular entities.

Devices, systems, and methods are described herein to address dynamic connection of IoT and similar devices to networks such as cellular networks, as well as transferring connectivity between networks, such as through the management of subscriber identity and subscription information.

Cellular systems rely heavily on the notion of subscriptions to tie/link a device to a cellular network. However, an important part of the subscription information is based on data stored in the SIM cards of these devices. Although removable SIM cards are the norm for smartphones, they present several drawbacks for M2M/IoT devices. In particular, related to physical security, size of cards, and difficulty in modifying/changing. Embedded SIMs (or eSIMs) with an underlying remote SIM provisioning architecture are much better suited for M2M/IoT devices.

Traditional cellular networks, which are tailored to consumer devices, will have some difficulty managing large deployments of M2M/IoT devices with eSIMs. In particular the notion of subscription management has to be addressed. Cellular networks today are not able to efficiently create subscriptions (also known as eSIM operating profiles in this document) for a group of M2M/IoT devices. They are also not able to efficiently manage a change in ownership of a group of M2M/IoT devices.

To address these and other issues, the network registrations of Internet-of-Things and like devices may be managed through the exchange of subscriber identity module and public land mobile network information, for example.

TABLE 1

| | Abbreviations |
|---|---|
| AMF | Access and Mobility Management function |
| AuC | Authentication Center |
| DNN | Data Network Name |
| EID | eUICC-ID |

TABLE 1-continued

| | Abbreviations |
|---|---|
| EIR | Equipment Identity Register |
| eMBB | Enhanced Mobile Broadband |
| eSIM | Embedded Subscriber Identify Module |
| eUICC | Embedded Universal Integrated Circuit Card |
| GSMA | Groupe Spéciale Mobile Association |
| HPLMN | Home PLMN |
| HSS | Home Subscriber Server |
| ICCID | Integrated Circuit Card Identifier |
| IMEI | International Mobile Equipment Identity |
| IMSI | International Mobile Subscriber Identity |
| IoT | Internet of Things |
| M2M | Machine-to-Machine |
| MME | Mobility Management Entity |
| MNO | Mobile Network Operator |
| MSIN | Mobile Subscription Identification Number |
| MSISDN | Mobile Station International Subscriber Directory Number |
| NB-IoT | Narrowband-IoT |
| NFC | Near-field communication |
| OCF | Open Connectivity Foundation |
| OEM | Original Equipment Manufacturer |
| OS | Operating System |
| PEI | Permanent Equipment Identifier |
| PLMN | Public Land Mobile Network |
| QR | Quick Response |
| SCS | Service Capability Server |
| SCEF | Service Capability Exposure Function |
| SIM | Subscriber Identify Module |
| SM | Subscription Manager |
| SM-SD | Subscription Manager - Data Preparation |
| SM-SR | Subscription Manager - Secure Routing |
| SMS | Short Message Service |
| SUPI | Subscriber Permanent Identity |
| TAC | Type Allocation Code |
| UE | User Equipment |
| UICC | Universal Integrated Circuit Card |
| VPLMN | Visited PLMN |

Herein, the term "cellular network" generally refers to a wireless network that is providing service. A cellular provider, such as AT&T, may have multiple cellular networks. Cellular networks may be targeted to certain devices, such as NB-IoT. Cellular networks are associated with an operational frequency band for uplink and downlink transmission. The cellular network may have one or more core network slices.

Herein, the term "cellular on-boarding" generally refers to a method where a new device with a default provisioning profile is powered on and eventually registers to the cellular network associated with a subscriber's subscription.

Herein, the term "cellular provider" generally refers to an entity providing cellular services. A cellular provider may have multiple cellular networks (even within the same geographical area). Typical examples include Bell Mobility and Verizon Wireless.

Herein, the term "device" generally refers to an entity with wireless connectivity that can publish IoT data and/or receive IoT commands.

Herein, the term "eSIM operating profile" generally refers to a profile that allows connectivity to a cellular network and which is based on a subscriber's subscription. The eSIM Operating Profile contains one or more Network Access Applications and associated Network Access Credentials (e.g., K and IMSI) and MNO's application identities and 3rd party application identities. The profile contains a combination of a file structure, data and applications to be provisioned onto, or present on, an eUICC. The eSIM operating profile has an un-personalized part that contains operator information that would be common across all eSIM profiles using the operator network (things like SMS service center). The eSIM operating profile also has a personalized part that includes information that is unique to the profile (for example the assigned IMSI and authentication key).

Herein, the term "eSIM provisioning profile" generally refers to a Profile containing one or more Network Access Application Identities, and associated Network Access Credentials which, when installed on an eUICC, enables a limited access to a communication network. This limited access allows the eUICC to download the eSIM Operating Profile that is related to the subscription tied to the device.

Herein, the term "M2M/IoT service provider" generally refers to an entity providing value added services to M2M/IoT devices and applications. Typically, these service providers rely on standardized service layers such as those defined by oneM2M or OCF.

Herein, the term "M2M/IoT application provider" generally refers to an entity that provides targeted functionality based on the IoT data, such as fleet management, smart home management, etc. These application providers rely on the services of the M2M/IoT service provider and the cellular provider to communicate with the IoT devices in order to access the IoT data.

Herein, the term "operator subscription manager" generally refers to an entity in the cellular core network that communicates to the remote SIM provisioning system to request generation of eSIM operating profiles and pushes the eSIM operator profile information to relevant nodes within the cellular core network (for example the HSS/UDM). It is typically part of the Network Management System/Operations Support System of the cellular network.

Herein, the term "operator subscription profile" generally refers to information stored in Cellular Network (in HSS or UDM) including subscription information related to an IoT device. This information is also referred to as the cellular operating profile. This includes the cellular network permanent identifier (SUPI or IMSI), the Permanent Equipment Identifier (PEI or IMEI), the profile identifier (ICCID), the authentication key (Ki), as well as cellular network preferences, IoT device (or UE) radio access capability (e.g., RATs supported, frequency bands supported) and IoT device (or UE) network capability (e.g., cellular IoT capability).

Herein, the term "Public Land Mobile Network (PLMN)" generally refers to a cellular network that provides connectivity to capable devices, and that is uniquely identified by an ID (e.g., PLMN ID). A cellular operator may have many PLMNs.

Herein, the term "subscriber" generally refers to an entity associated with one or more users or devices that is engaged in a subscription with a service provider. The subscriber is allowed to subscribe and unsubscribe services, to register a user or a list of users authorized to enjoy these services, and also to set the limits relative to the use that associated users make of these services.

Herein, the term "subscription" generally refers to a commercial relationship between a subscriber and a service provider.

Herein, the term "user" generally refers to an entity, not part of the 3GPP System, which uses 3GPP System services. For example, a person using a 3GPP System mobile station as a portable telephone is a user.

Herein, the term "UICC information" generally refers to information stored on a UICC, allowing the device to access a cellular network (e.g., PLMN).

Herein, the term "M2M/IoT service provider" generally refers to an entity that provides value added services to the IoT devices and has a privileged relationship with the cellular networks. M2M/IoT service providers may communicate through the network exposure functions (such as the SCEF or NEF). Alternatively an M2M/IoT service provider may be an Application Function (AF) as defined in 3GPP that interfaces to the core network. This interface is used today to establish the quality of service and potentially some charging aspects for a service, but it may be extended to provide assistance to the core network.

Herein, terms "eSIM" and "eUICC" are generally used interchangeably. In practice, the eSIM is the software running on the eUICC.

Herein, the term "cellular provider" generally refers to a single Public Land Mobile Network (PLMN). Some operators may have multiple PLMNs, for example, where there is PLMN one for NB-IoT and another PLMN one for enhanced multimedia broadband.

1.1 Cellular Network Entities (Network Functions)

FIG. 1 shows a number of important cellular network entities and cellular network functions, as well as some entities within the packet data network, that are relevant to PLMN redirection for IoT devices. These entities are briefly described below. Note that some of these are based on definitions included in 3GPP TS 21.905 Vocabulary for 3GPP Specifications, V 14.1.1.

The EIR is an entity within the cellular network which is used to check the status of devices. It is used mainly to hold a list of blacklisted devices. These are devices that may have been reported stolen and are to be prevented from accessing the cellular network. Devices are identified through the IMEI.

The 5G-EIR is a network function within a 5G cellular network that supports checking the status of devices. It is used namely to hold a list of blacklisted devices. These are devices that may have been reported stolen and are to be prevented from accessing the cellular network. Devices are identified through the Permanent Equipment Identifier (PEI). IMEI may be a type of PEI. 5G-EIR is similar in functionality to an EIR.

The central EIR/5G-EIR is a central database where EIRs and 5G-EIRs share the device status. It is assumed that this entity has an interface to both EIRs and 5G-EIRs.

The remote SIM provisioning system is trusted by the cellular networks. It generates the eSIM Operating Profiles to be used by the UE and the cellular network. Based on guidance from the cellular network, the remote SIM provisioning system generates the authentication keys, the IMSI/SUPI, and other cellular network related information that is to be provided to both the device (stored as an eSIM Operating Profile) and the cellular network (stored as part of the Operator Subscription Profile in the HSS/UDM). The remote SIM provisioning system is actually made up of a number of sub-entities.

The operator subscription manager: Entity or function in a cellular network that issues guidance to the remote SIM provisioning system, generates the operator subscription profile from the eSIM operating profile and local preferences, and pushes this operator subscription profile information to the relevant entities/network functions within the cellular network (for example HSS/UDM or MME/AMF). It is typically part of the Network Management System/Operations Support System of the cellular network.

The M2M/IoT service provider is an entity that provides value added services to the M2M/IoT devices and M2M/IoT cloud applications. This entity may follow a service layer standard such as oneM2M or OCF. This is also called a Service Capability Server (SCS) in this document.

The cloud application is a network application that communicates with the M2M/IoT devices and provides a targeted functionality. For example, this may be a fleet management application that manages the fleet of a parcel delivery company.

The Mobility Management Entity (MME) is an entity within the cellular network that manages registration, mobility, and UE reachability in IDLE mode. It is also involved with authentication and authorization.

The Access and Mobility Management Function (AMF) is a network function within a 5G cellular network that handles registration, connection, mobility, and reachability management. It also is involved with security: access authentication, access authorization, and deriving the access network specific keys. Similar in functionality to a MME.

The Home Subscriber Server (HSS) is an entity within the cellular network that stores operator subscription information for the connecting devices. The operator subscription information includes the subscriber identity (in the form of an IMSI) and security keys used for authentication, encryption, and data integrity. The HSS may also include other parameters associated with the subscription including the services that can be accessed, the quality of service they will get, the access technologies they can use, the charging model, etc. In the following document, we use the term HSS to include functionality of the Authentication Center (AuC). However, such functionality may be in a separate entity.

The Unified Data Management (UDM) is a network function within a 5G cellular network that stores operator subscription information for the connecting device. The UDM is similar in functionality to an HSS. In some cases, the operator subscription information may be stored in a Unified Data Repository (UDR), in which case the UDM would be a form of front end that retrieves the subscription data from the UDR.

The device manufacturer server is an entity which provides an interface to the M2M/IoT device manufacturer that allows the M2M/IoT service provider to query the manufacturer to get M2M/IoT device radio and network capability.

Service Capability Exposure Function (SCEF) is an entity within the cellular network that exposes the services and capabilities provided by 3GPP network interfaces. It allows for 3rd party applications to determine UE reachability, set up monitoring of network events, permit group message delivery, etc.

The Network Exposure Function (NEF) is a network function that exposes services and capabilities provided by a 3GPP network. It also provides a means for 3rd party applications to provide information to the cellular network (for example mobility or communication patterns). Similar in functionality to a SCEF.

Figure 2:
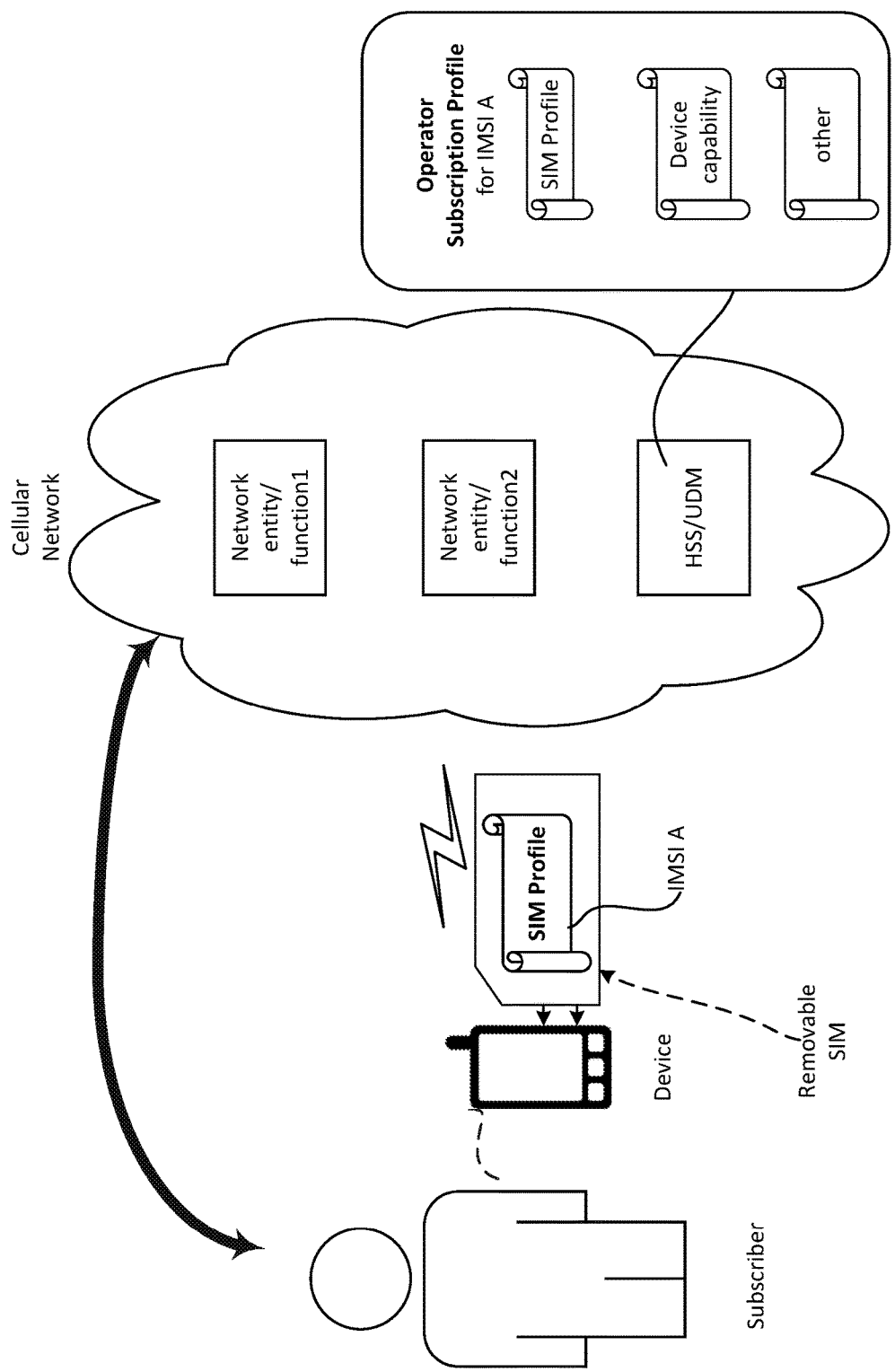
FIG. 2 illustrates an example of a subscriber SIM profile used with removable SIMs.

FIG. 2, shows an example of a subscriber with his cellular device, using the services of a cellular operator. The user has a device with a removable SIM on which a SIM profile is stored. The operator has a subscription profile corresponding to the SIM profile.

Today, a subscriber typically negotiates a subscription with a mobile operator in a face-to-face, or over the phone, transaction. This subscription allows the subscriber to access a set of services that are provided by the mobile network. However, to enable this service, the subscriber needs to have a SIM card in each of his devices. Most operators have a set of removable SIM cards that have been personalized while in production based on inputs from the operator. The SIM cards contain a SIM profile which includes (among other things): an IMSI (International Mobile Subscriber Identity) in accordance to the carrier/telecom company that ordered the batch; a 128-bit key called Ki (Key Identification); a MSISDN associated with the SIM card; an ICCID, which is a unique serial number of the card.

Once a subscriber signs a contract with an operator, he is provided a SIM card which he can then insert in his mobile device. The mobile device has its own device identification (IMEI) which is different from the IMSI assigned in the SIM card; it identifies the device, independent of the subscriber and independent of the SIM card. Security and authentication is provided entirely through the SIM card. As a result, after a device registers to a cellular network, the operator might have information related to the SIM card but not have information pertaining to the device hosting the SIM card. In particular, the cellular network is not aware of the device capability. As this latter information is necessary to optimize communication between the device and the cellular network, it is typically obtained through dedicated signaling between the device and the network (after the SIM card has successfully registered). The SIM profile information and device capability (as well as some other information which is not described here), are collectively referred to as Operator Subscription Profile in the remainder of this document. The cellular network maintains an Operator Subscription Profile for each device having a SIM. The Operator Subscription Profile is stored in the HSS/UDM, but copies of relevant information may also be stored in other cellular network entities/function. In the remainder of this document, we use the term "cellular on-boarding" to denote the above process. Cellular on-boarding allows a device to connect to the cellular network to which it is subscribed.

This cellular on-boarding process has served the smartphone space very well, and has allowed subscribers to swap SIM cards to: change from one operator to another; upgrade their smartphones; and use their smartphones while roaming outside their HPLMNs (by purchasing pre-paid SIM cards).

Figure 3:
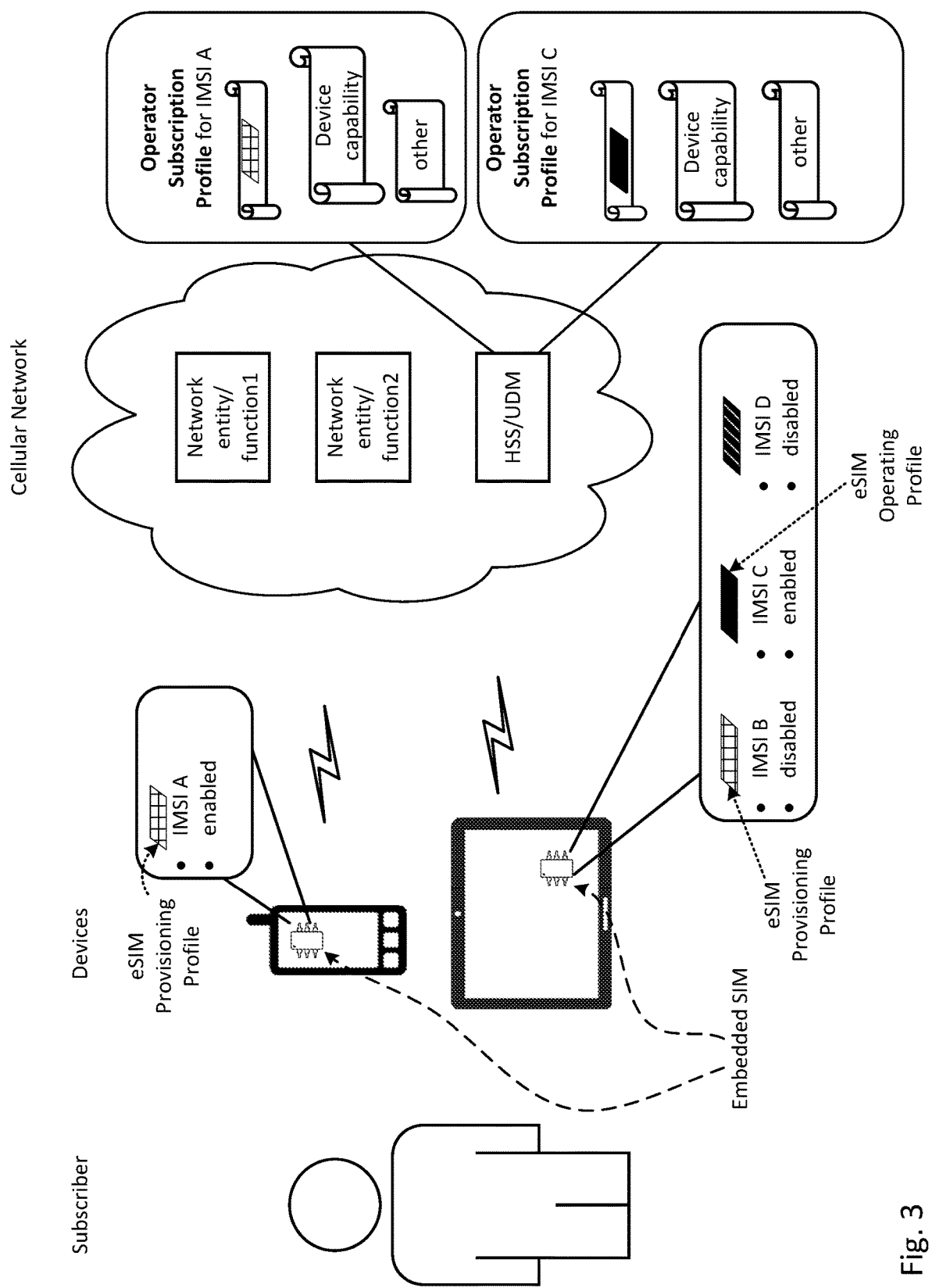
FIG. 3 illustrates an example of subscriber eSIM operating profiles.

However the SIM industry is slowly beginning to move towards embedded SIMs (eSIMs). FIG. 3, shows an example of a subscriber with multiple cellular devices equipped with embedded SIMs. The eSIMs have a number of unique characteristics—some of which are shown in FIG. 3. The eSIMs are physically embedded within their host devices (cannot be removed). This results in an added level of security as the devices cannot be easily hacked. The eSIMs are almost 10 times smaller than Nano SIMs. This allows smart devices with eSIMs in them to be made comparatively smaller and lighter—an important issue for the IoT market. The eSIMs can host multiple SIM profiles. These are referred to as eSIM Operating Profiles in the remainder of this document. An eSIM can only have one eSIM operating profile enabled at one time. The other eSIM operating profiles are disabled. The eSIMs come pre-loaded with an eSIM provisioning profile. This is a default SIM profile that provides basic cellular connectivity to the eSIM after the hosting device is first powered on. The eSIMs can change eSIM operating profile using over-the-air signaling, effectively being re-programmed. This allows a 3rd party to add an eSIM operating profile to an eSIM, delete stored eSIM operating profiles, to enable/disable an operating profile, etc. This is done through a remote SIM provisioning architecture that is briefly described in a subsequent section.

The eSIMs have a number of advantages for the IoT market. First, as the eSIM is physically embedded in the IoT device, it is naturally tamper resistant. In addition, as the IoT devices will have a very long lifetime (typically on the order of 10 years) and may be deployed in places where physical access is very difficult (e.g., on lamp posts in a city) the ability to change eSIM operating profiles allows a certain amount of flexibility, and makes the devices future-proof.

However, even in the smartphone market, it is foreseen that eSIMs will offer a number of potential advantages. Changing operators or numbers will be simplified, with no need to physically swap the SIM cards. There will be more user flexibility in selecting providers: As a device may have eSIM operating profiles from multiple operators, a user may dynamically select the operator to best suit his/her needs. At time T1 user wants to use services of AT&T while at time T2, user wants to use services of Sprint. Roaming will be simplified, since local operators could send the user an SMS to load the eSIM operating profile Herein the terms SIM and eSIM are often used to denote the removable SIM card and the eSIM integrated circuit, respectively. This usage of the terms to refer to the hardware, rather than the codes therein, is used extensively in the literature. It will be understood that these terms represent the physical removable Universal Integrated Circuit Card (UICC) and embedded UICC. The (e)UICC is in fact an integrated circuit chip that hosts a small computer, with an operating system and memory. The latter used to store an OS, dedicated applications, your phone book, your settings, etc. The SIM and eSIM are examples of dedicated applications that can be stored on the (e)UICC.

SIMs may be provisioned remotely. Use of eSIMs in consumer cellular devices (smartphones, tablets), wearables (FitBit), and IoT devices, will likely become the norm in the future. However, this will only be possible if an architecture is in place to securely transfer the eSIM operating profile to the devices and to the mobile network operators. These operating profiles contain the IMSI/SUPI and the authentication key tied to the profile—and form the basis with which the cellular network does authentication and generates all the encryption and integrity protection keys used for communication. Cellular networks today go through great lengths to guarantee that the IMSI/SUPI and the authentication key are known only to the network entities or network functions that need this information. In particular, the authentication key is only stored in the Authentication Center (AuC) and not transmitted to other network nodes.

The GSMA has developed such an architecture and defined a "de-facto standard mechanism for the remote provisioning and management of machine to machine (M2M) connections, allowing the "over the air" provisioning of an initial operator subscription, and the subsequent change of subscription from one operator to another." See, Remote Provisioning Architecture for Embedded UICC Technical Specification v3.1, May 27, 2016. The GSMA Embedded SIM Specification has the support of a number of operators and OEMs.

Figure 4:
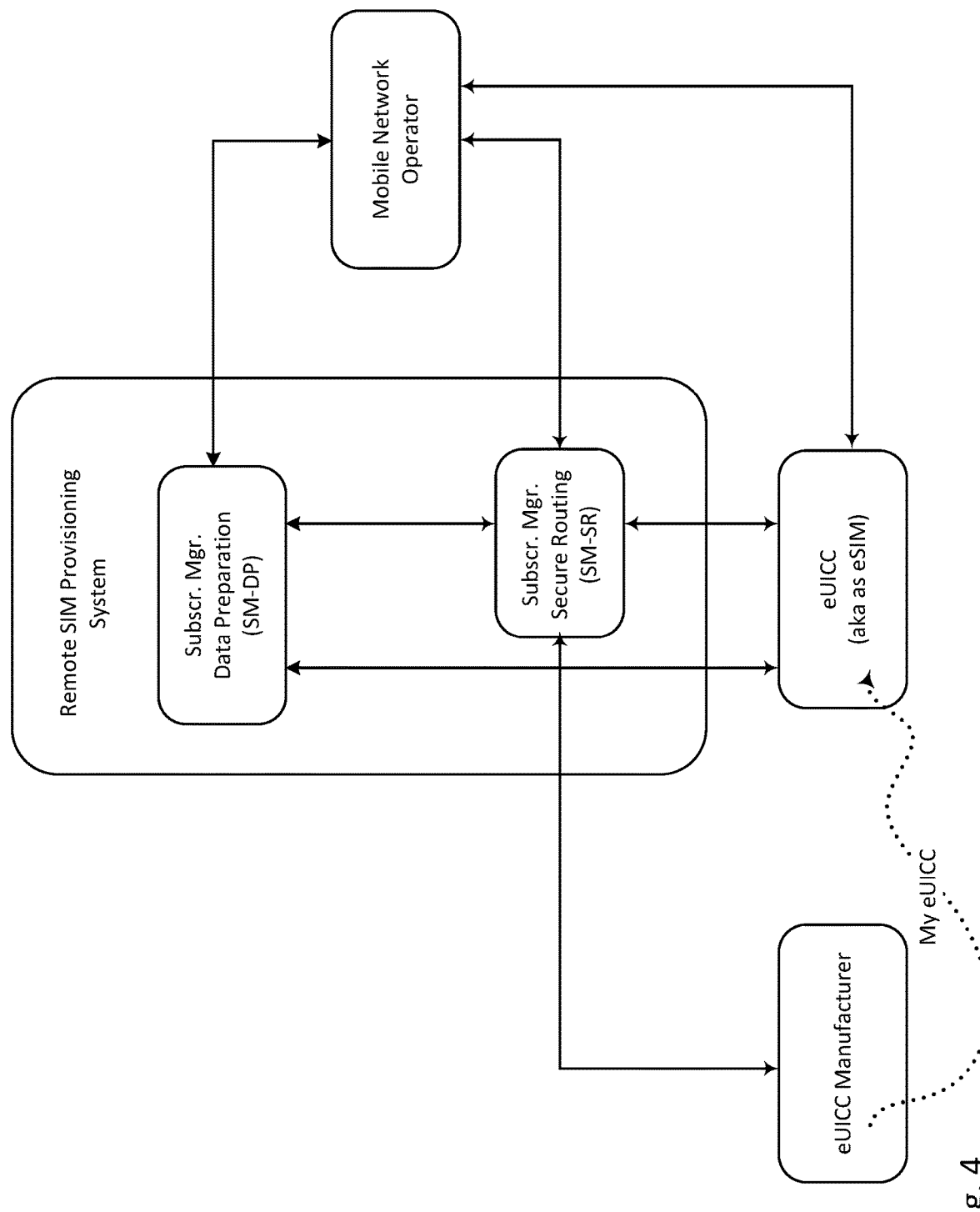
FIG. 4 illustrates an example GSMA remote SIM provisioning architecture.

FIG. 4 shows a remote SIM provisioning architecture specified by GSMA. Notice that the eSIM is denoted as an eUICC in FIG. 4. The remote SIM provisioning system includes a Subscription Manager-Data Preparation (SM-DP) entity and a Subscription Manager-Secure Routing (SM-SR) entity.

The SM-DP entity is responsible for eSIM Operating Profile generation. The eSIM operating profile generation will take place via the same processes used for SIM profile development. SIM vendors will use authentication details provided by cellular network operators to generate unique network access keys. Rather than storing these details on UICC, they will be saved in digital form only and will await a request for download triggered by the embedded universal integrated circuit card (eUICC) in the device.

The SM-SR entity is responsible for eSIM Operating Profile delivery. The connection between the eUICC in the device and the profile-generation service is established by the SM-SR, which is responsible for encrypting the generated profile before it can be transmitted to the device.

Note that the MNO can communicate with the eUICC and the Remote SIM provisioning system. Also notice that the eUICC Manufacturer has an interface to the Remote SIM provisioning system to provide the eUICC certificates for specific individual eUICCs, enabling eUICC authentication and certification to the Remote SIM provisioning system for eSIM operating profile management.

Figure 5:
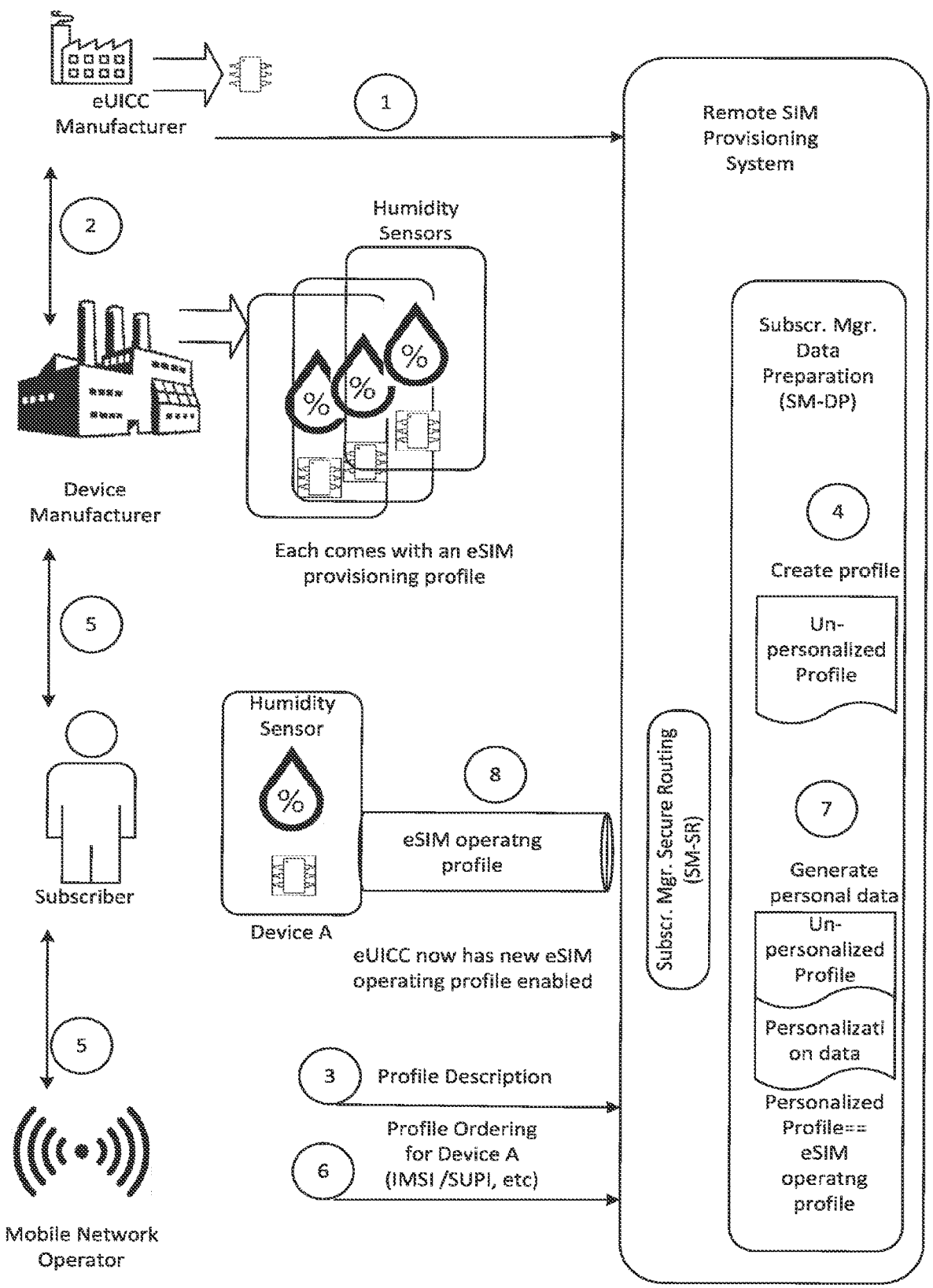
FIG. 5 illustrates an example cellular on-boarding method.

FIG. 5 shows an example call flow of cellular on-boarding with eSIMs. See, [4] Embedded SIM Remote Provisioning Architecture, Version 1.1, Dec. 17, 2013. The eSIMs rely on a remote SIM provisioning system to tailor the eSIM operating profiles that are included on the eSIMs.

In step 1, an eUICC manufacturer produces the eUICC. It interfaces to the Remote SIM provisioning system to set up the security credentials for its eUICCs.

In step 2, a device manufacturer buys eSIMs and installs these in the device. These eSIMs come provisioned with a default eSIM provisioning profile, and are capable of receiving one or more additional operating profiles. The provisioning profile allows the device hosting the eSIM to have some basic cellular connectivity. It provides the device a provisional IMSI, authentication key, and MSISDN In step 3, the Mobile Network Operator issues a profile description to the remote SIM provisioning system. This contains general PLMN information that the operator wants to include on all device's eSIM that are connected to it. For example, some typical applications In step 4, the remote SIM provisioning system uses this profile description to create what GSMA calls un-personalized profile. This is a subset of the eSIM profile that contains operator information that would be common across eSIMs (things like SMS service center)

In step 5a, a subscriber buys the device and installs it. The subscriber also subscribes to a Mobile Network Operator to offer service for his device.

In step 5b: Using the provisioning profile, the device connects to a provisioning cellular network. This connection typically has limited capability.

In step 6, the Mobile Network Operator orders the profile for the device. It specifies the profile description to use, as well as some guidance on the range of IMSI to assign.

In step 7, the remote SIM provisioning system completes the eSIM operating profile by adding personalized information to the profile (namely, by adding the assigned IMSI and authentication key to the un-personalized profile).

In step 8, the remote SIM provisioning system creates a secure tunnel between itself and the eUICC in the device, downloads the newly created profile, and enables it.

In step 9, the device has now completed cellular on-boarding. The device connects to the Mobile Network Operator, and has all the information of a regular SIM.

Figure 6:
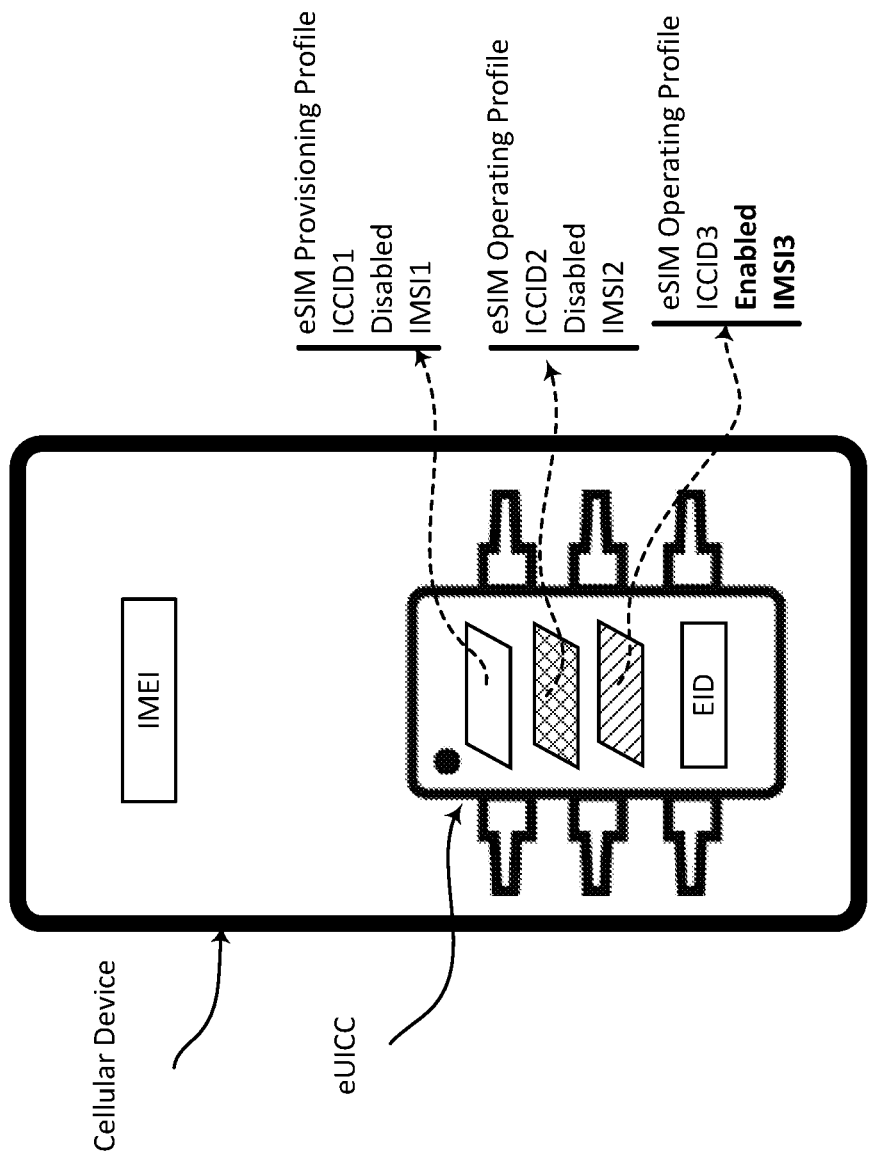
FIG. 6 illustrates an example of identities related to a cellular device.

A cellular device has a number of associated identities. FIG. 6, shows how data and identifiers, such as IMSI, IMEI, EID (eUICC-ID), ICCID, may reside in a device with an eSIM and be related to each other and various profiles.

Figure 7:
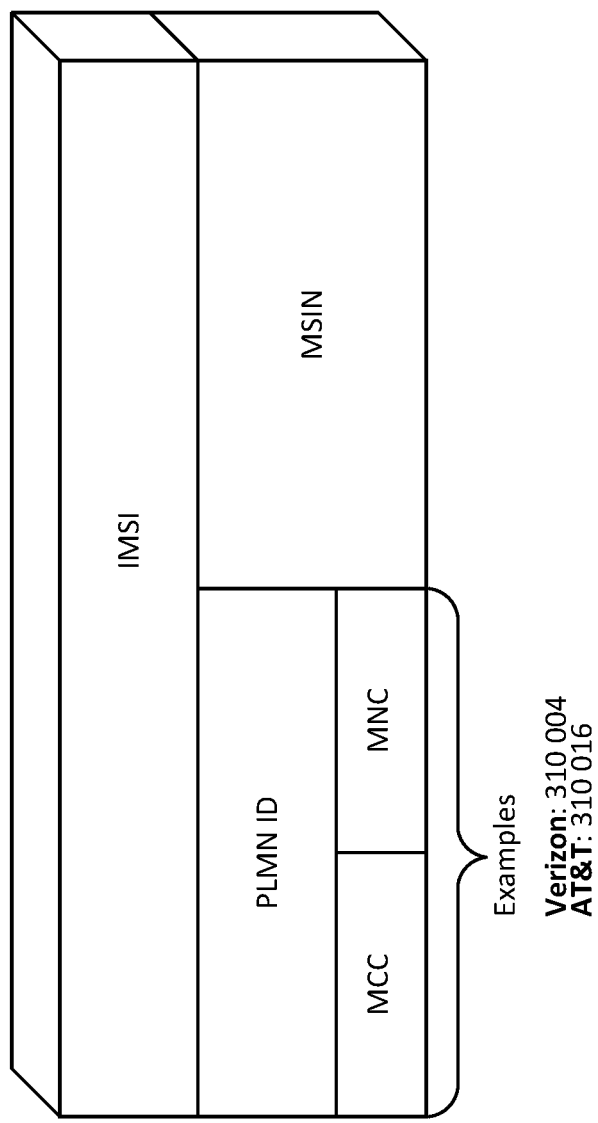
FIG. 7 illustrates an example IMSI.

The International Mobile Subscriber Identity (IMSI) identifies the subscription in a mobile network. As shown in FIG. 7, an IMSI typically has several components, include a five (or sometimes six) digit Public Land Mobile Network identity (PLMN-ID) that identifies the cellular network that issues the IMSI, and a ten (or sometimes nine) digit Mobile Subscriber Identification Number (MSIN) that identifies this IMSI in the cellular network. The IMSI in a removable SIM card is stored in the UICC and cannot be changed, while the IMSI in an eUICC can be remotely changed through a Remote SIM provisioning system. As a result, there is no one-to-one relationship between an IMSI and a physical device. The SUPI is the 5G equivalent of the IMSI.

The International Mobile Equipment Identity (IMEI) is a 15-digit decimal number used to identify terminal equipment when it is used on a GSM/UMTS mobile phone network. To ensure traceability of each item of equipment connected to the network, the IMEI must be unique and manufacturers must ensure no duplication of IMEI. It is assigned by the device manufacturer. It is made up of a Type Allocation Code (TAC) number (the first 8 digits) which identify the device type, plus a serial number (6 digits) assigned by the TAC holder that identifies a specific device of that device type. The 15th digit is a check digit, calculated from the other 14 digits. The PEI is the 5G equivalent of the IMEI.

The EID, or eUICC-ID, is a unique identifier of an eUICC

The Integrated Circuit Card Identifier (ICCID) used to be the identifier associated with a removable SIM card, as these cards had a single SIM profile. Now that the eSIMs may host multiple eSIM operating profiles, the ICCID is used as an identifier to the eSIM operating profile.

Section 6.14 of 3GPP TS 22.261 Service Requirements for the 5G System, details the subscription requirements of the 5G system and provides a good description of why the ideas that are explained in this paper are needed. The reader is encouraged to read section 6.14 of TS 22.261.

Figure 8:
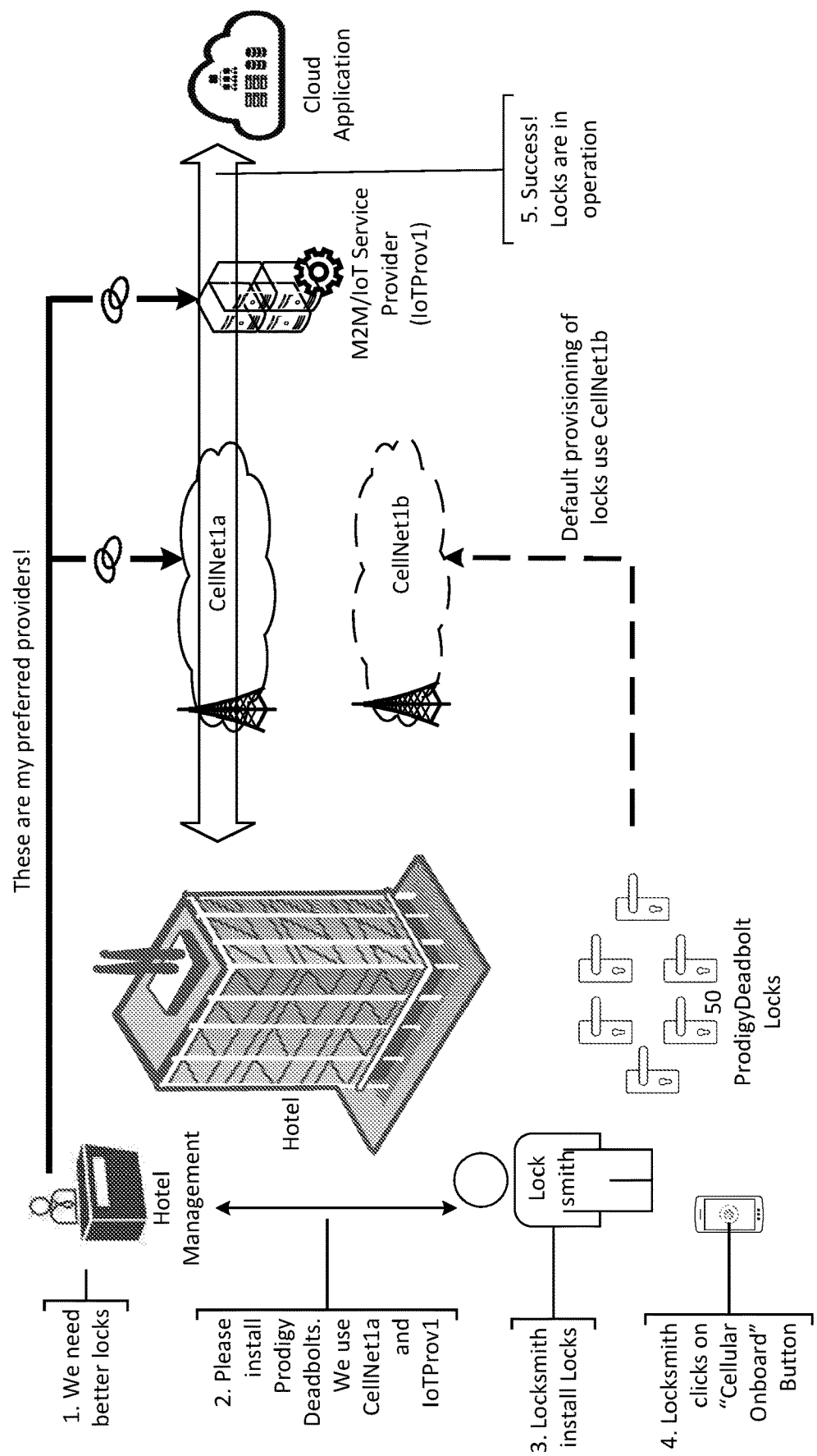
FIG. 8 illustrates an example hotel use case.
Figure 9:
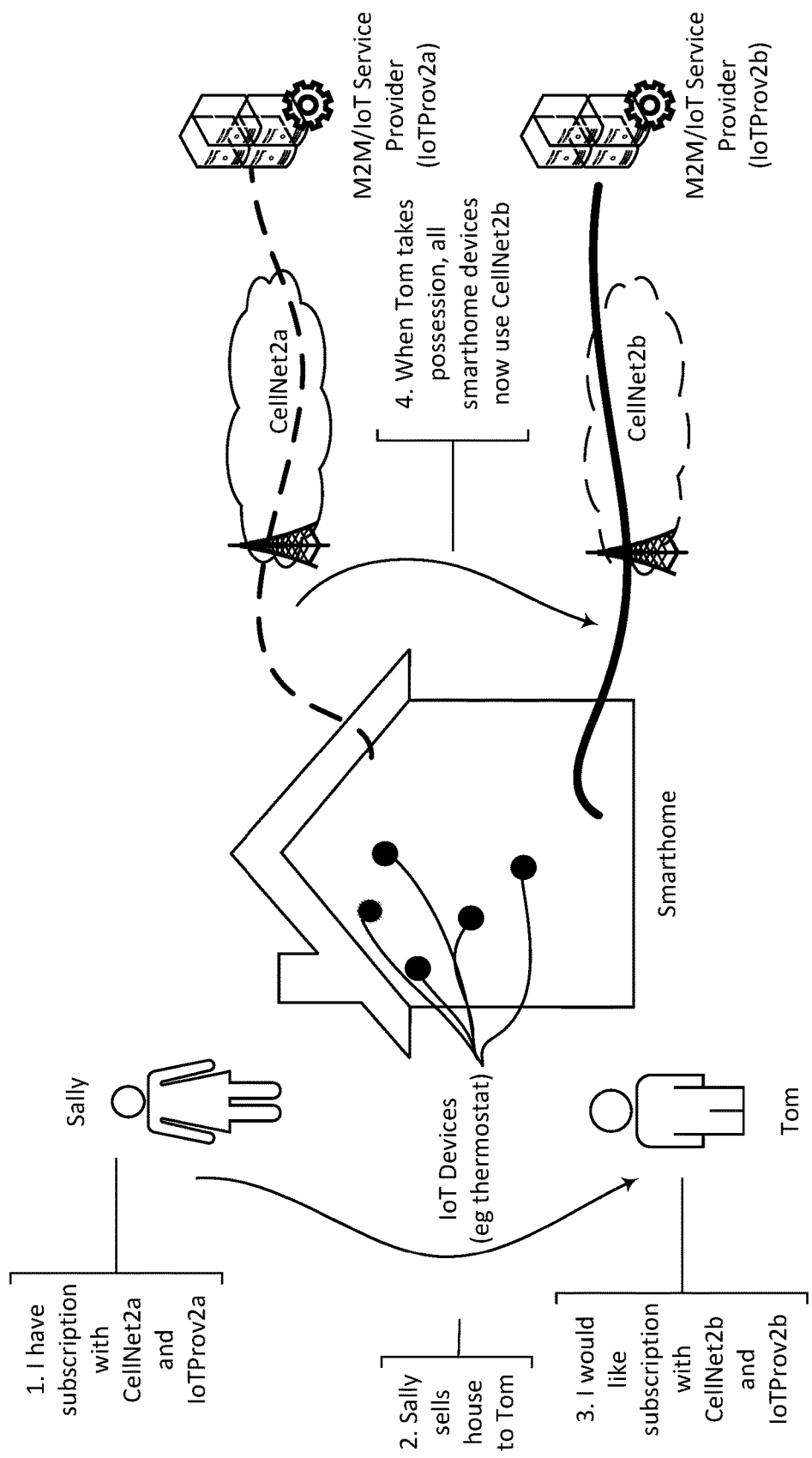
FIG. 9 illustrates an example new home owner use case.
Figure 10:
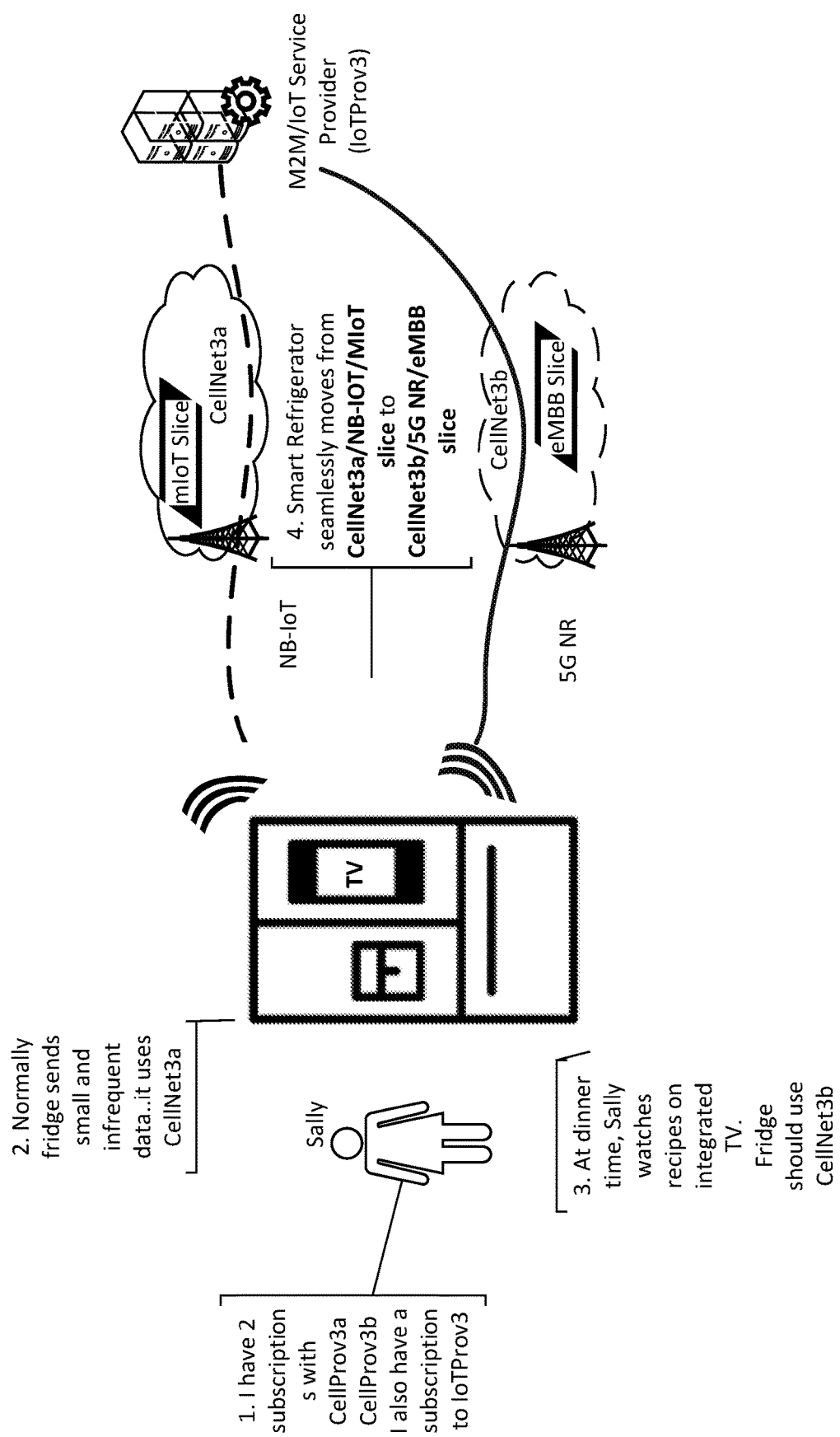
FIG. 10 illustrates an example use case of dynamically changing cellular network.

Existing cellular networks may not be able to support the use cases that are described in reference to FIGS. 8, 9, and 10, for example, using existing provisioning mechanisms.

FIG. 8 shows a hotel use case. In this example, a hotel in the downtown area that has recently had several security issues with their key card room door locks. In order to mitigate the bad press, the hotel decides to purchase the new Prodigy Deadbolt door locks which allow guests to open the door through their smartphone using NFC communication. In addition, the door locks also have a cellular radio that allows them to be remotely monitored and managed through an online cloud application. This allows the hotel staff/security team to determine if a lock is malfunctioning, check the status of all the doors, remotely lock/unlock doors, etc.

In the example of FIG. 8, the hotel management team already has a contractual agreement in place with a cellular network (CellNet1a) which it uses for all of its wireless communication needs. The hotel has many subscriptions— high bandwidth, low latency, high reliability, etc. Hotel management further has an agreement in place with an M2M/IoT service provider (IoTProv1), which it uses to provide value added services to its M2M/IoT devices and M2M/IoT applications.

The hotel management team hires the local locksmith to install the Prodigy Deadbolt on each of its 50 rooms. It provides the locksmith the data regarding the preferred cellular network and the M2M/IoT service provider.

The locksmith has none of the door locks in stock, so he buys a lot of 500 from a local distributor. The locks have an embedded SIM (eSIM). The eSIM comes configured with a default provisioning profile (eSIM provisioning profile) that uses services of a different cellular network (CellNet1b). The eSIM provisioning profile provides the eSIM with some very basic cellular connectivity that allows them to be reprogrammed with a new eSIM provisioning profile. The locksmith then installs a lock on each hotel room door. During this installation, the locksmith uses his mobile phone to scan the QR code on each lock. This provides the locksmith with a list of all the locks installed in the hotel. Once done with the physical installation, the locksmith clicks on the "Cellular On-board" button on his mobile phone. In a few minutes, the 50 locks are up and running, provisioned to use the preferred cellular network and M2M/IoT service provider, and communicating (for example reporting status) with the online cloud application.

FIG. 9 shows a new homeowner use case. In this example, Tom buys a house that used to belong to Sally. Over the years, Sally had converted her house into a "smart home"— she had installed numerous M2M/IoT devices including thermostats, electronic blinds, HVAC controls, lighting controls, etc. At the time of the sale, Sally was a client of cellular network CellNet2a and used the services of M2M/IoT service provider IoTProv2a. Tom is new to the smart home space, and did some shopping to find the least expensive cellular network CellNet2b and M2M/IoT service provider IoTProv2b. Before taking possession, Tom subscribes to the services of CellNet2b and IoTProv2b.

On the day of the move, Tom opens the front door and the smart home devices are automatically transferred from Sally's subscription to Tom's subscription.

A widget manufacturing company uses pallet trucks to deliver their widgets to multiple independent manufacturing, distribution, and retail centers. A number of widgets are placed onto each pallet and the contents of each pallet are recorded in the Widget Company's inventory systems. When the truck reaches each distribution center, ownership of some pallets and their contents is transferred from the widget company to the distribution center.

Each pallet has an NB-IoT based tracking device on it. At the time of delivery, ownership of the NB-IoT device needs to be transferred from the Widget Company to the Distribution Center.

FIG. 10 shows a use case where an IoT device dynamically changes from one cellular network (CellNet3a) to another (CellNet3b). Sally owns a smart refrigerator. The refrigerator keeps track of its inventory and sends notifications to a cloud application when an item is running low. These messages are rather infrequent and very short. However at dinner time, Sally uses her smart refrigerator to find online recipes based on the ingredients that are available inside, and to download instruction videos on how to best prepare these recipes. The refrigerator also has an integrated 12 inch display in the door, and Sally often watches these videos here. Often times, while preparing the dinner, Sally also video chats with her mom—all through the integrated display.

Sally is a frugal shopper and has multiple subscriptions to cellular networks. In fact she has one subscription specifically for all her small smart home IoT devices. This subscription uses cellular network (CellNet3a) that offers a NB-IoT radio access technology and a core network that supports a massive IoT (mIoT) network slice. She also has a second subscription for all her more bandwidth hungry smart devices such as her smart phone and her son's tablet. This subscription is on CellNet3b, which offers the 5G NR radio access technology and an enhanced mobile broadband (eMBB) network slice.

Her M2M/IoT service provider seamlessly manages moving Sally's smart refrigerator connection between cellular networks. The short/infrequent inventory readings using CellNet3a and the high bandwidth video/streaming using CellNet3b. Minimizing cost to Sally and maximizing her user experience.

One aspect that is unique to the IoT space is the tremendous flexibility that will be required for the cellular providers to give access and manage the mobile connections of the many IoT devices. The ecosystem will have subscribers, IoT devices, cellular networks, and M2M/IoT service providers, and the flexibility should allow a subscriber to have multiple devices where each of these devices may be served by different cellular networks and/or M2M/IoT service providers.

For example, a subscriber may have four devices, where device 1 uses cellular network 1 and IoT service provider 1, device 2 uses cellular network 1 and IoT service provider 2, device 3 uses cellular network 2 and IoT service provider 1, and device 4 uses cellular network 2 and IoT service provider 2.

The flexibility should further allow easily changing an IoT device from being linked to one subscriber to being linked to a different subscriber. For example, an IoT device may first be owned by Subscriber 1 and then be sold to subscriber 2.

Achieving such flexibility requires addressing a number of issues. For example, for the hotel use case of FIG. 8, there are number of issues with the provisioning, e.g., in step 4 of FIG. 8. This step requires a number of sub-steps to be handled in the background between the cellular network, the M2M/IoT service provider, the Cloud application, and a remote SIM provisioning system. The remote SIM provisioning system is not shown FIG. 8.

A first issue is that in order to use the services of cellular network CellNet1a, the IoT devices that were purchased by the locksmith need to be associated with a subscription and a subscriber of CellNet1a, for example the hotel management subscription. CellNet1a is not aware of this association. Associating the Devices with the subscription can be done "manually" between the subscriber and the cellular provider, but this process is inefficient.

A second issue is that cellular network CellNet1 will not have eSIM operating profiles for these IoT devices. In fact, it is not aware that it has to trigger the generation of eSIM operating profiles for these IoT devices.

A third issue is that, by default, the IoT devices will not be configured with the information needed to connect to cellular network CellNet1a. These IoT devices will likely have an embedded SIM (eSIM), with a factory installed eSIM provisioning profile that allows them to communicate with a different cellular network (e.g., CellNet1b). This connectivity should allow these devices to use the remote SIM provisioning system to download the correct operating profile. However the remote SIM provisioning system needs to be told when to send the eSIM operating profile to these devices.

For the new homeowner use case of FIG. 9 and the Widget Company inventory tracking use cases raise some of the problems for the hotel use case of FIG. 8. In addition, these use cases highlight another problem related to security, which is that CellNet2b should not be able to autonomously usurp ownership of devices. The change of ownership needs to be agreed between the two cellular networks and be orchestrated. Current standards do not provide a solution mechanism.

For the dynamic change cellular network use case of FIG. 10, an additional issue is that cellular networks are designed to change from one cellular network to another, but this is due to mobility or a change in UE subscription. The existing procedures are not intended to dynamically change between cellular networks based on the data needs of the UEs.

The use cases of FIGS. 8-10 highlight a key difference between traditional cellular devices with removable UICC cards (such as smart phones) and IoT devices with eUICCs. In the latter, there is a permanent relationship between the Device ID (SUPI or IMEI) and the eUICC ID (EID). In the former, a subscriber can interchange UICC across many different devices, and this relationship is very dynamic. As a result, the UICC case requires that the devices inform the network about their radio access capability and network capability during registration to the cellular network. However, this results in quite a significant signaling burden on the radio interface (especially for users that need to register a large number of devices).

In the examples of FIGS. 11-34, CellNet1a and CellNet1b may be the same. When CellNet1a and CellNet1b are the same, the independent sets of network nodes (e.g., NEF and UDM) for CellNet1a and CellNet1b may become a single set of network nodes (e.g., one NEF and UDM). The operator subscription manager may be part of the NEF or UDM or may be a new NF that stores data in the UDR.

In the examples of FIGS. 11-34, the operator subscription manager is shown accessing the UDR. The operator subscription manager might alternatively access the UDR via the UDM.

In the examples of FIGS. 11-34, the M2M/IoT service provider and/or service capability layer is shown accessing the cellular network through the SCEF/NEF. Note that the M2M/IoT service provider and/or service capability layer may also access the cellular network entities/functions (such as the operator subscription manager) directly.

In the examples of FIGS. 11-34, we show a manufacturer server. It should be understood that this may be a server of the device manufacturer, or some 3rd party server that has information provided by the device manufacturer.

In the examples of FIGS. 11-34, a single central EIR/5G-EIR entity is shown that communicates to both EIRs and 5G-EIRs. In practice, this entity may be split into two distinct entities, e.g., a central EIR and a central 5G-EIR. In such a case, all the interactions shown to the central EIR/5G-EIR should be understood as being comprised of two interactions (one to the central EIR and the other to the central 5G-EIR).

On-boarding IoT devices into a given cellular network may be achieved in a number of ways, such as via remote SIM provisioning, registration redirection, and roaming with inter-PLMN handover, as illustrated in the examples of FIGS. 11-14, 15-18, and 19-22, respectively. Herein, the term "on-boarding" generally refers to a procedure whereby a device with an eUICC with a default eSIM provisioning profile is powered on and eventually registered to the correct cellular network.

A number of things are assumed in the on-boarding examples of FIGS. 11-22. It is assumed that the subscriber would like to cellular on-board 'K' IoT devices, and that the IoT devices belong to a subscriber, and this subscriber already has service agreements with cellular network (CellNet1b) and M2M/IoT service provider (IoTProv1). As part of this agreement, IoTProv1 is aware that devices of the subscriber should use cellular network CellNet1b.

It is also assumed that each IoT devices has an eSIM with a default eSIM provisioning profile that uses cellular network CellNet1a.

It is further assumed that the IoT devices have been enrolled to IoTProv1. As part of this enrollment, IoTProv1 is provided information for each IoT device. For example, IoTProv1 may be provided with an identification of each device (a Device ID, PEI of each device, IMEI of each device, the current device IMSI, the current device MSISDN, the eUICC EID, or any other external identifier). IoTProv1 may be provided with an indication of the cellular network used in its provision profile (CellNet1a). IoTProv1 may be provided with an indication of the manufacturer of the device In the example of FIGS. 11-14 of on-boarding via remote SIM provisioning, the cellular network of the eSIM provisioning profile receives the registration request, then a remote SIM provisioning system is used to push the eSIM operating profile to be used over CellNet1b, to the device.

In the example of FIGS. 15-18 of registration redirection, the cellular network of the default eSIM provisioning profile rejects the registration request, and uses a registration reject message to provide the device with information about the PLMN to be retargeted to. Device then will attempt a subsequent registration to register to the correct PLMN.

In the example of FIGS. 19-22 of roaming with inter-PLMN handover, the device operates as though it is roaming on the cellular network of the provisioning profile. The device may have limited functionality while it is roaming. CellNet1b will use the control plane of the visiting network to provide the device its eSIM operating profile, and then rely on higher priority PLMN search of the device to eventually register to the correct PLMN.

FIGS. 11-14 illustrate an example procedure for on-boarding via remote SIM provisioning. FIGS. 11 to 14 depicts a single call. For the sake of clarity, the call flow is divided into several sheets of drawings, and some devices involved in the overall call flow are omitted on some drawing sheets where they are not involved in any particular operation. The same is true for the calls flows of FIGS. 15-18 and 19-22, respectively.

Figure 11:
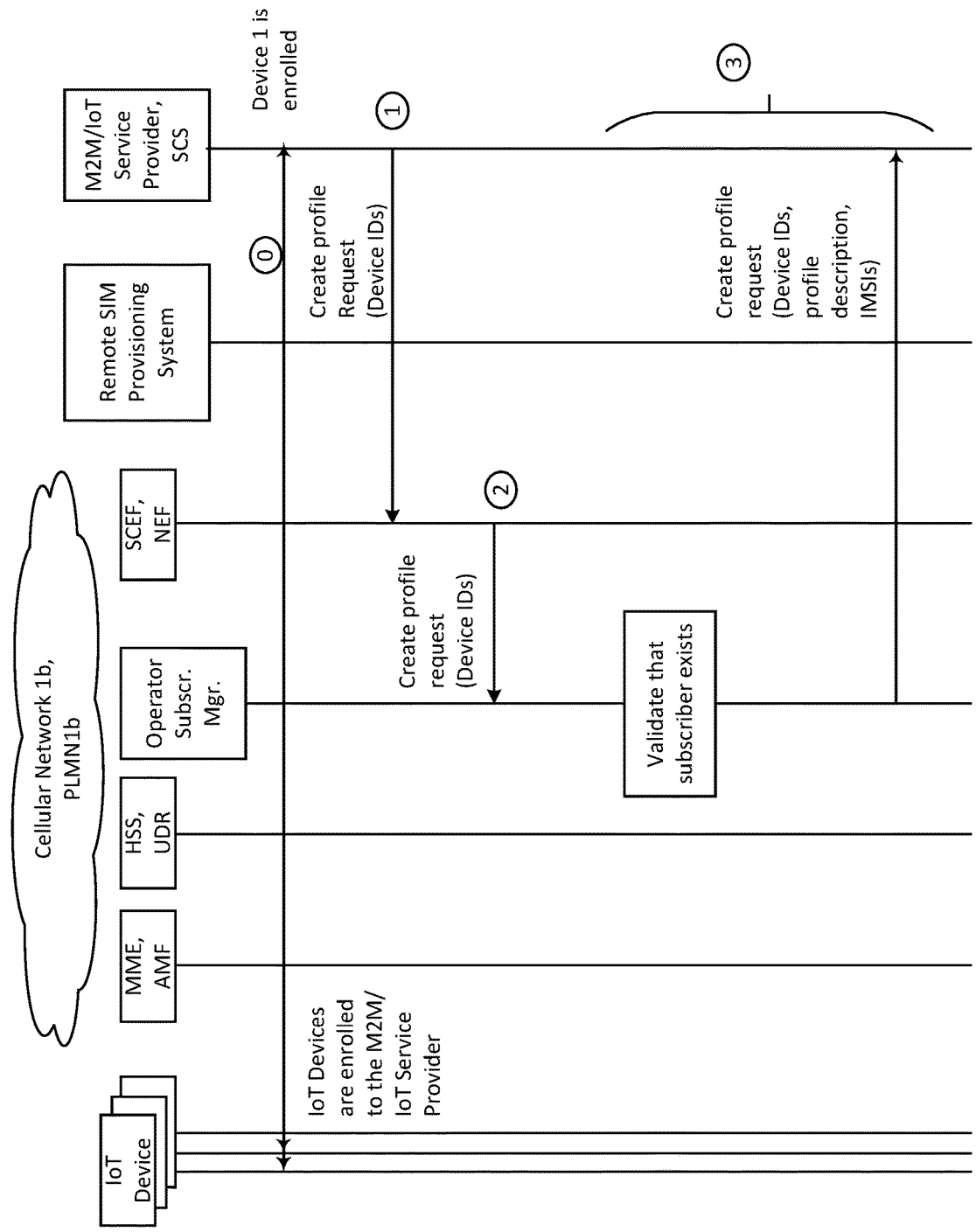
FIGS. 11 to 14 show a call flow of an example method for of using remote SIM provisioning.

The call flow of FIG. 11 begins with IoT devices enrolled to the M2M/IoT Service Provide. Device 1 is enrolled.

In step 1 of FIG. 11, based on the device enrollment, M2M/IoT Service Provider issues a Create Profile request to CellNet1b. The message is directed to the SCEF/NEF of CellNet1b. The request may include information such as: a list of device identifications (e.g., PEIs/IMEIs); subscriber identification; a device type; device capabilities; allowed slices; allowed DNN's; and a time window to complete the cellular on-boarding of the listed devices; and external group identifiers to associate with the devices.

The subscriber identification may be a SUPI/IMSI that is associated with multiple devices or it may be a new identifier that identifies a subscriber (e.g., a person or business) that is associated with multiple SUPIs/IMSIs. Alternatively the subscriber identification may be an external identifier, such as a Generic Public Subscription Identifier (GPSI), which the MNO can in turn map to a SUPI/IMSI, or to some network subscriber ID.

The time window to complete the cellular on-boarding may operate in a number of ways. For example, IoTProv1 may request to wait one hour for the devices to have their cellular operating profile enabled. If a device has not enabled the profile by then, the profile may be deleted, the service provider may be notified, etc.

In step 2, after an authorization check to see if the M2M/IoT service provider is authorized to use the services of CellNet1b, the Create Profile request is forwarded to an operator subscription manager within CellNet1b.

In step 3, the operator subscription manager validates that the subscriber exists, that the M2M/IoT Service Provider is authorized to assign devices to the subscriber, and issues a Create Profile Request to the Remote SIM Provisioning system. This request may include information such as: a list of device identifications; a description of the profile to generate, including any of the information that was provided in step 1; the number of profiles to generate; IMSI/SUPI information to assign to devices; external identifiers to assign to the devices (e.g., an MSISDN or 3GPP external identifier); and internal and/or External Group Identifiers to associate with the devices.

Figure 12:
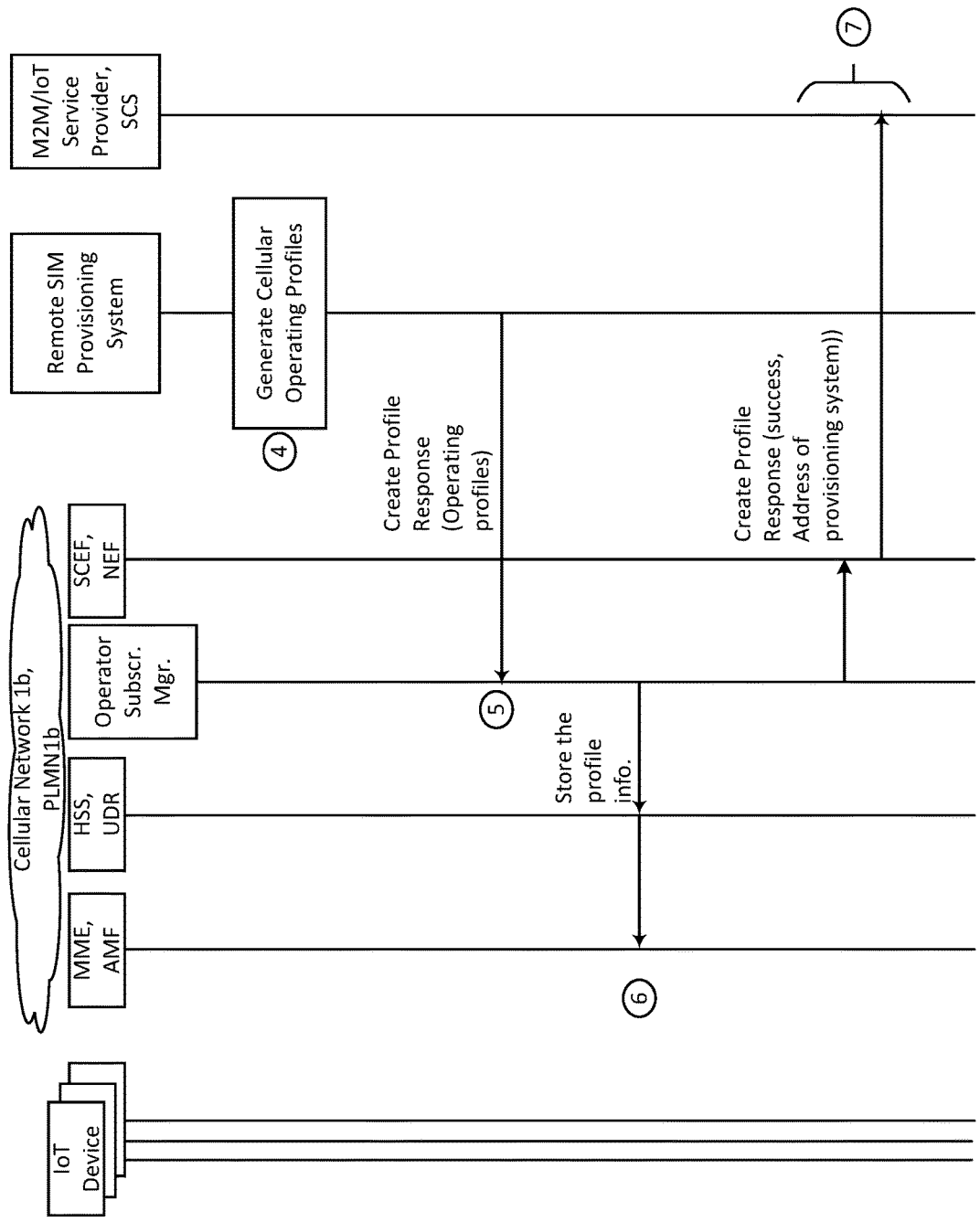

In step 4 of FIG. 12, the Remote SIM Provisioning system generates the personalized part of the eSIM operation profile including the device specific data (such as the security keys), and securely stores the profile In step 5, the Remote SIM Provisioning system provides the profile to the operator subscription manager using a Create Profile response. This includes the assigned IMSIs/SUPIs, the security keys, etc.

In step 6, the operator subscription manager populates the necessary operator subscription profiles in the HSS/UDR and AuC/AUSF. It also links these operator subscription profiles to the correct subscriber.

In step 7, the operator subscription manager issues a Create Profile response to the SCEF/NEF, which forwards it to IoTProv1. This message may include a status of the request, e.g., success or failure. The message may include the address of the Remote SIM Provisioning system entity to contact for the operating profiles of these devices. The M2M/IoT service provider stores this information for future cross-referencing.

Figure 13:
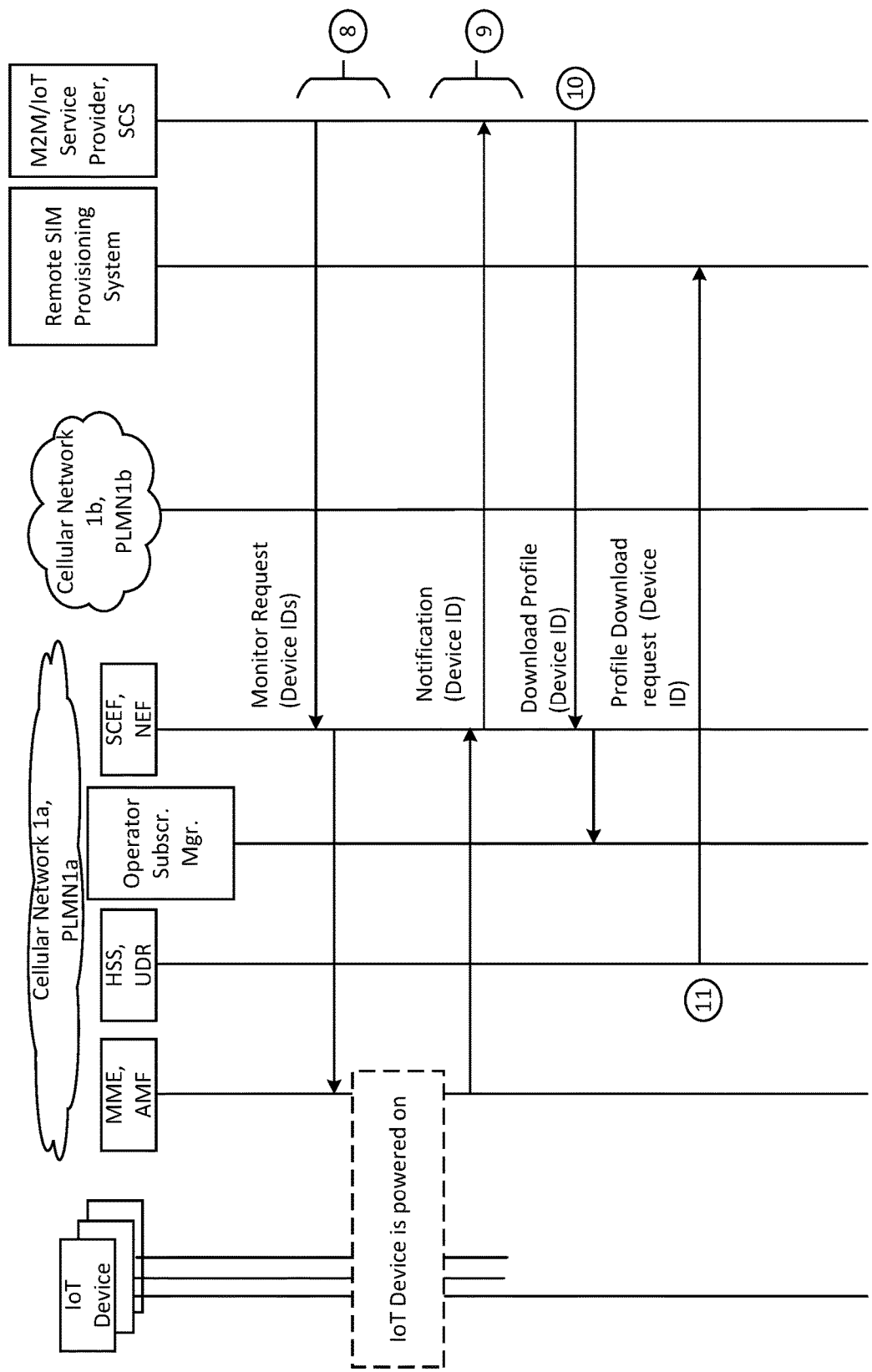

In step 8 of FIG. 13, the M2M/IoT service provider issues a monitor request to CellNet1a to monitor when one of the IoT device attempts a registration to CellNet1a. The call flow shows the monitoring at the MME/AMF. This request may include a list of device identifications (IMEIs/PEIs or IMSIs/SUPIs or external identifiers or external group identifiers)

This may be a new 3GPP monitoring event which is based on the SCEF/NEF being informed by the MME/AMF about a specific UE with a specific IMEI/PEI or IMSI/SUPI registers to the network.

At some later time, an IoT device (Device ID1) is powered on, and it attempts to register with CellNet1a, as defined through its default provisioning profile.

In step 9, the MME/AMF observes this event, and sends a notification to the Service Provider with the device identification.

In step 10, the M2M/IoT Service Provider cross references the device ID to determine the responsible Remote SIM Provisioning system entity. It issues a Download Profile message to CellNet1a with the address or identity of the Remote SIM Provisioning system. This message is forwarded to the operator subscription manager of CellNet1a.

Steps 9 and 10 may be optional. Alternatively, the M2M/IoT Service Provider may provision CellNet1a with the identity or address of the Remote SIM Provisioning system entity prior to the devices turning on.

In step 11, through its operator subscription manager, CellNet1a issues a Profile Download request to the remote SIM provisioning system entity. This request may include information such as: device identification (for example PEI/IMEI or EID; an MSISDN of a device; and an IP address of device.

Figure 14:
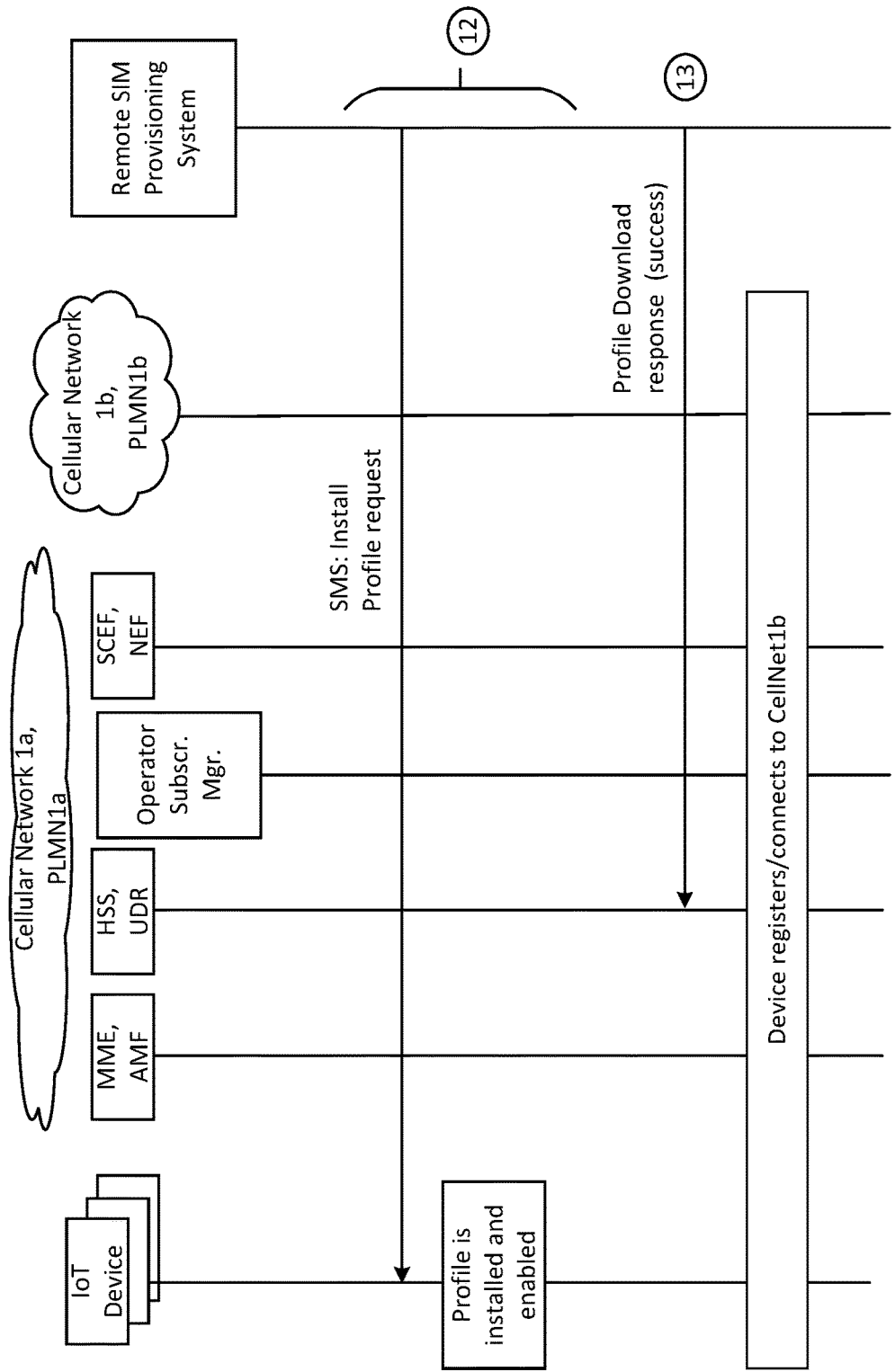

In step 12 of FIG. 14, the remote SIM provisioning system entity creates a secure channel between itself and the IoT device and downloads the cellular operating profile. Once downloaded, the profile is enabled.

In step 13, the remote SIM provisioning system entity confirms the status of the download and installation back to CellNet1a.

Once enabled, the operating profile on the IoT device results in the device deregistering from the cellular network of the provisioning profile and registering and connecting to CellNet1b.

FIGS. 15-18 illustrate an example procedure for on-boarding using registration redirection. This procedure relies on the use of EIR/5G-EIR to act as a repository for information relating to the home network of a device. That is the PLMN ID associated with CellNet1b, and a manufacturer server providing the device ID and authentication key to cellular networks based on request/response exchanges (provided they have the necessary access). The procedure further relies on the device eSIM operating profile that keeps the MSIN and authentication key of the eSIM provisioning profile. That is, the UE swaps out the PLMN-ID of the IMSI/SUPI of the eSIM provisioning profile for the PLMN-ID of the devices home network.

Figure 15:
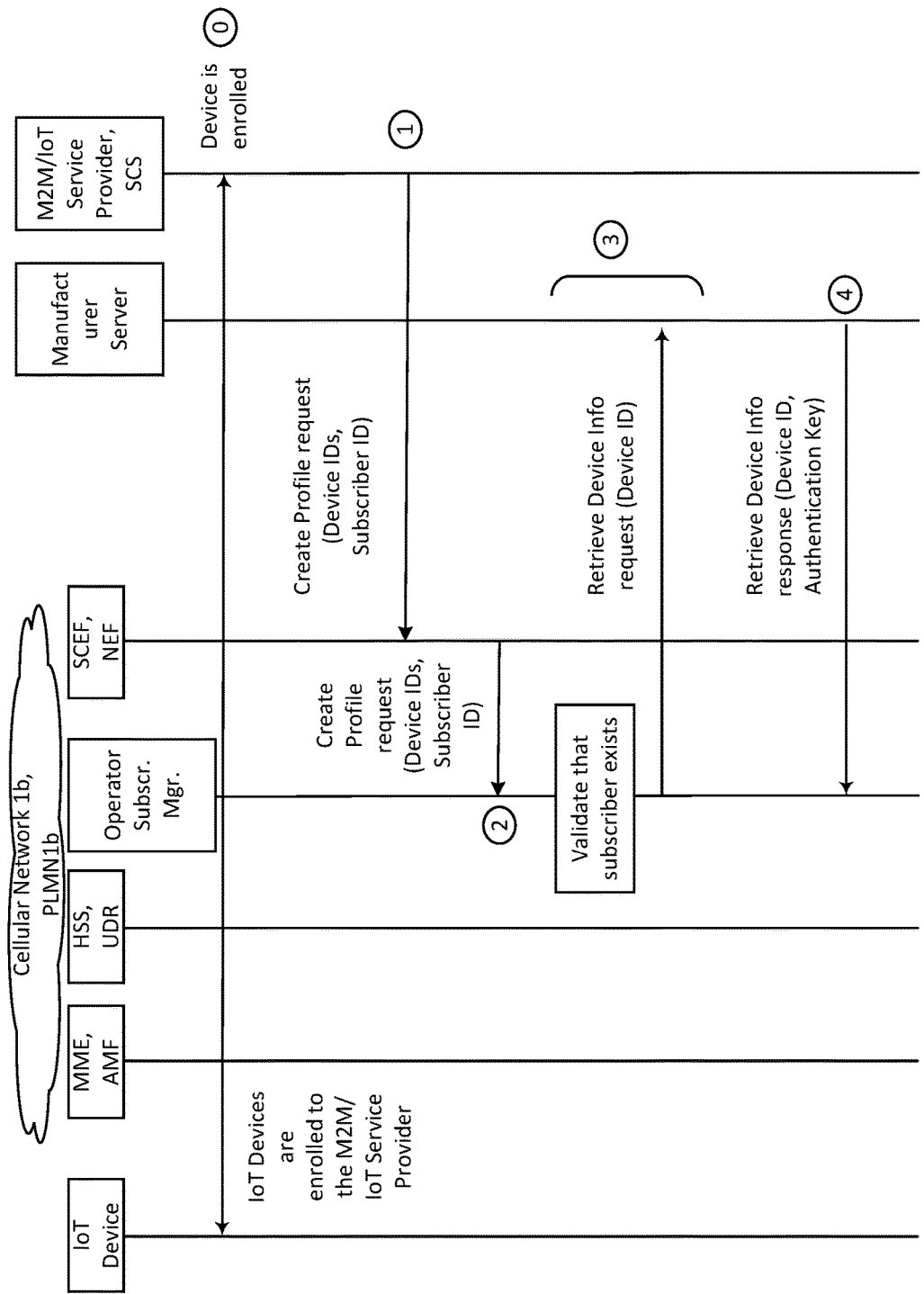
FIGS. 15 to 18 show a call flow of an example method for registration reject redirection.

The call flow of FIG. 15 begins with IoT devices enrolled to the M2M/IoT Service Provide. Device 1 is enrolled.

In Step 1 of FIG. 15, based on the device enrollment, M2M/IoT Service Provider issues a Create Profile request to CellNet1b. The message is directed to the SCEF/NEF of CellNet1b. The request may include information such as: a list of device identities (IMEI/PEI or EID); subscriber identification; a time window to complete the cellular on-boarding of the listed devices; device type; device capabilities; allowed slices; allowed DNN's; and External Group Identifiers to associate with the devices The subscriber identification may be an IMSI/SUPI that is associated with multiple devices or it may be a new identifier that identifies a subscriber (e.g., a person or business) that is associated with multiple IMSIs/SUPIs.

For the time window, for example, IoTProv1 may request to wait 1 hour for the devices to have their cellular operating profile enabled. If a device has not enabled the profile by then, the profile may be deleted, the service provider may be notified, etc.

In step 2, after an authorization check to see if the M2M/IoT service provider is authorized to use the services of CellNet1b, the Create Profile request is forwarded to operator subscription manager within CellNet1b.

In step 3, the operator subscription manager validates that the subscriber exists, that the M2M/IoT Service Provider is authorized to assign devices to the subscriber, and issues a Retrieve Device Info request to the Manufacturer Server. This request includes the device ID (for example an IMEI/PEI or EID).

In step 4, the Manufacturer Server checks that CellNet1b is allowed to access the device information. It creates a secure tunnel for information exchange, and issues a Retrieve Device Info response to the operator subscription manager, that includes the SUPI/IMSI of the device as well as the authentication key.

Figure 16:
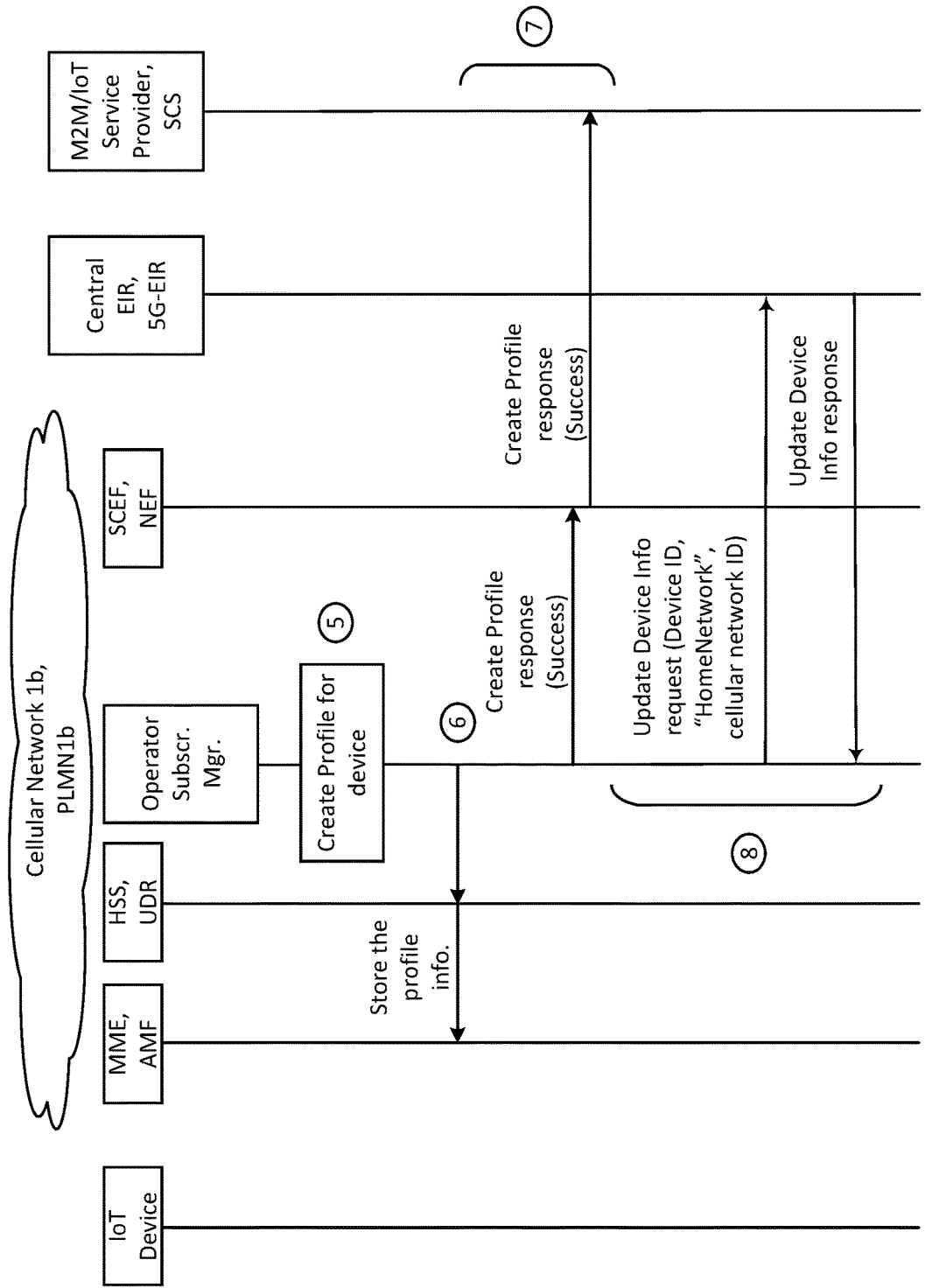

In step 5 of FIG. 16, the operator subscription manager creates the eSIM operating profile for the device. For the device SUPI/IMSI, it replaces the PLMN ID associated with the provisioning profile with its own PLMN ID. For example, consider the case that CellNet1a has a PLMN ID=310 013 (Verizon) and CellNet1b has a PLMN ID=310 090 (AT&T). If the provisioning profile assigned the device an MSIN=123456789, then the provisioning IMSI/SUPI would be: 310 013 123456789, while the operating profile IMSI/SUPI would be: 310 090 123456789. In other words, the device would retain its MSIN and authentication key from the provisioning profile. This eliminates the need of sending the authentication key over the air.

In step 6, the operator subscription manager populates the necessary operator subscription profile information in the HSS/UDR, AuC/AUSF, MME/AMF, etc. It also links the operator subscription profile information to the correct subscriber.

In step 7, the operator subscription manager issues a Create Profile response to the SCEF/NEF, which forwards it to IoTProv1. This message may include a status of the request, e.g., success or failure.

In step 8, the operator subscription manager stores the PLMN ID associated with the cellular operating profile in the central EIR/5G-EIR using an Update Device Info request message. This message may include the following information. This request may include information such as: a list of device identifications (e.g., IMEI/PEI or EID); a PLMN ID of the cellular network (CellNet1b); and a storage type. The storage type in this case may be "Home Network" information.

At some later time, an IoT device powers up.

Figure 17:
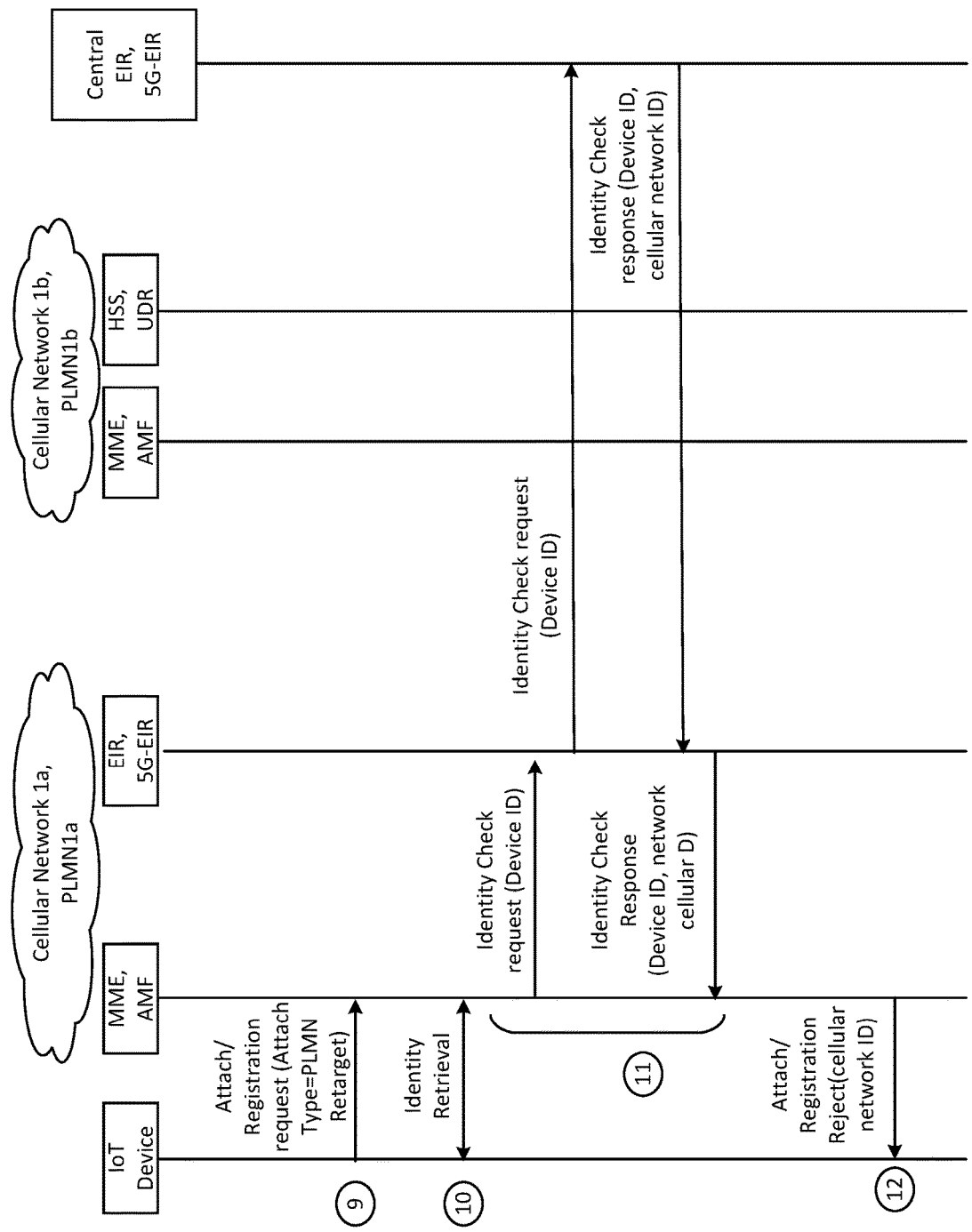

In step 9 of FIG. 17, the IoT Device is configured by default to search for the strongest cell and attempt a registration to this cell's cellular network (CellNet1a). The device issues an attach request with parameters such as: a PLMN retarget indication; an IMSI/SUPI; a UE network capability; an IMEI/PEI identity of the device; and an AF identity. The PLMN retarget indication indicates to the network that the attachment is for a PLMN retargeting, and may be implemented as a new attach/registration type. The IMSI/SUPI may have wildcard characters, and/or may have special reserved values for the Mobile Country Code (MCC) and Mobile Network Code (MNC) to indicate that the IMSI/SUPI is temporary and only for initial access. The AF identity is an identity of a service provider or network application that will sponsor the device.

Alternatively, instead of searching for the strongest cell, the UE may search for a well-known PLMN-ID or a PLMN-ID that was programmed in the device via a GUI, command line interface, or via a software image download. This well-known PLMN-ID may be well-known PLMN ID that can be used for PLMN retargeting.

Alternatively, the UE may only attempt to attach to networks that broadcast that they support PLMN retargeting.

In step 10, if the IoT device has not provided its IMEI/PEI in Step 9, the MME/AMF shall retrieve the IoT Device identity from the UE. The identity shall be the IMEI/PEI.

In step 11, the PEI (e.g., IMEI) is used to query the EIR/5G-EIR to determine the PLMN to which this device should be retargeted to. This is achieved through an Identity Check request. This request includes the device identification (IMEI/PEI) as well as the type of enquiry "Home Network". The EIR/5G-EIR forwards the request to the central EIR, which cross-references the Device ID to determine the PLMN ID of the home network. The central EIR returns the PLMN ID of the home network through an Identity Check response.

In step 12, the MME/AMF of Cell Net1a (cellular network of the provisioning profile) issues a registration reject message to the IoT device. This message contains the PLMN ID of the cellular network where the IoT device should attempt a registration. The PLMN ID that is provided may be CellNet1B.

Figure 18:
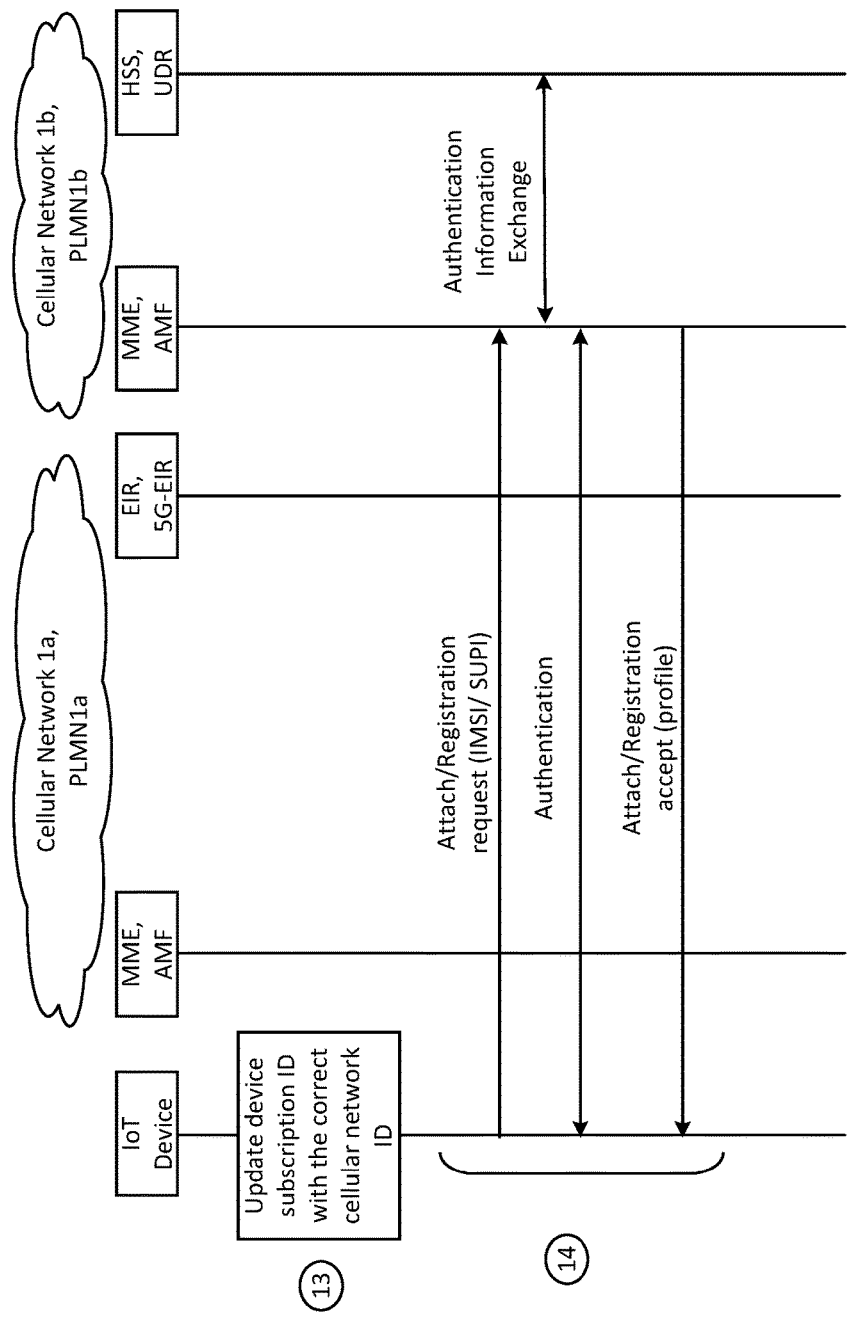

In step 13 of FIG. 18, the IoT device updates its IMSI/SUPI, with the information included in the registration reject message of Step 12. It also updates its HPLMN to CellNet1b.

In step 14, IoT device begins searching for cells on the cellular network CellNet1b. After finding a cell, it attempts to register with the CellNet1b. As part of the registration accept message, the device is provided with the rest of the cellular operating profile included in the HSS/UDR of CellNet1b.

FIGS. 19-22 illustrate an example procedure for on-boarding using roaming with inter-PLMN handover. The example of FIGS. 19-22 is very similar to the example of FIGS. 15-18 of registration redirection. The main difference is that rather than rejecting the registration request in CellNet1a, the registration is accepted and the device is considered to be roaming in this network.

The device may have limited capability while it is roaming. For instance: it may not be allowed to send user plane data; it may have very strict limits on the amount of user plane data (only uplink, only downlink, maximum uplink rate K bps, . . . ); and it may be allowed to send/receive only certain control plane messages.

After some time, the network will determine that the device is not on its HPLMN, and perform an inter-PLMN handover.

A call flow for register in a roaming PLMN and perform inter-PLMN handover is shown in FIGS. 19 to 22. The call flow of FIG. 19 begins with IoT devices enrolled to the M2M/IoT Service Provide. Device 1 is enrolled.

Figure 19:
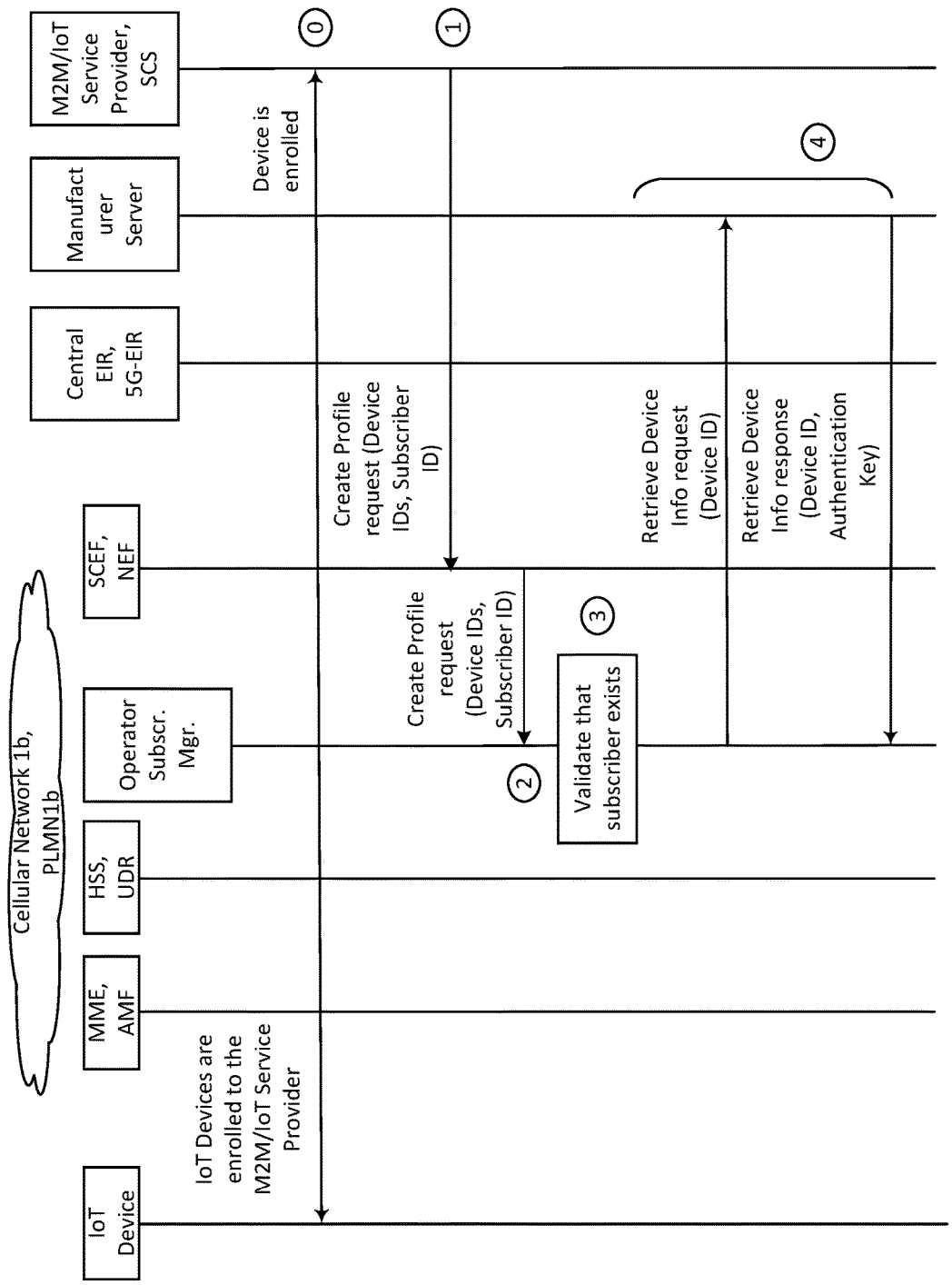
FIGS. 19 to 22 show a call flow of an example method for register in roaming PLMN and perform inter-PLMN handover.
Figure 20:
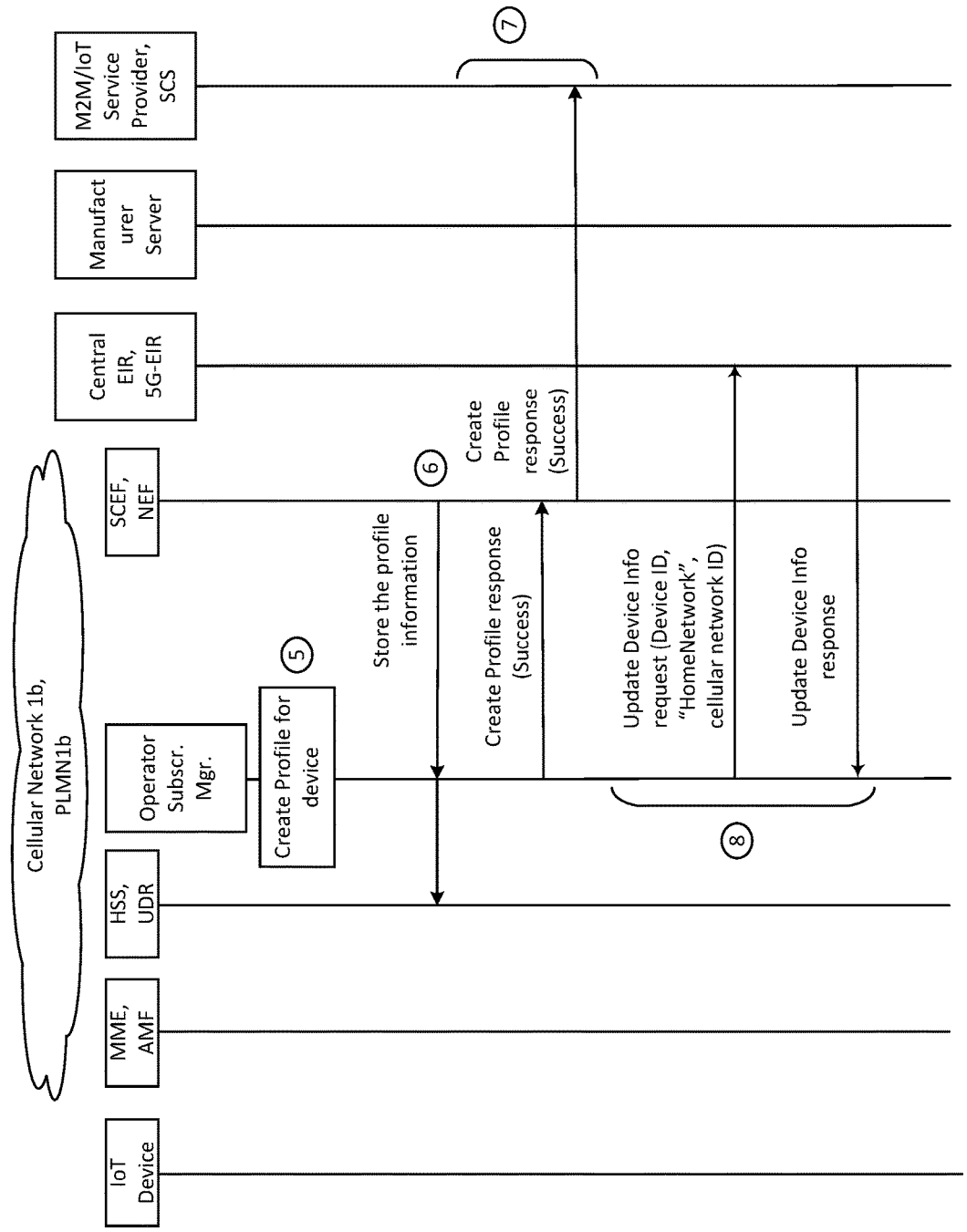
Figure 21:
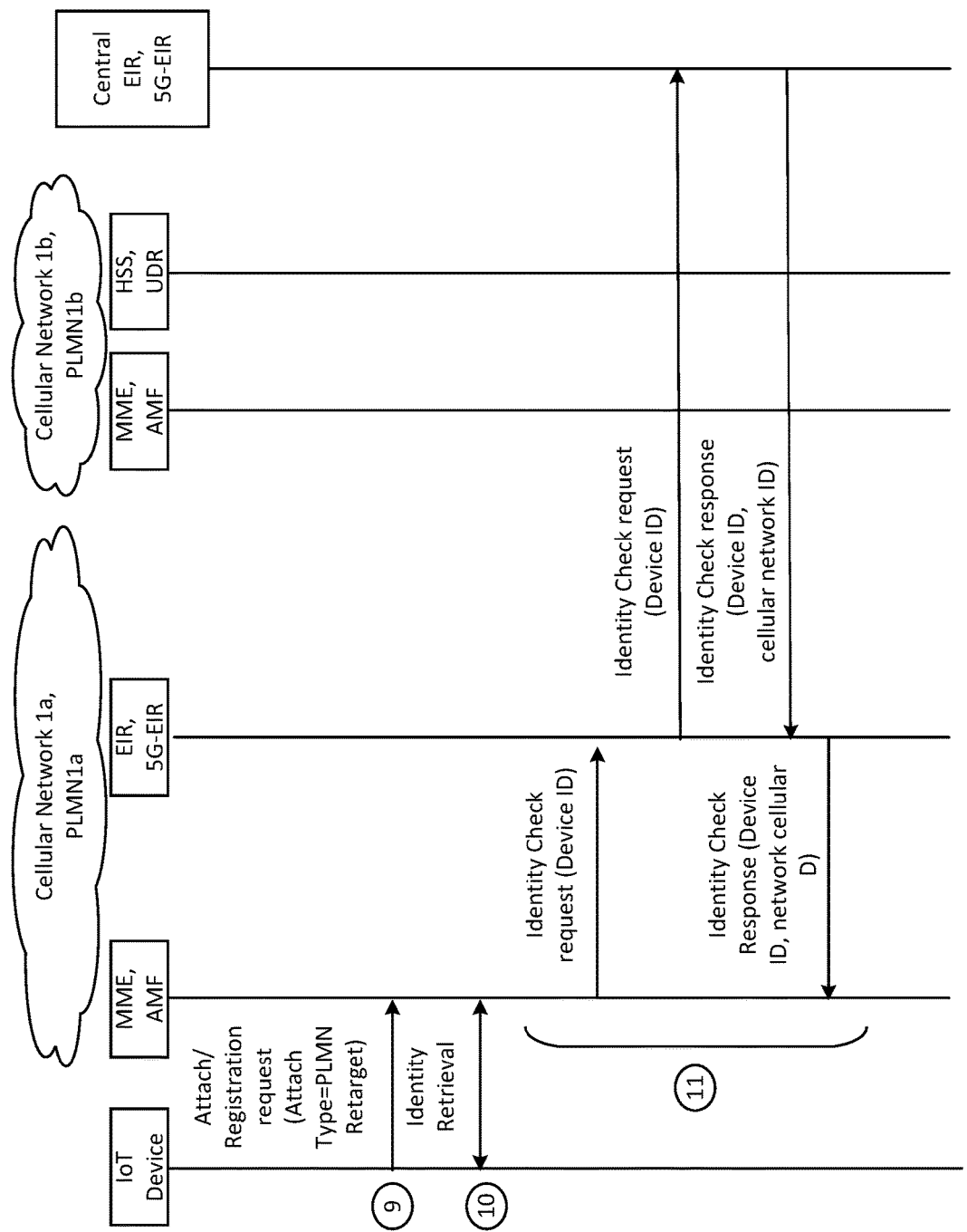

Steps 1 to 11 of FIGS. 19-21 are identical to the corresponding steps in the example of FIGS. 15-18.

Figure 22:
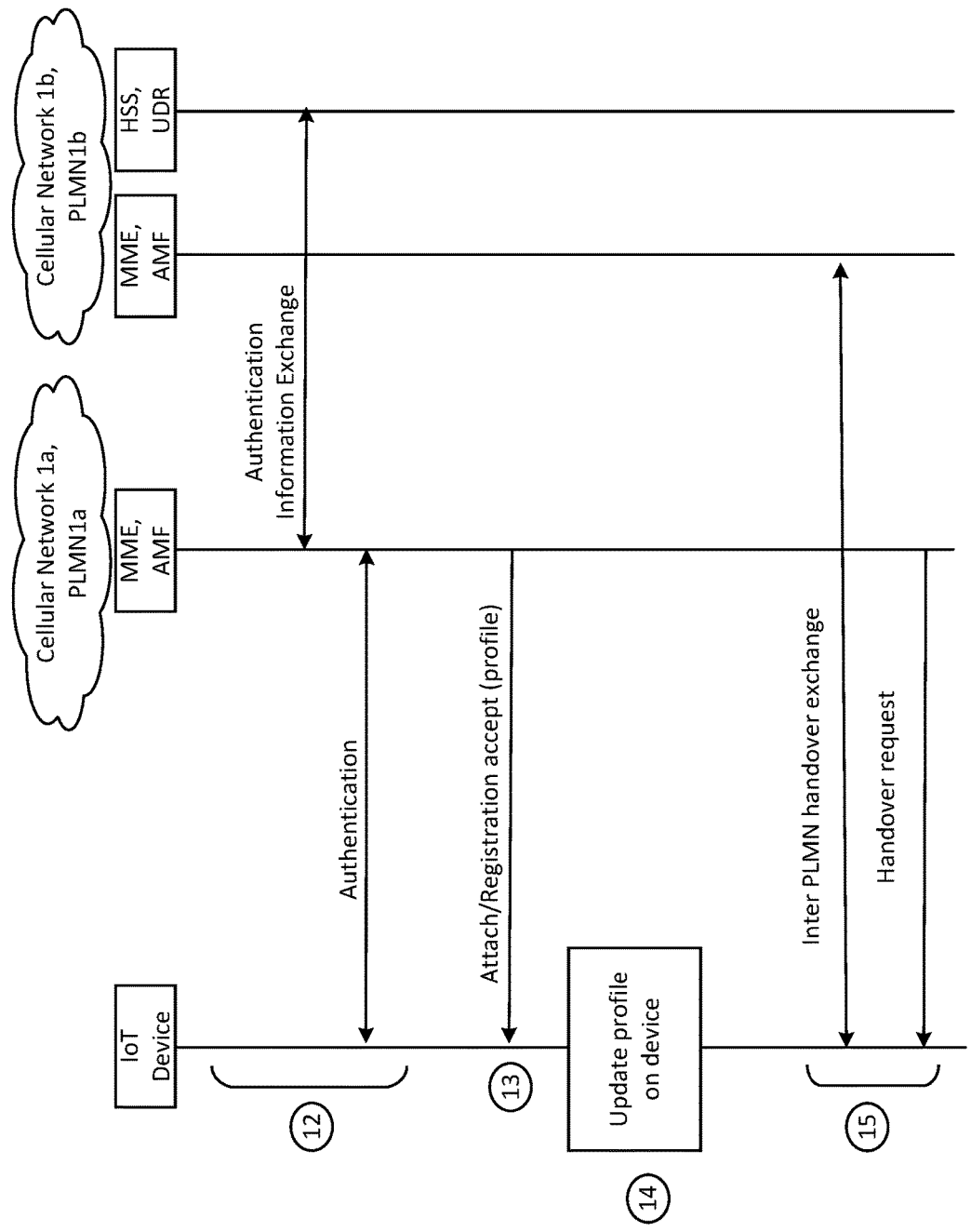

In step 12 of FIG. 22, the MME/AMF contacts CellNet1b HSS/UDR to authenticate the device. In this authentication exchange, MME/AMF will swap the PLMN ID of the IMSI so that it points to CellNet1b. The cellular operating profile may also be provided to CellNet1a.

In step 13, once authenticated, the MME/AMF issues a registration accept message. This message may include the eSIM operating profile of the device.

In step 14, the IoT device updates its profile.

In step 15, as the device is roaming, the device attempts to find a higher priority PLMN. When found, the device performs an inter-PLMN handover to connect to CellNet1b.

It may be possible that both the cellular network and/or the M2M/IoT device support one or more of these cellular on-boarding alternatives onboarding via remote SIM provisioning, registration redirection, and roaming with inter-PLMN handover.

In order to provide the M2M/IoT device an indication of the alternatives supported by a cellular network, the latter may include the information in its broadcast system information, or as part of its registration exchange with the cellular core network. The M2M/IoT device may then select from one of the supported methods. The M2M/IoT device may inform the provisioning network of the selected alternative in a flag included as part of the registration message, or some other control-plane message.

As an alternative, the M2M/IoT device may provide in the registration message a flag indicating all the alternatives it supports. The provisioning network may then determine which alternative to use for cellular on-boarding.

In some cases, M2M/IoT devices are stolen, retired, or fail. These devices are effectively decommissioned, and all core network context related to these devices (such as operator subscription profile information) should be deleted from the cellular network, and these devices should be added to the list of blacklisted devices maintained in the EIR/5G-EIR and central EIR/5G-EIR. These devices are said to be "off-boarded" from the cellular system.

Figure 23:
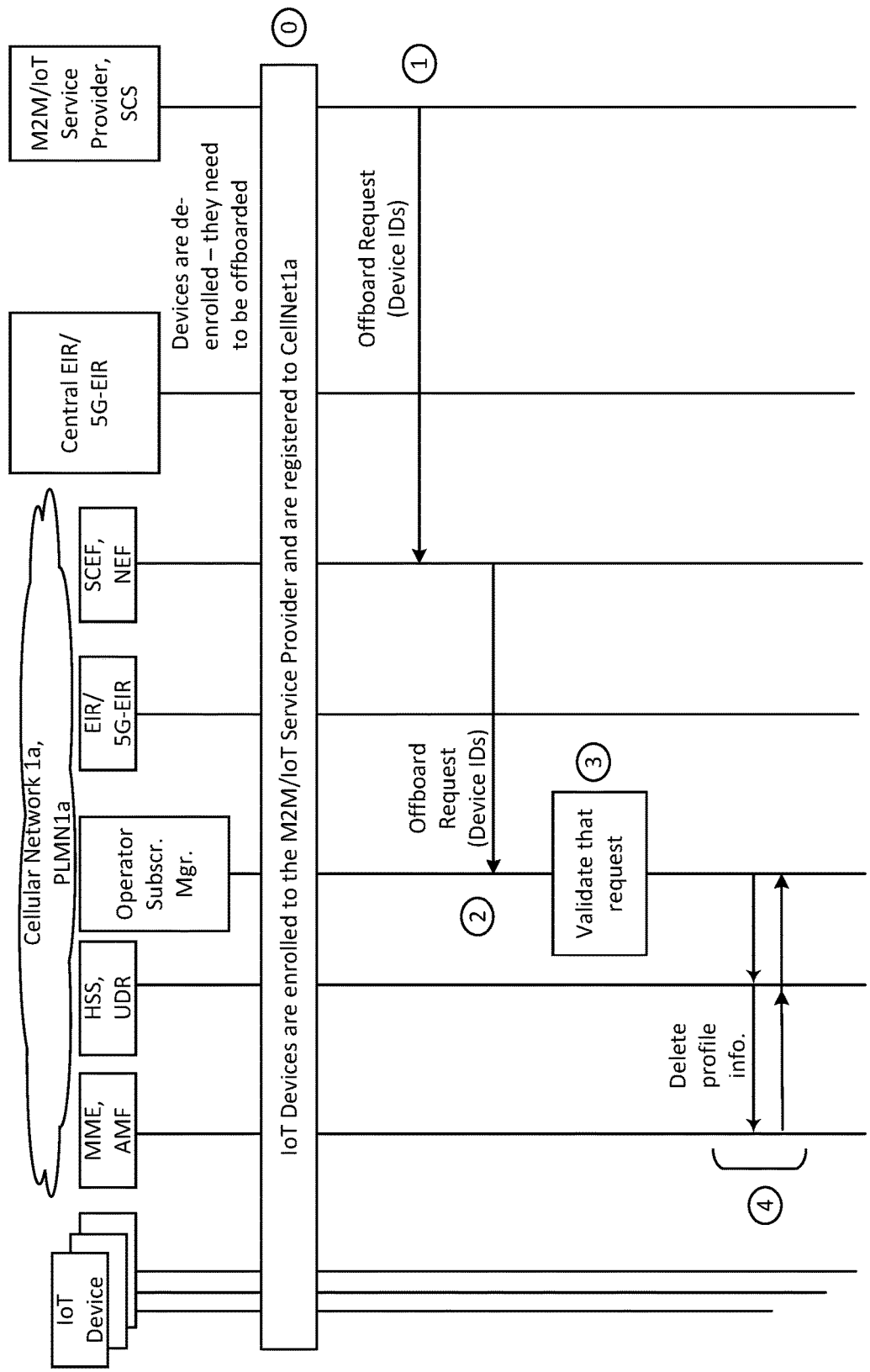
FIGS. 23 to 24 show a call flow of an example method for off-boarding devices.
Figure 24:
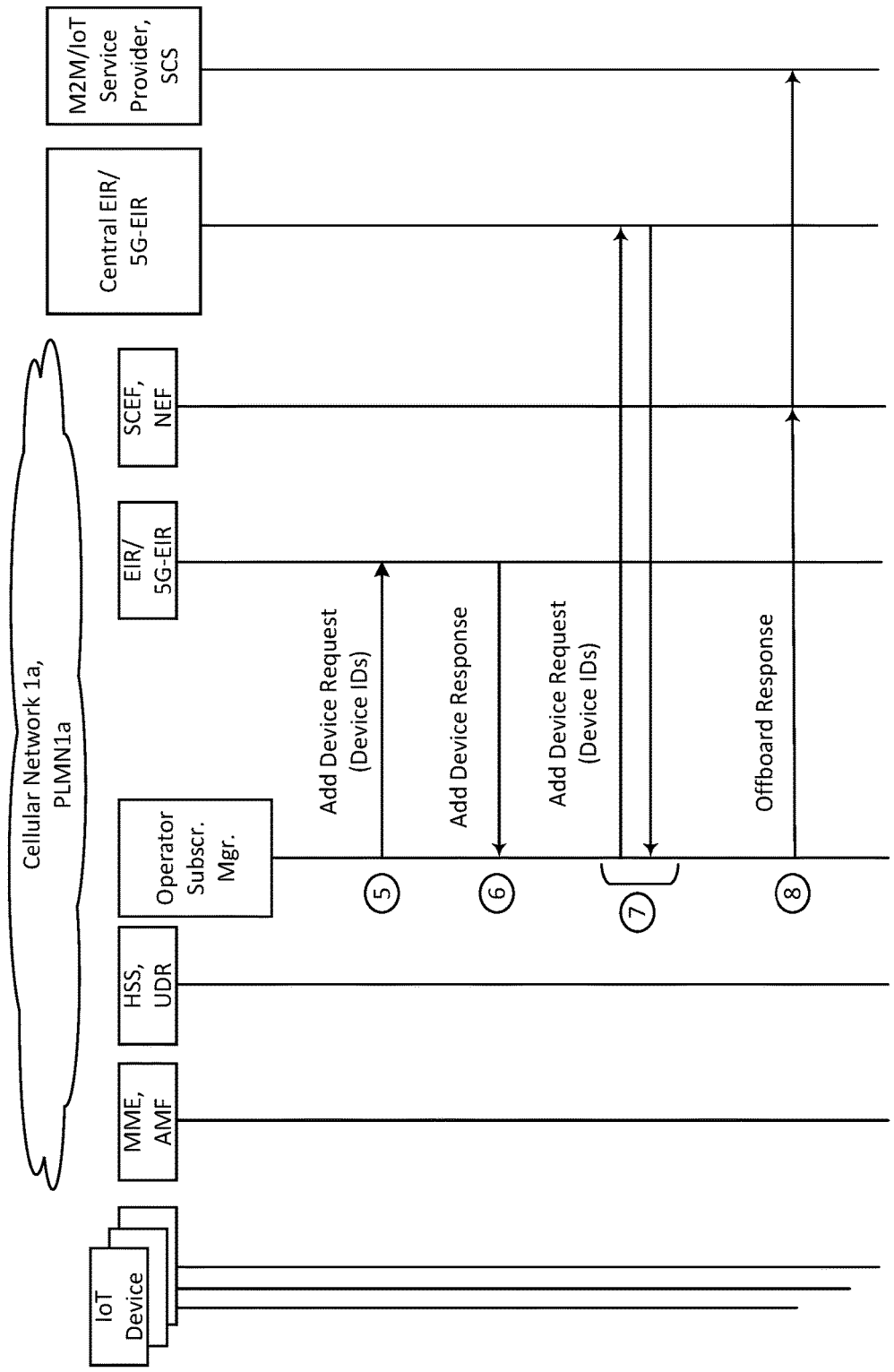

A call flow of an example procedure for off-boarding devices is shown in FIGS. 23 and 24. In this example, it is assumed that a set of devices are using cellular network CellNet1a, and that the M2M/IoT service provider would like to off-board all these devices.

The call flow of FIG. 23 begins with IoT devices enrolled to the M2M/IoT Service Provide. Device 1 is enrolled.

In step 1 of FIG. 23, based on a device de-enrollment, the M2M/IoT service provider issues an off-board request to CellNet1a. The message is directed to the SCEF/NEF of CellNet1a. The request may include information such as: a list of device identifications (e.g., PEIs/IMEIs) to be off-boarded; subscriber identification; device type; device manufacturer ID; a time window to complete the cellular off-boarding of the listed devices; External Group Identifiers to associate with the devices; and a type of off-boarding.

The subscriber identification may be a SUPI/IMSI that is associated with multiple devices or it may be a new identifier that identifies a subscriber (e.g., a person or business) that is associated with multiple SUPIs/IMSIs. Alternatively the subscriber identification could be an external identifier, which the MNO can in turn map to a SUPI/IMSI, or to some network subscriber ID.

The time window to complete the cellular off-boarding may, for example, provide that IoTProv1 may request to wait 1 hour for the devices to have their operator subscription profile deleted and their device identity stored in the EIR/5G-EIR. If a device has not been off-boarded by then, the service provider may be notified, etc.

The off-boarding request may indicate the list to which the device should be added in the EIR/5G-EIR. For example this may include: blacklisted device, failed devices, temporarily suspended devices, etc.

The request may include only the subscriber identification, in which case the request is to off-board all devices tied to the subscriber. Alternatively the request may include only the device type, in which case the request is to off-board all devices of this type. Further, alternatively the request may include only the device manufacturer ID, in which case the request is to off-board all devices from this manufacturer.

In step 2, after an authorization check to see if the M2M/IoT service provider is authorized to use the services of CellNet1a, the off-board request is forwarded to an operator subscription manager within CellNet1a.

In step 3, the operator subscription manager validates the off-board request. This validation depends on the context of the request. For example, if the request has subscription identification, the operator subscription manager checks that the M2M/IoT service provider is authorized to off-board devices to the subscriber. If the request has Device Type, the operator subscription manager checks that the M2M/IoT service provider is authorized to off-board devices of this type.

In step 4, the operator subscription manager determines the impacted operator subscription profiles. It deletes these operator subscription profiles in all impacted network entities and network functions (for example in the HSS/UDR and AuC/AUSF).

In step 5 of FIG. 24, the operator subscription manager sends an Add Device request to the EIR/5G-EIR, to add the device to one of the lists maintained by the EIR/5G-EIR. For example to the list of blacklisted devices, failed devices, temporarily suspended devices, etc.

In step 6, the EIR/5G-EIR acknowledges storing the device identification information.

In step 7, optionally, the EIR/5G-EIR in CellNet1a could share the device information with the central EIR/5G-EIR.

In step 8, the operator subscription manager issues an Off-board response to the M2M/IoT service provider, through the SCEF/NEF.

FIGS. 25 to 28 illustrate a call flow for transferring an IoT device from a first subscriber to a second subscriber, where the transfer is initiated by the enrolling with a new service provider. The procedure of FIGS. 25-28 made be applied, for example, in scenarios similar to the new homeowner use case of FIG. 8. Here, in FIGS. 25-28, it is assumed that the IoT devices are initially owned by Subscriber 1. Subscriber 1 has preferred IoT/M2M service provider IoTProv1, and has all his devices using the services of cellular network CellNet1a (e.g., PLMN1a). The call flow of FIG. 25 begins with IoT device 1 enrolled to a first the M2M/IoT service provider.

Figure 25:
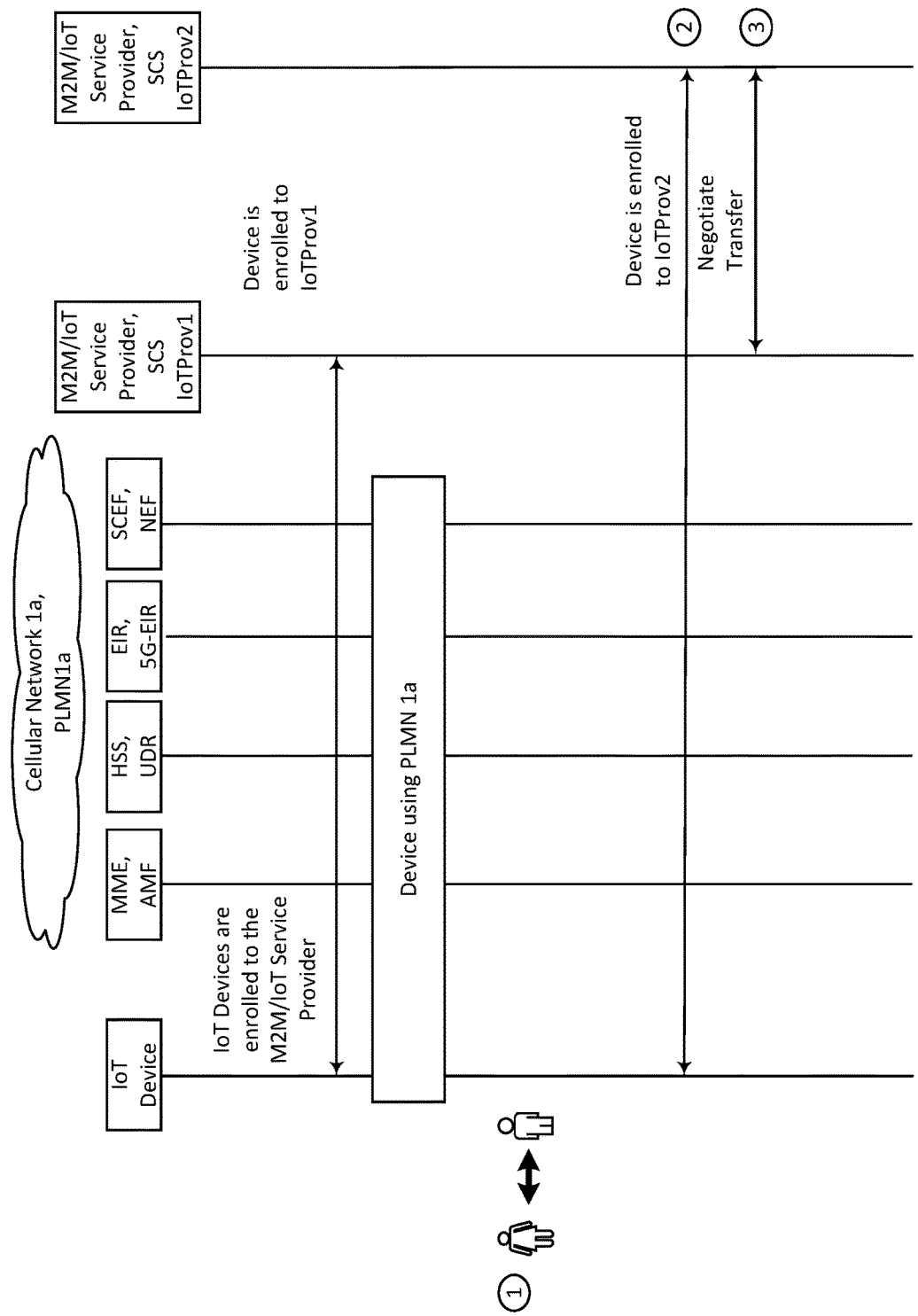
FIGS. 25 to 28 show a call flow of an example method for transferring an IoT device from one subscriber to another.

In step 1 of FIG. 25, ownership of the devices is transferred from Subscriber 1 to Subscriber 2.

In step 2, the devices are enrolled in IoT/M2M service provider IotProv2.

In step 3, the IoT/M2M service providers negotiate the transfer of the devices.

Figure 26:
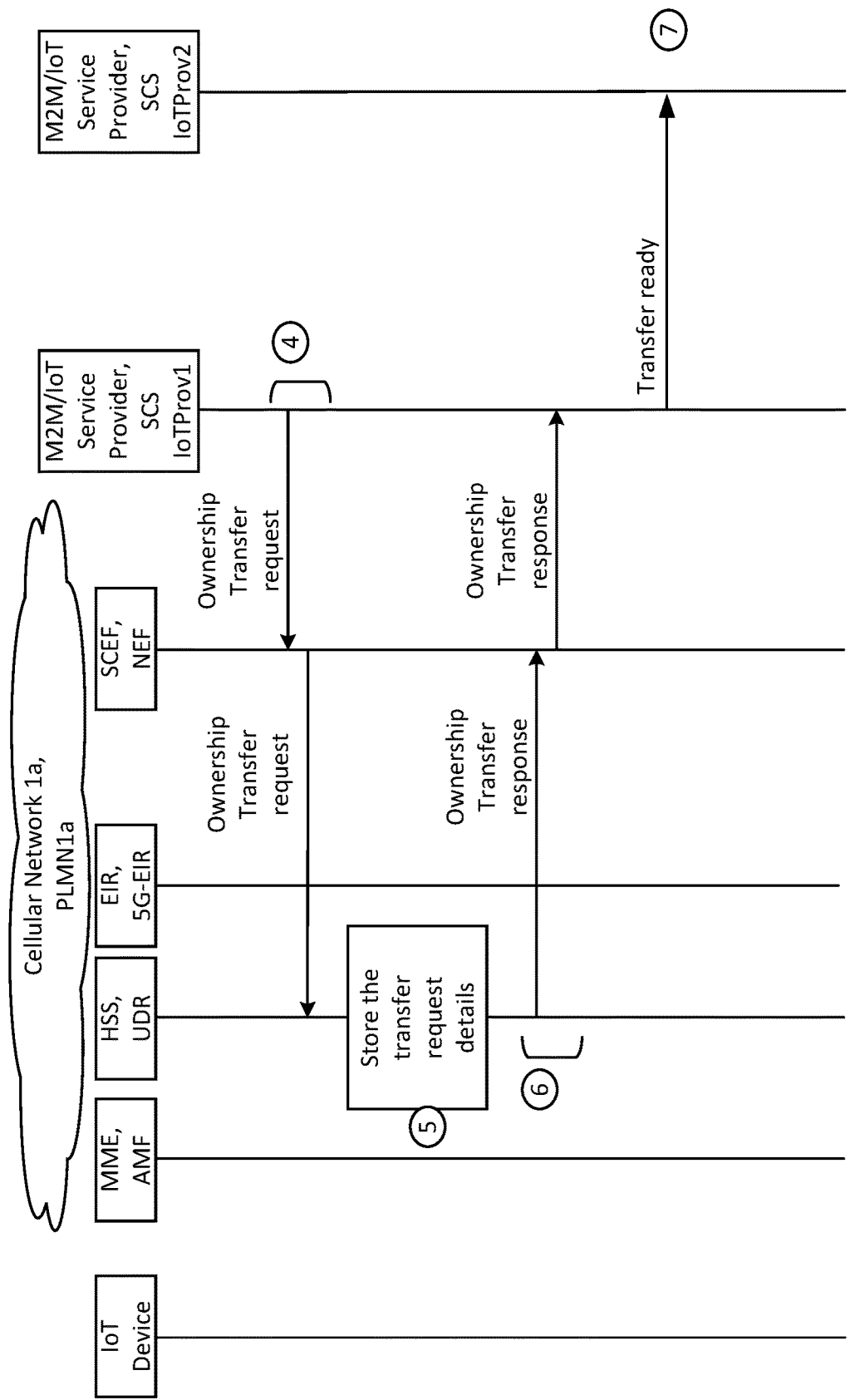

In step 4 of FIG. 26, the IoT/M2M service provider IoTProv1, informs the cellular network CellNet1a that the devices will be transferred to IoTProv2 and Cellular network CellNet1b. This may be implemented through an ownership transfer request to CellNet1a. The ownership transfer request which may include information such as: time of the transfer; the identity of the subscriber authorized to request a transfer in cellular operating profile, e.g., the identity of Subscriber 2 in the example of FIGS. 25 to 28; the M2M/IoT service provider ID, which is IoTProv2 in the current example; and the CellNet1b identity.

The CellNet1b identity is the identity of the cellular network that is allowed to request a transfer in cellular operating profile, e.g., PLMN ID of CellNet1b in the example call flow. Alternatively, this could be the identity or address of an element in CellNet1b. Such as the identity of the AMF/MME or HSS/UDR of CellNet1b.

The indication of time of the transfer may be an absolute time or a time window. If CellNet1a receives a request to transfer a cellular operating profile outside this time, the request is rejected. In addition, IoTProv1 may be notified of this failed transfer request.

In step 5, the transfer information is stored in the HSS/UDR of CellNet1a.

In step 6, the transfer request is acknowledged.

In step 7, IoTProv2 is notified that the devices are ready to be transferred.

Figure 27:
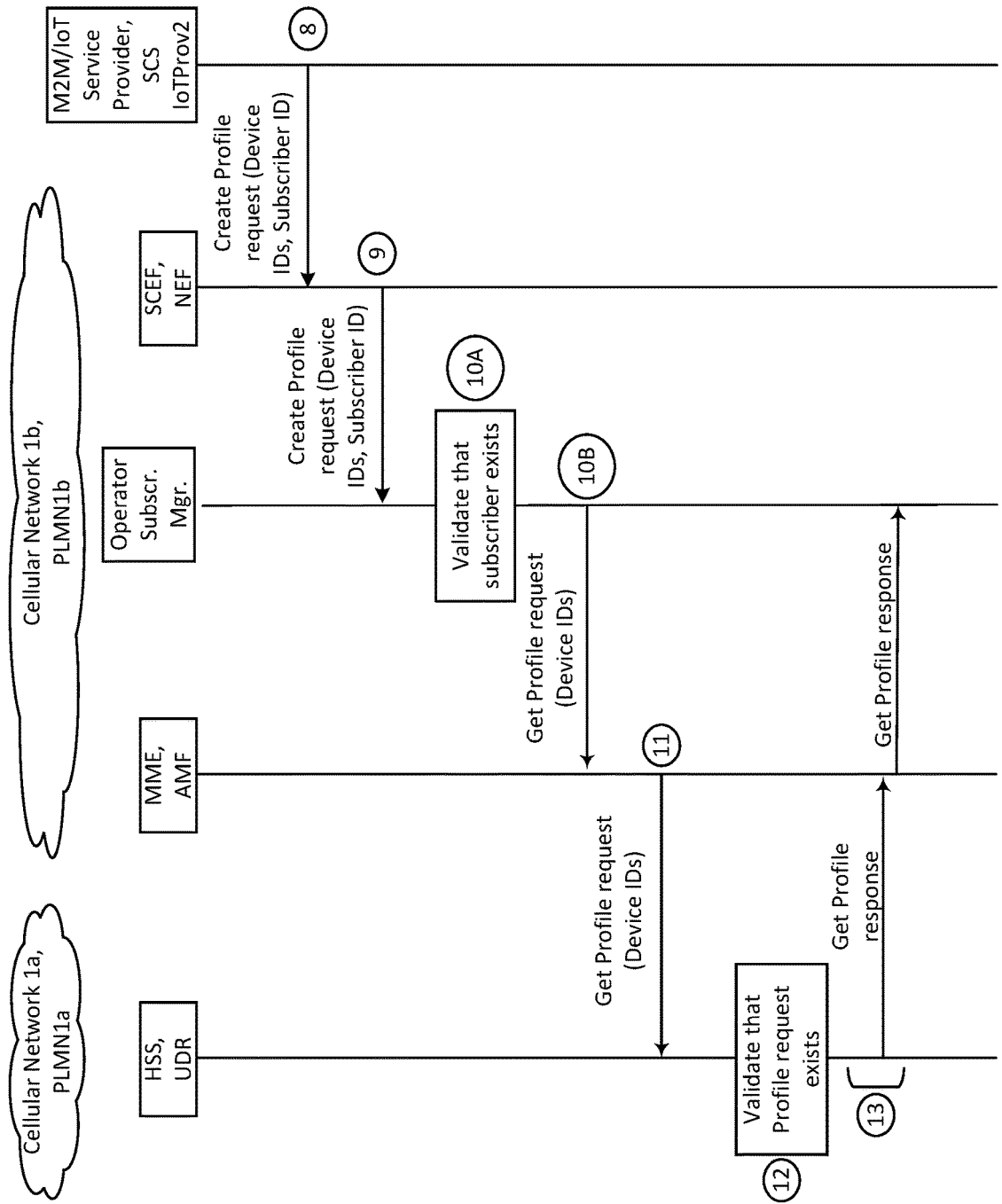

In step 8 of FIG. 27, IoTProv2 issues a Create Profile request to CellNet1b. The message is directed to the SCEF/NEF of CellNet1b. The request may include information such as: a list of device identifications to be transferred (e.g., PEI/IMEI); subscriber identification; time window to complete the cellular operating profile activation; current cellular network provider of devices (CellNet1a in example call flow); and current M2M/IoT Provider (IoTProv1 in example call flow). For example, IoTProv2 may request to wait 1 hour for the devices to have their cellular operating profile enabled. If a device has not enabled the profile by then, the profile may be deleted, the service provider may be notified, etc.

In step 9, after an authorization check, the Create Profile Request is forwarded to an operator subscription manager within CellNet1b.

In step 10A, the operator subscription manager validates that the subscriber exists and starts the process to retrieve relevant operator subscription profile information (including eSIM operating profile information) from CellNet1a.

In step 10B, the operator subscription manager issues a Get Profile Request. This request may be directed to its MME/AMF or some other network entity/function that is capable of communicating with the CellNet1a. This request may include information such as a list of device identifications and an identity of cellular network (CellNet1a) serving the devices, for example.

In step 11, the MME/AMF in CellNet1b, contacts the relevant node/nodes in CellNet1a. In the call flow shown, it is assumed that this contact is made to the HSS/UDR of CellNet1a, but alternatively it may also be the Operation Subscription Manager of CellNet1a.

As an alternative to Step 10 and 11, the Get Profile Request from the operator subscription manager of CellNet1b may be sent directly to the HSS/UDR of CellNet1a.

In step 12: HSS/UDR of CellNet1a validates the Get Profile request. It looks in the operator subscription information of the targeted devices and makes sure that the profiles can be transferred. If so, it prepares a Get Profile response that has all the operating subscription profile information that CellNet1a is willing to share with CellNet1b. The response may include information such as: a UE radio access capability; a UE network capability; UE policies that are used by the UE to comply with network operator's rules, such as streaming policies; PDN connection/PDU session information; latest UE location information; MSISDN of devices; and IP addresses of devices.

In step 13, a Get profile response is returned to operator subscription manager of CellNet1b.

Figure 28:
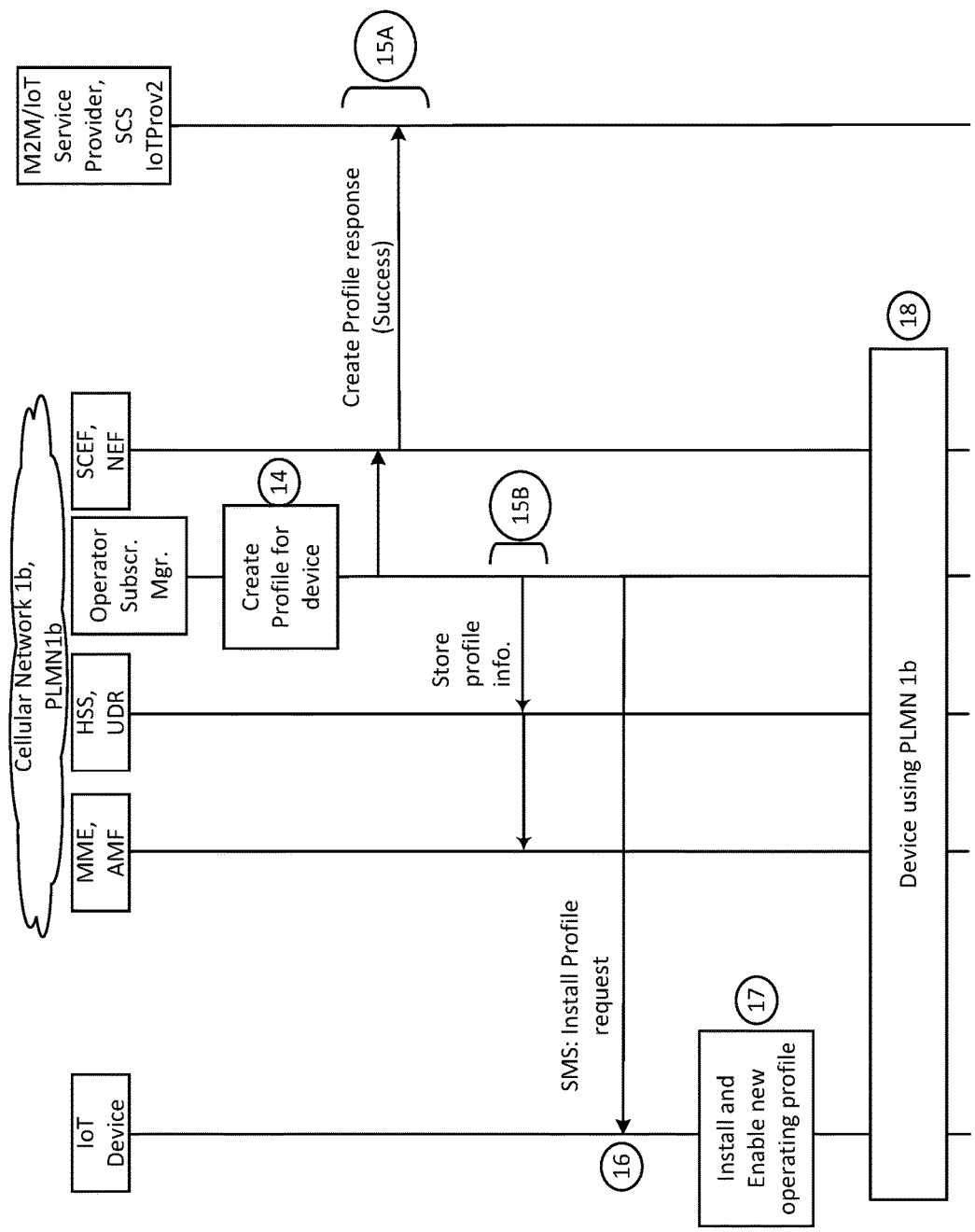

In step 14 of FIG. 28, the operator subscription manager completes the profiles. To do so, the operator subscription manager may rely on information such as a Remote SIM Provisioning system to generate some of the eSIM operating profile data, such as a new IMSI/SUPI and authentication key; an eSIM provisioning profile; and information provided from the M2M/IoT service provider provided in Step 8.

In step 15A, the operator subscription manager links the subscription profile to the correct subscriber and issues a Create Profile response to IoTProv2 to indicate if the request to create or modify a subscriber profile was successful.

In step 15B, the operator subscription manager provides the updated profile information to the HSS/UDR and AUSF/AuC. The HSS/UDR may then provide the updated information to the UE's serving node (MME or AMF).

In step 16, the operator subscription manager sends the new eSIM operating profiles to the IoT devices using an Install Profile request. This message may be sent in a number of ways. The message may be sent, as shown in FIG. 28, as an SMS message to the MSISDN retrieved in Step 12, or a user plane message to the IP address retrieved in Step 12, for example. The message may be sent using dedicated Control plane signaling between CellNet1b and CellNet1a. For example, operator subscription manager may send a message to MME/AMF of CellNet1a containing the new operating profile, and MME/AMF of CellNet1 a may send this to the device in a new or existing NAS message.

A device may need to be informed prior to Step 16 that it should enable a change in profile from CellNet1b. This may be done through control plane signaling through CellNet1 a.

In step 17, the new eSIM operating profile is installed and enabled. The IoT device deregisters from CellNet1a and re-registers to CellNet1b.

Afterward, in step 18, the device may proceed in using PLMN1b.

Figure 29:
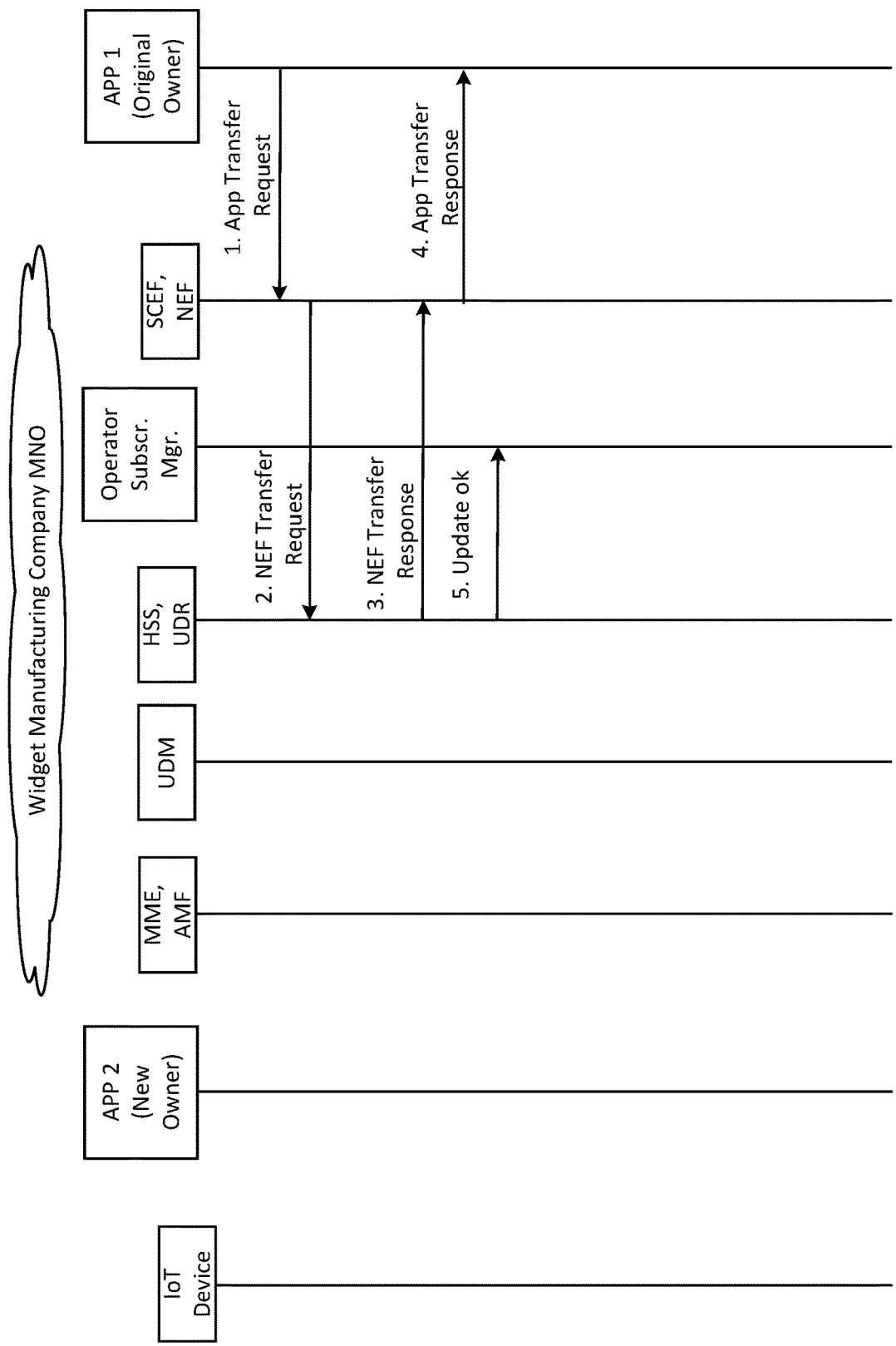
FIGS. 29 to 31 show a call flow of an example method for another method transferring an IoT device from one subscriber to another.
Figure 30:
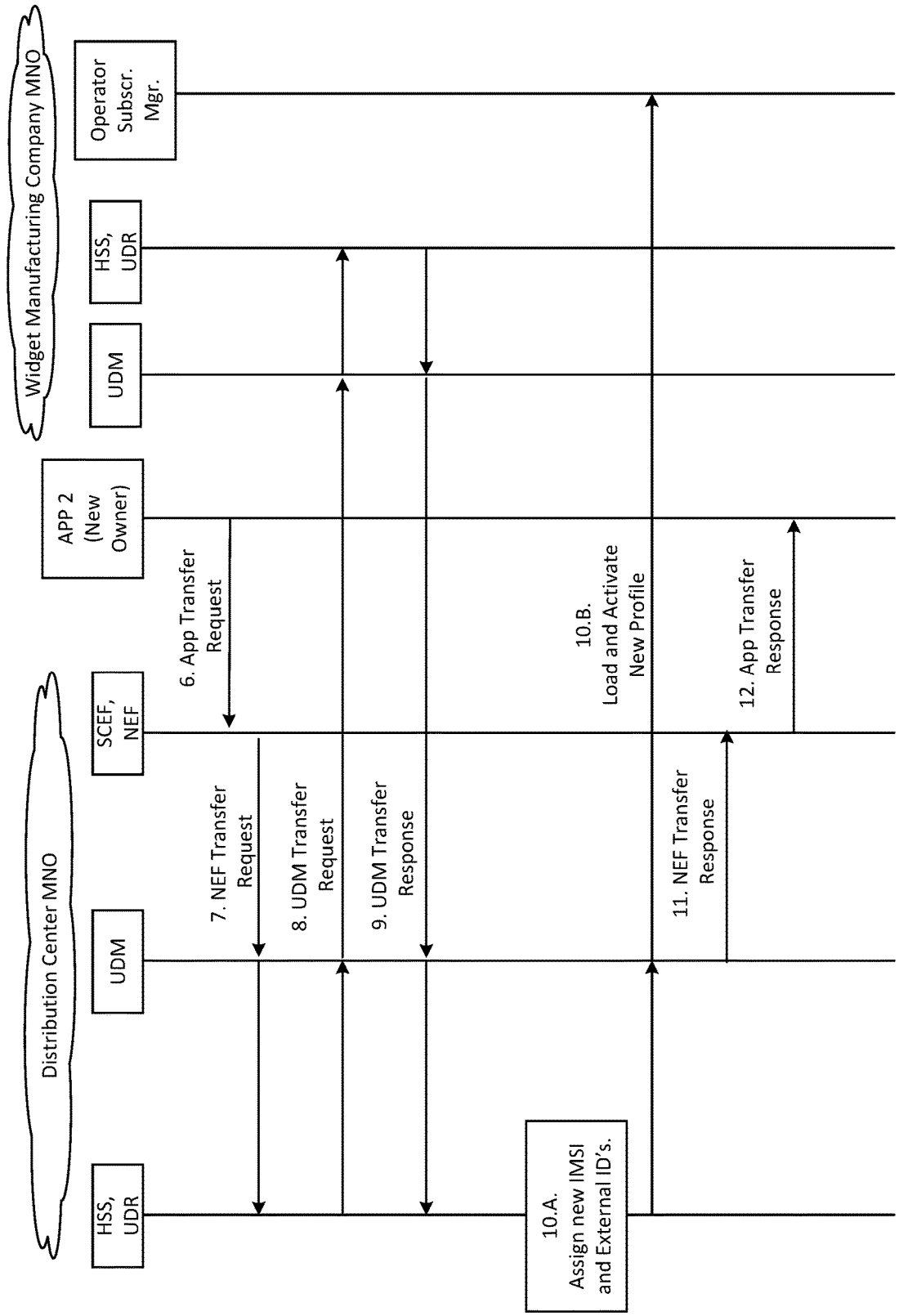
Figure 31:
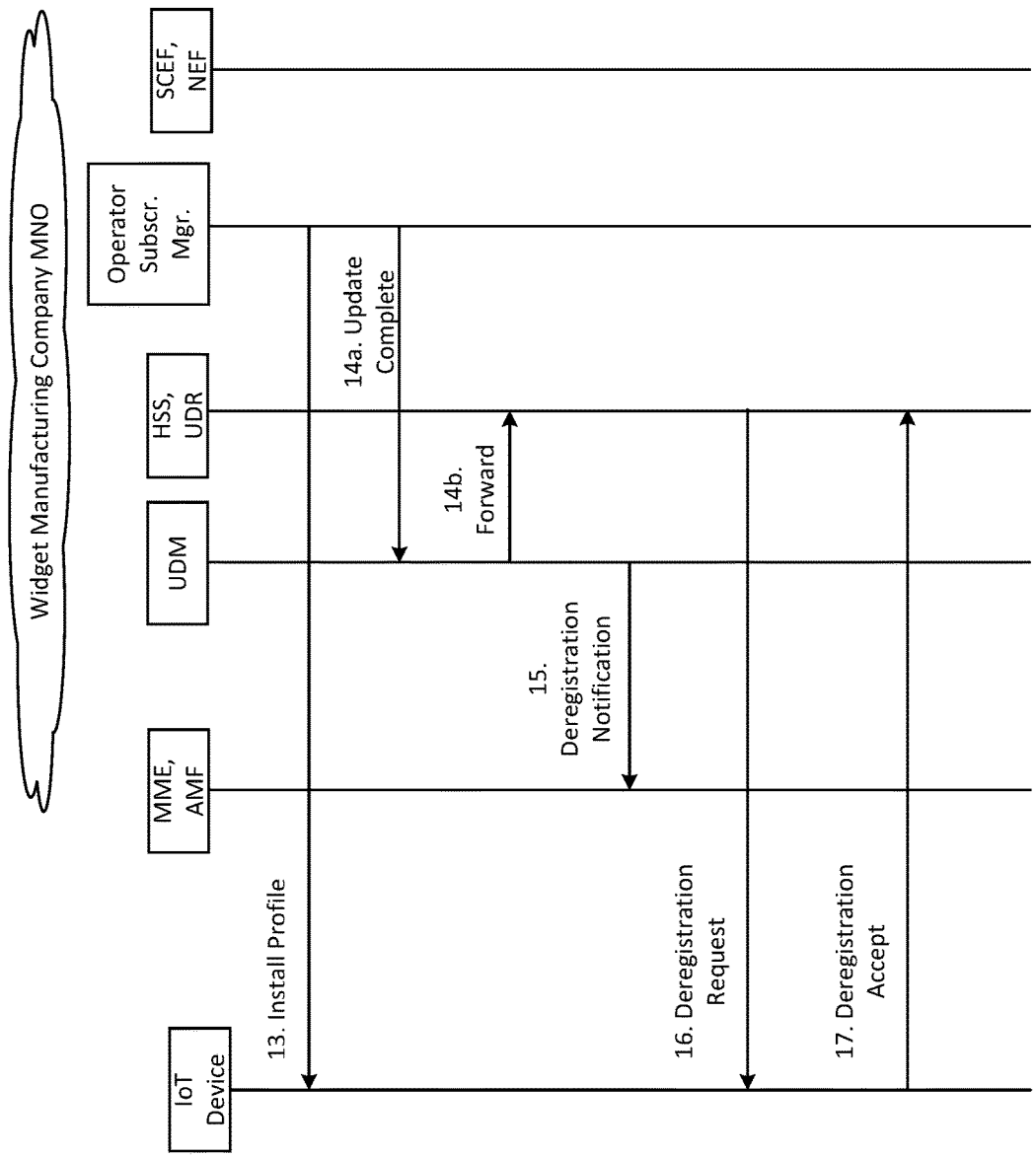

FIGS. 29-31 illustrate a second example procedure for transferring an IoT device from a first subscriber to a second subscriber. Here, in the example of FIGS. 29-31, the procedure is initiated by a request from an application.

The procedure of FIGS. 29-31 may be applied in scenarios similar to that described for the pallet delivery use case described in reference to FIG. 9. In the example FIGS. 29-31, a truck delivers a pallet of widgets to a distribution center. The pallet has an embedded tracking device that is NB-IoT based.

When the truck arrives at the distribution center, the driver uses a handheld device to scan information from the pallet or the NB-IoT device itself. An application on the handheld device uses a connection (e.g., an internet or SMS connection) to send a message to a network application indicating that the pallet has been delivered to the distribution center. Based on information in the indication, the network application will determine the External Identifier or PEI of the NB-IoT device and send a message to the MNO indicating that it would like to relinquish ownership of the device to the distribution center.

After placing the pallet on the distribution center floor, an employee of the distribution center will use a second handheld device to scan information from the pallet or the NB-IoT device itself. An application on the second handheld device uses a connection (e.g., an internet or SMS connection) to send a message to a second network application indicating that the pallet has been delivered to the distribution center. Based on information in the indication, the network application will determine the External Identifier or PEI of the NB-IoT device and send a message to a second MNO indicating that it would like to take ownership of the device.

Once the NB-IoT device is updated with a new profile, the network may command it to de-register (e.g., detach) and connect with the new profile. FIGS. 29 to 31 illustrate an example process for de-registration. Note that in our example, the distribution center and the Widget Company may use the same MNO, in which case there might be only one AMF, UDM, NEF, and UDR.

In step 1 of FIG. 29, after receiving a request from an application on the handheld device of the truck driver, the Network Application (e.g., M2M/IoT Server, SCS) of the Widget Manufacturing Company, sends a message to its MNO indicating that it would like to relinquish ownership of the UE that is attached to the pallet. This message may include information such as: an identity that is associated with the device (e.g., a PEI/IMEI, external ID, or EID); an identity that is associated with the new owner (e.g., an SCS Identifier or AF Identifier); an expiration time indicating how long this request should remain in effect; an expiration time action—indicates what to do if ownership is not transferred before the expiration time (e.g., de-register the device and disallow the device from connecting via the Widget Company's subscription, allow the device to continue connecting via the Widget Company's subscription, and/or notify the network application); and a location of the device, which may be used by the AMF to more efficiently page the device.

In step 2, the NEF stores the request and the information that was received in step 1 in the UDR.

In step 3, the UDR responds to the NEF with an indication of whether the request was accepted. The response may indicate if the UDR has already received a request from the new owner to obtain membership.

In step 4, the NEF responds to the Network Application with an indication of whether the request was accepted. The response may indicate if the UDR has already received a request from the new owner to obtain membership.

In step 5, the UDR sends an indication to the operator subscription manager indicating that the new owner is allowed to create a new profile for the device. The message may include information such as: an identity that is associated with the device (PEI/IMEI or EID or External ID); an identity that is associated with the new owner (SCS Identifier or AF Identifier); an expiration time indicating how long this permission should remain in effect; an expiration time action which indicates what to do if ownership is not transferred before the expiration time (e.g., invalidate the current profile or not).

In step 6 of FIG. 30, after receiving a request from an application on the handheld device of the distribution center employee, the Network Application (e.g., M2M/IoT Server, SCS) of the distribution center, sends a message to its MNO indicating that it would like to obtain ownership of the UE that is attached to the pallet. The message may include information such as: an identity that is associated with the device (PEI/IMEI or EID or External ID); an identity that is associated with the new owner (SCS Identifier or AF Identifier); a new external identifier; a new local identifier within a new external identifier; an expiration time indicating how long this request should remain in effect; an expiration time action which indicates what to do if ownership is not transferred before the expiration time (e.g., to cancel the request and/or notify the network application; and a location of the device, which may be used by the AMF to more efficiently page the device.

In step 7, the NEF stores the request and the information that was received in step 1 in the UDM/UDR.

In step 8, the NEF uses the PEI or External ID to determine the HPLMN currently serving the device, and sends a request to the UDM/UDR of the HPLMN requesting ownership of the device. The request may also include the current location of the UE.

In step 9, the HPLMN UDM/UDR checks the request and verifies that there is a pending notification in the UDR indicating that ownership may be granted to the requester. The UDM/UDR will then reply with an indication of whether or not ownership will be granted. If ownership will be granted, the response will include the UE's subscription information and an expiration time indicating when the UE will no longer be permitted to continue connecting with the Widget Company's subscription. The response may include the eUICC-ID of the UE's eSIM.

In step 10A, the MNO of the distribution center generates a new subscription profile, including a new SUPI and External Identifier, for the UE.

In step 10B, the MNO sends the profile to the operator subscription manager of the Widget Company's MNO. This may be handled by an appropriate entity in the distribution center MNO. For example the operator subscription manager or UDM/UDR of the distribution center MNO. The latter case is shown in example of FIG. 30. The request may include the eUICC-ID of the UE's eSIM.

In step 11, the UDM sends a response to the NEF indicating if the request has been accepted and if the new subscription profile has been sent to the operator subscription manager of the Widget Manufacturing Company MNO. The response also includes the new External Identifier.

In step 12, the NEF sends a response to the Network Application indicating if the request has been accepted and if the new subscription profile has been sent to the operator subscription manager. The response also includes the new External Identifier.

In step 13 of FIG. 31, the operator subscription manager of the Widget Manufacturing Company MNO, stores the new profile in the UE's eSIM.

In step 14*a*, the operator subscription manager sends an indication to the UDM indicating that the new profile has been stored in the UE and the that existing subscription information can be purged.

In step 14*b*, the UDM will forward this information to the UDR/HSS. Note that requests from the operator subscription manager may go directly to the UDR/HSS instead of passing through the UDM front end.

In step 15, the UDM sends a Nudm UECM Deregistration Notification message to the AMF to request that the UE be deregistered. The message indicates that the UE's subscription is no longer valid. It may indicate the UE should be asked to re-register after loading a new communication profile. The message may include the ICCID of the new profile.

In step 16, the AMF sends a deregistration request to the UE. The deregistration request may indicate that the UE's subscription is no longer valid, and that the UE should use a different profile. The request may indicate the new ICCID that the UE should use.

In step 17, the UE may respond to deregistration request. If the UE does not recognize the ICCID that was provided in step 16, it may reject to the request in order to stay connected for a longer time period so that it can obtain the profile that is associated with the ICCID.

In some use cases, for example the Smart Refrigerator Use case, an IoT device will need to dynamically change PLMN/RAT/Slice during its normal operation. However, this change is not as a result of mobility. Rather this change is to take advantage of the services offered by each of the PLMNs/RATs/slices.

This section presents a call flow that allows the M2M/IoT provider to dynamically request that a UE change its PLMN/RAT/Slice combination. It is assumed that the subscriber associated with the device has a subscription in both cellular networks (PLMNs) and would prefer PLMN/RAT/slice combination 'A' for a one set of tasks and PLMN/RAT/slice combination 'B' for a second set of tasks. For example:

PLMN/RAT/slice combination 'A', uses NB-IoT and a MIoT network slice. The subscriber would like to use this combination for normal operation, where his IoT device reports very infrequent sensor readings.

PLMN/RAT/slice combination 'B', uses 5G-NR and an enhanced mobile broadband network slice. The subscriber would like to use this combination for high-bandwidth operation, where his IoT device is used to sync with many cloud applications, display video streams, and upload video streams. During this time, the device may also perform firmware upgrades.

In the call flow, it is assumed that the device is initially connected to CellNet1a. It has am eSIM operating profile stored in the HSS/UDR of this cellular network. The call flow is shown in FIGS. 32 to 34.

Figure 32:
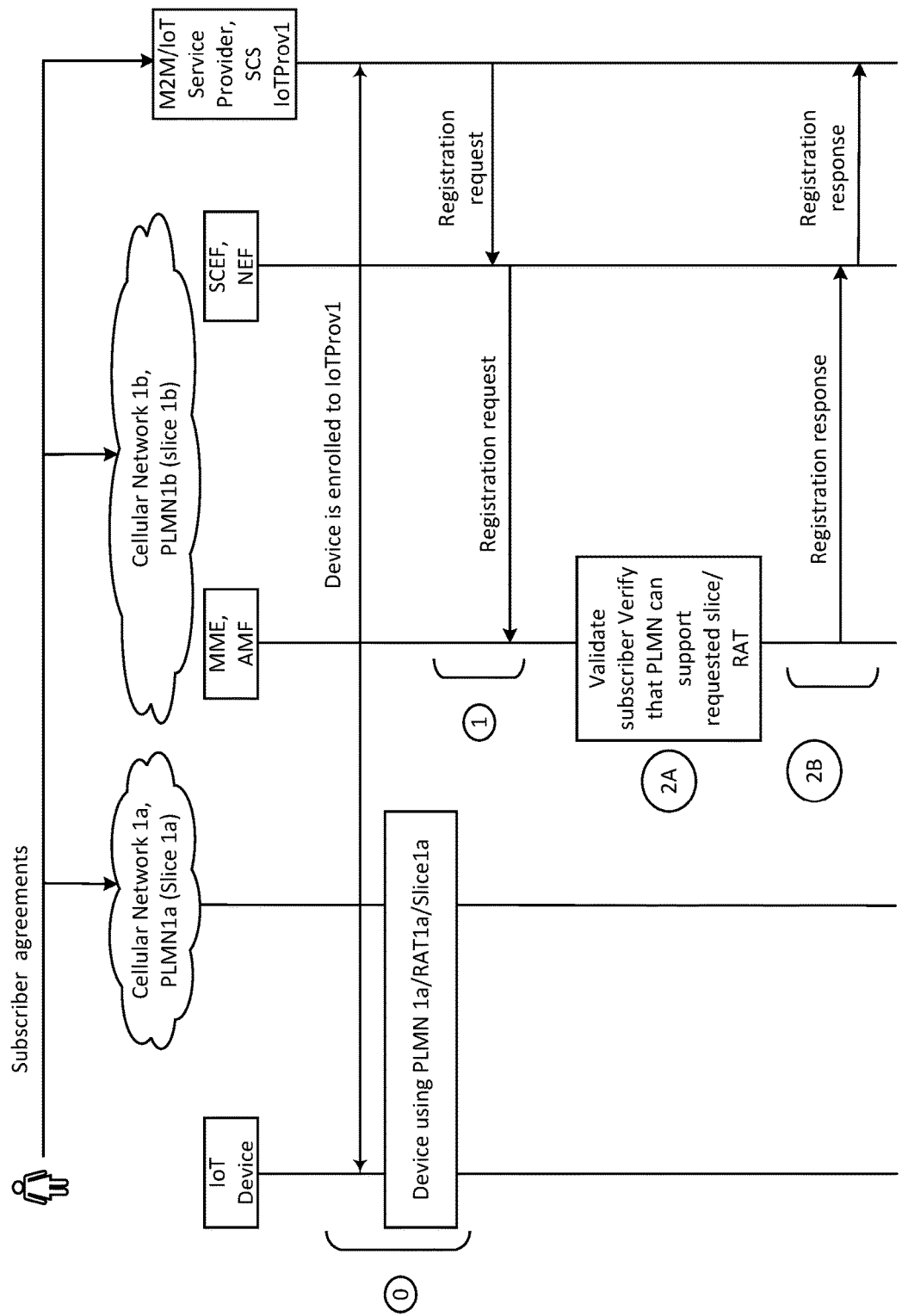
FIGS. 32 to 34 show a call flow of an example method for dynamic change in PLMN, RAT, and slice.
Figure 33:
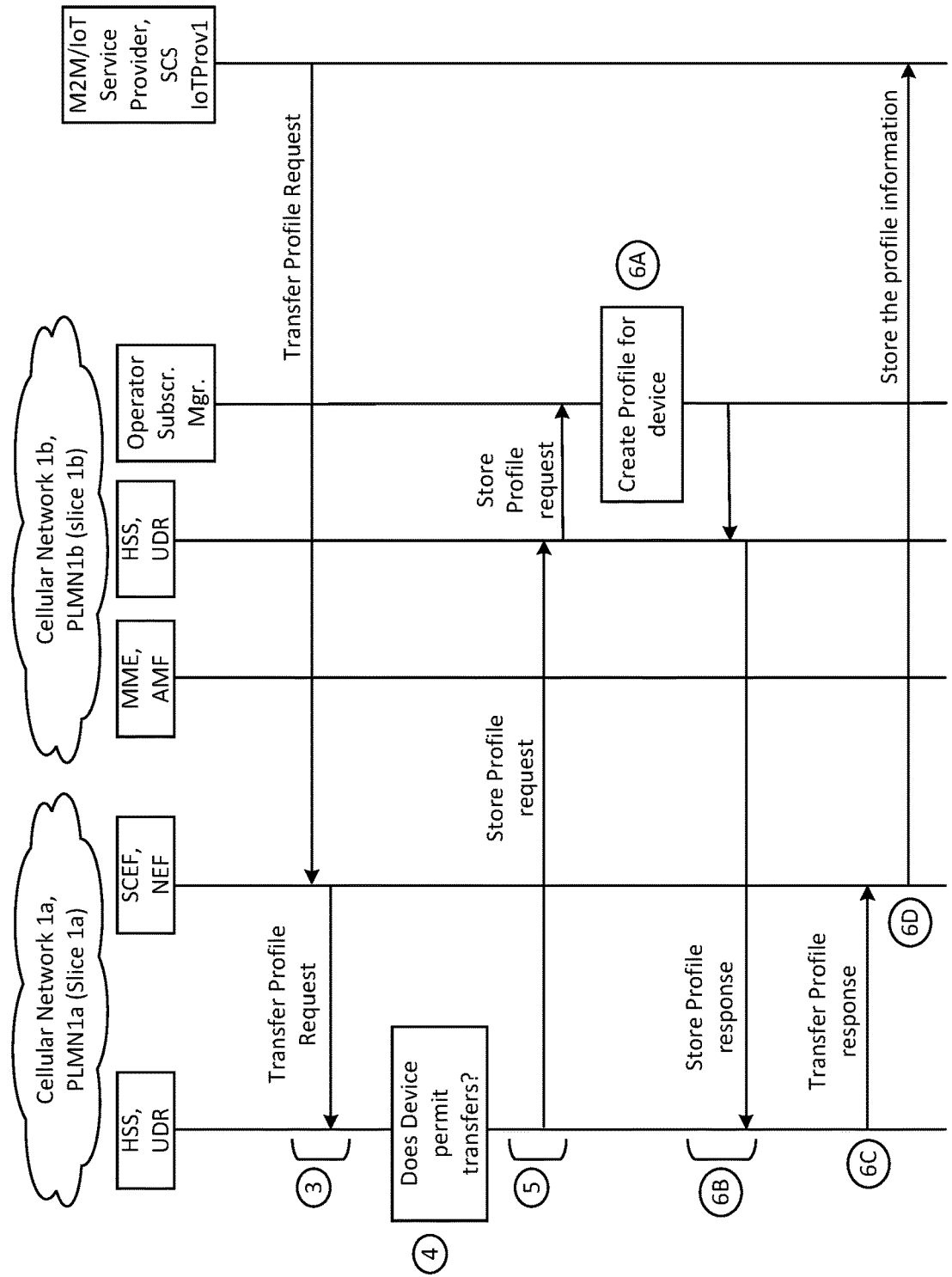
Figure 34:
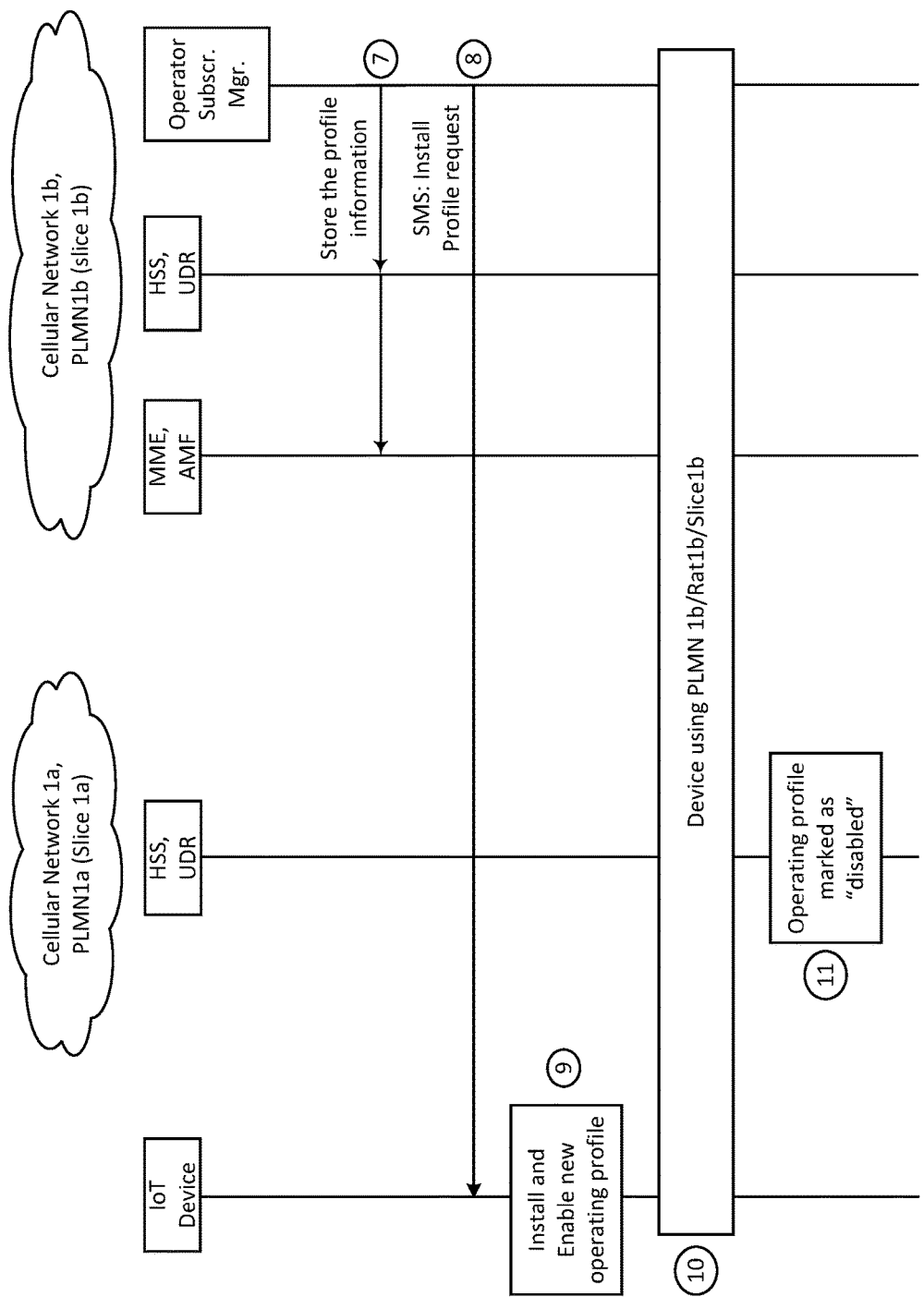

Before the call flow of FIGS. 32 to 34 begins, a subscriber has agreements with CellNet1a, CellNet1b, and IoTProv1, and an IoT device is enrolled with IoTProv1.

In step 1 of FIG. 32, IoTProv1 asks cellular network CellNet1b if it is willing to accept a new registration from device. The data exchanged may include information such as: a subscriber identity; a device identity; a requested slice (e.g., requested S-NSSAI); a requested RAT (e.g., a 5G-NR); a requested DNN; and a requested connection type (e.g., IP or non-IP).

In step 2*a*, CellNet1b validates that the subscriber is valid. It also verifies if it can support the requested slice and RAT type and DNN. If so, in step 2*b*, CellNet1b acknowledges IoTProv1. In the example of FIG. 32, the response functionality is shown at the MME/AMF.

In step 3 of FIG. 33, IoTProv1 asks CellNet1a to transfer operator subscription profile (including eSIM operating profile) to CellNet1b, using a Transfer Profile request. This request may include information such as: a list of device identifications to be transferred, e.g., the PEI/IMEI or some other device identifier; subscriber identification; absolute time or time window, at which to perform the transfer; action to perform at device de-registration. When the device being transferred de-registers, CellNet1a can "delete" the associated cellular operating profile, or it may place the profile in a "disabled" state. When the device returns to CellNet1a, an operating profile in "disabled" state does not need to be recreated—it needs only to be enabled.

The transfer profile request message of step 3 may go to the same SCEF or NEF as message 1.

In step 4, CellNet1a validates that the device permits transfer.

In step 5, CellNet1a sends the operator subscription profile (including eSIM operating profile) to CellNet1b. HSS/UDR of CellNet1a may issue a Store Profile request to HSS/UDR of CellNet1b. The message may include information such as: UE radio access capability; UE network capability; PDN connection/PDU session information; the latest UE location information; MSISDN of devices; and IP addresses of devices.

In step 6*a*, the operator subscription manager in CellNet1b completes the operator subscription profile, including an eSIM operating profile. The operator subscription manager may rely on a remote SIM provisioning system to generate some of the eSIM operating profile data, such as IMSI/SUPI and authentication key.

In step 6*b* the profile is stored in the HSS/HDR of both CellNet1b and CellNet1a.

In step 6*c*, a transfer profiled response is sent in CellNet1a from the HSS/UDR to the SCEF/NEF.

In step 6*d*, the profile is stored with IoTProv1.

In step 7 of FIG. 34, the operator subscription manager populates the necessary operator subscription profile information in the HSS/UDR and AUSF/AuC. It also links this operator subscription profile information to the correct subscriber.

In step 8, the operator subscription manager sends the new eSIM operating profiles to the IoT devices using an Install Profile request. This message may be sent, for example, using: an SMS message to the MSISDN retrieved in Step 5; a user plane message to the IP address retrieved in Step 5; or a dedicated control plane signaling between CellNet1b and CellNet1a.

The call flow of FIGS. 32 to 34 may be implemented at least in part using SMS messages, where an SMS payload may indicate that the UE should de-register and re-register. The AMF may then send a de-registration request to the UE. The de-registration request may indicate that the UE should re-register with a different PLMN, RAT type, DNN, Allowed NSSAI, or S-NSSAI. The message may provide the UE with the PLMN, RAT type, DNN, Allowed NSSAI, or S-NSSAI. The message may indicate that the cause of this is a request that was received from an NEF or AF.

In step 9, the new eSIM operating profile is installed and enabled. The IoT device deregisters from CellNet1a and re-registers to CellNet1b. Depending on the Transfer Profile request, CellNet1a may delete the eSIM operating profile, or mark this as "disabled".

Alternatively, after the NEF receives the request of step 3, the NEF could send a request to the AMF that currently serves UE indicating the UE should be asked to de-register and re-register. The AMF may then send a de-registration request to the UE. The de-registration request may indicate that the UE should re-register with a different PLMN, RAT type, DNN, Allowed NSSAI, or S-NSSAI. The message may provide the UE with the PLMN, RAT type, DNN, Allowed NSSAI, or S-NSSAI. The message may indicate that the cause of this is a request that was received from an NEF or AF.

In step 10, the IoT device may proceed using PLMN1b, Rat1b, Slice 1b, for example.

In step 11, the operating profile of the IoT device may be marked as disabled in PLMN1a.

Figure 35:
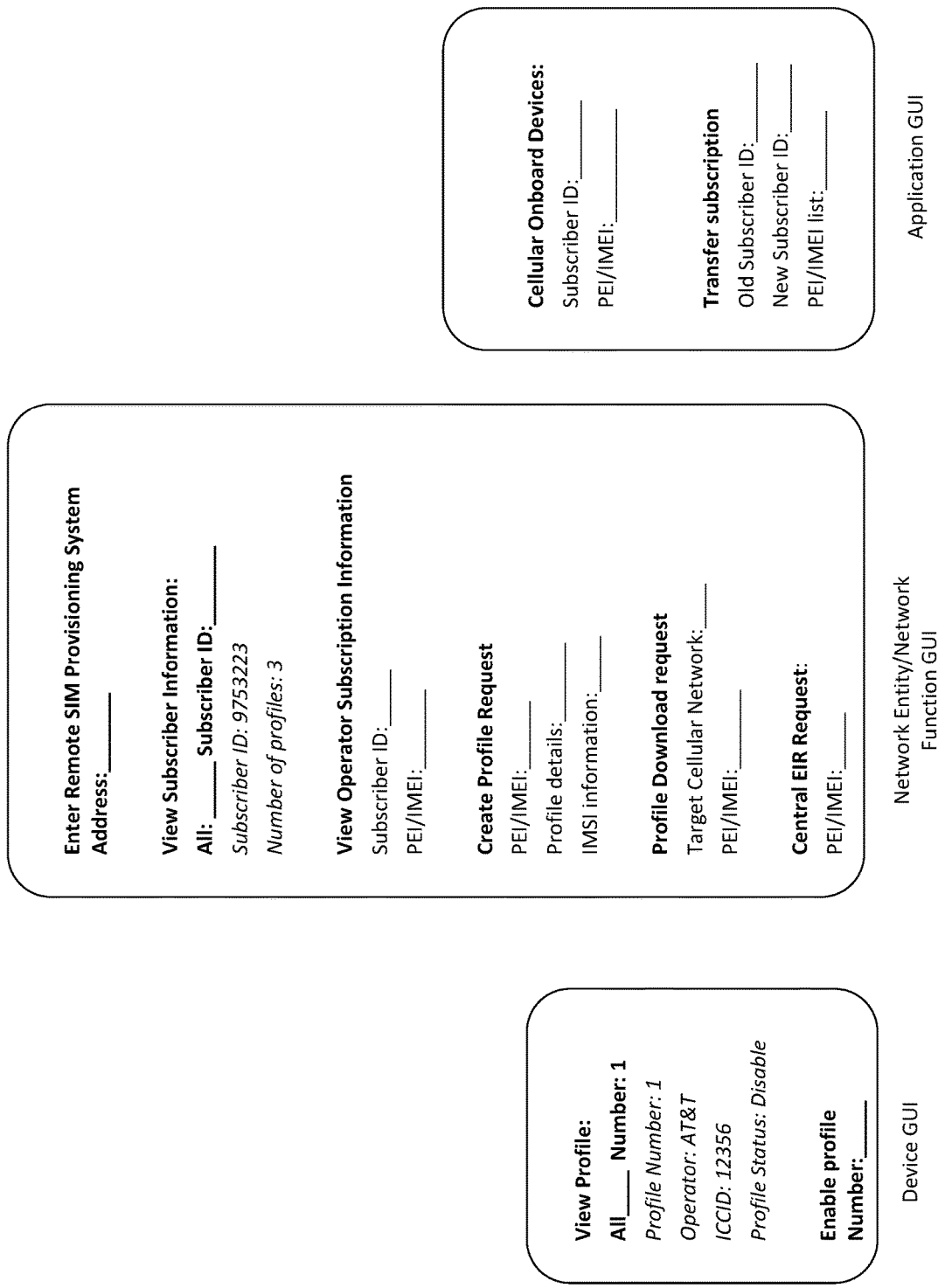
FIG. 35 illustrates example graphical user interfaces.

FIG. 35 shows an example deployment with three graphical user interfaces (GUIs) implemented within the core network, at a network application in the packet data network, and at the device. The interfaces may be used to trigger certain actions described in this document as well as view status related to the eSIM operating profiles.

At a device, such as a UE, a GUI may be used to perform a number of actions. For example, a GUI may be used on a device to view the hosted eSIM operating profiles, including information about the cellular operator of the profile, the status of the profile, the ID of the profile, etc. A GUI may also be used to manually trigger the enabling of an eSIM operating profile.

Within the core network, the GUI may be implemented in an existing network entity or network function, or as standalone network function that has access to the other network functions. The GUI may be used to perform a number of actions. For example, the GUI may be used to configure the details for the remote SIM provisioning system, such as the IP address, and to query and display subscriber information, e.g., to determine whether a subscriber exists, whether the subscriber has devices assigned to it, and which profiles are assigned to these devices. The GUI may be used to: query and display the operator subscription information for a specific device, e.g., as identified by its PEI/IMEI; to request the remote SIM provisioning profile to create eSIM operating profiles; request that a target cellular network to transfer operator subscription information for a specific device; and to request the central EIR/5G-EIR to return the cellular network that is to provide service to a device.

Similarly, at a network application, the GUI may be used to perform a number of actions, such as: requesting the cellular on-boarding of a number of devices; requesting the cellular off-boarding of a number of devices; and requesting ownership transfer of a number of devices.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

Figure 36:
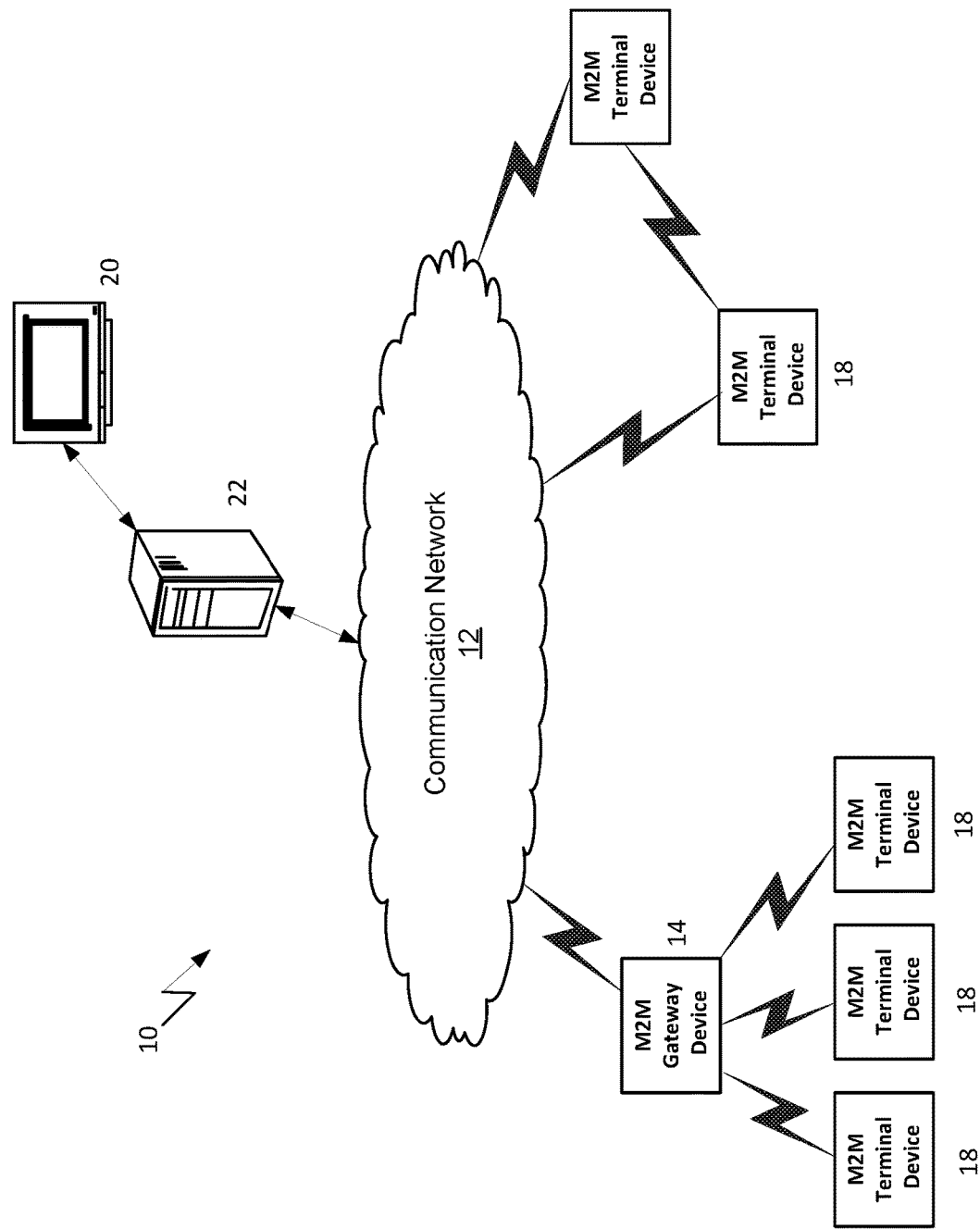
FIG. 36 is a system diagram of an example machine-to-machine (M2M), Internet of Things (IoT), or Web of Things (WoT) communication system in which one or more disclosed embodiments may be implemented.

FIG. 36 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 1-6, 8-34, and 36-39 may comprise a node of a communication system, such as the ones illustrated in FIGS. 1-5, 8-34, 36, and 37.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 36, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 36, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 37:
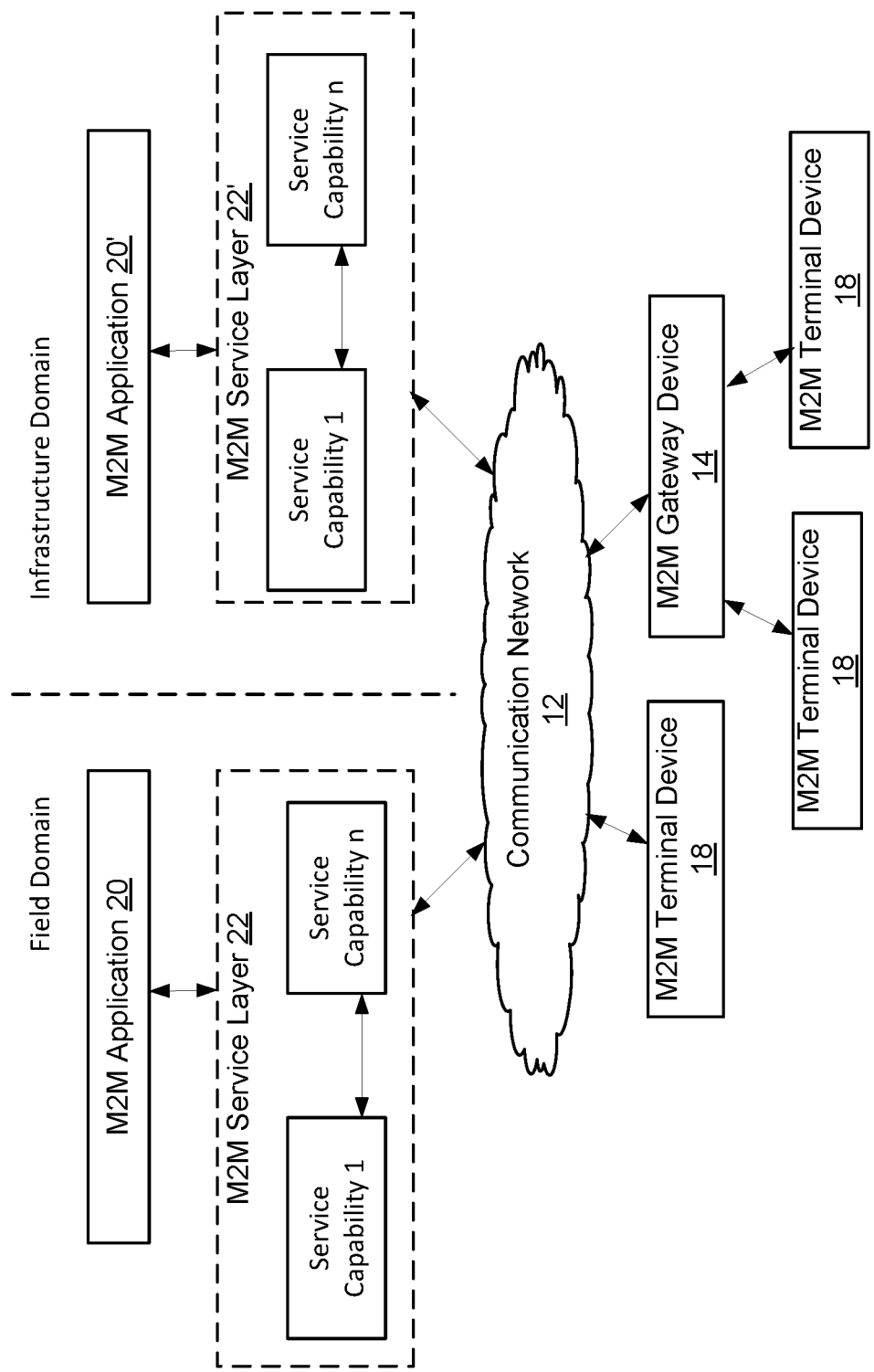
FIG. 37 is a system diagram of an example architecture that may be used within the M2M/IoT/WoT communications system illustrated in FIG. 36.

Referring to FIG. 37, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 37, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 37, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing on either one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 38 or FIG. 39 described below.

Further, the methods and functionalities described herein may be implemented as part of an M2M network that uses a Service Oriented Architecture (SOA) and/or a Resource-Oriented Architecture (ROA) to access services.

Figure 38:
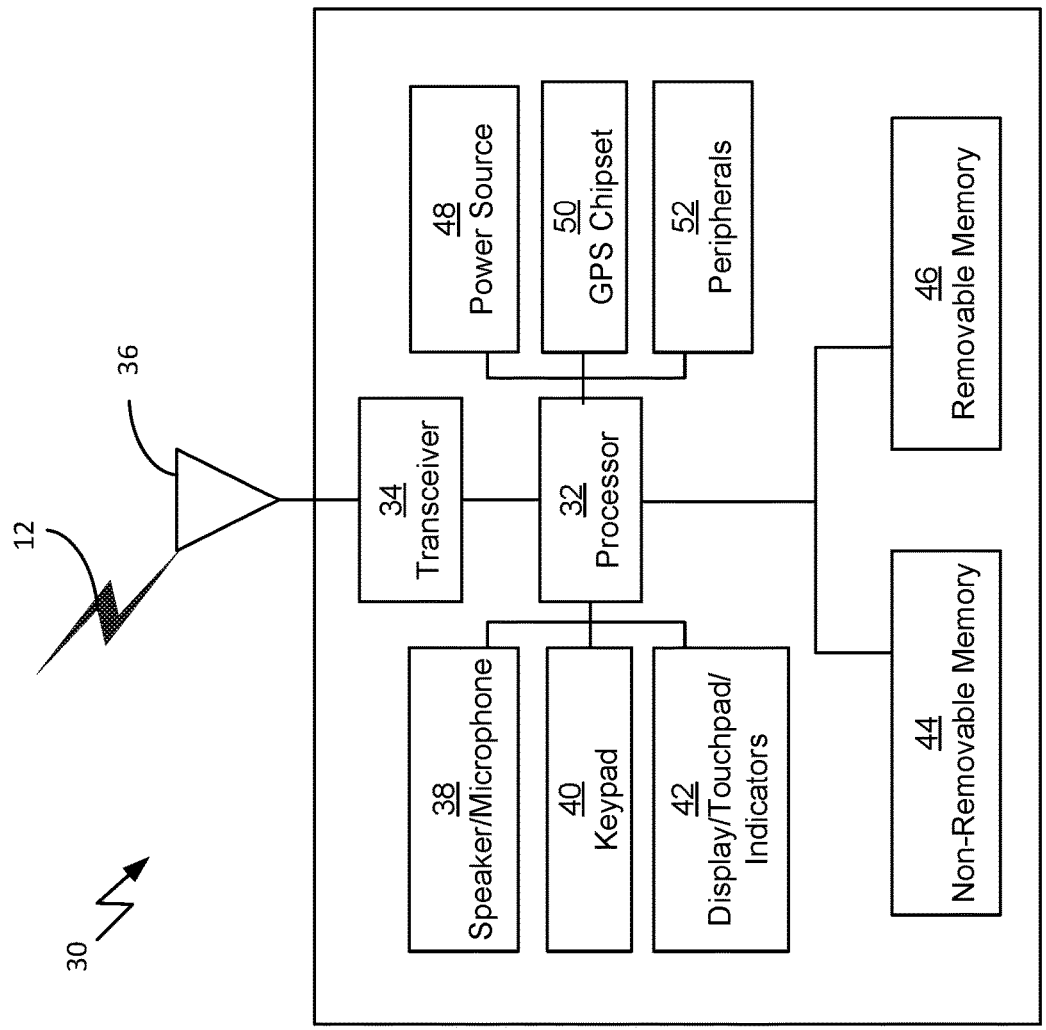
FIG. 38 is a system diagram of an example communication network node, such as an M2M/IoT/WoT device, gateway, or server that may be used within the communications system illustrated in FIGS. 36 and 37.

FIG. 38 is a block diagram of an example hardware/software architecture of a node of a network, such as one of the clients, servers, or proxies illustrated in FIGS. 1-6, 8-34, and 36-39, which may operate as an M2M server, gateway, device, or other node in an M2M network such as that illustrated in FIGS. 1-5, 8-34, 36, and 37. As shown in FIG. 38, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements methods described herein for managing device enrollment, transfers, and redirections, e.g., in relation to the methods described in reference to FIGS. 11-34 or the data structures of FIGS. 1-7, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 38, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the methods described herein for managing device enrollment, transfers, and redirections e.g., in relation to FIGS. 11-34, or in a claim. While FIG. 38 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 38 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 39:
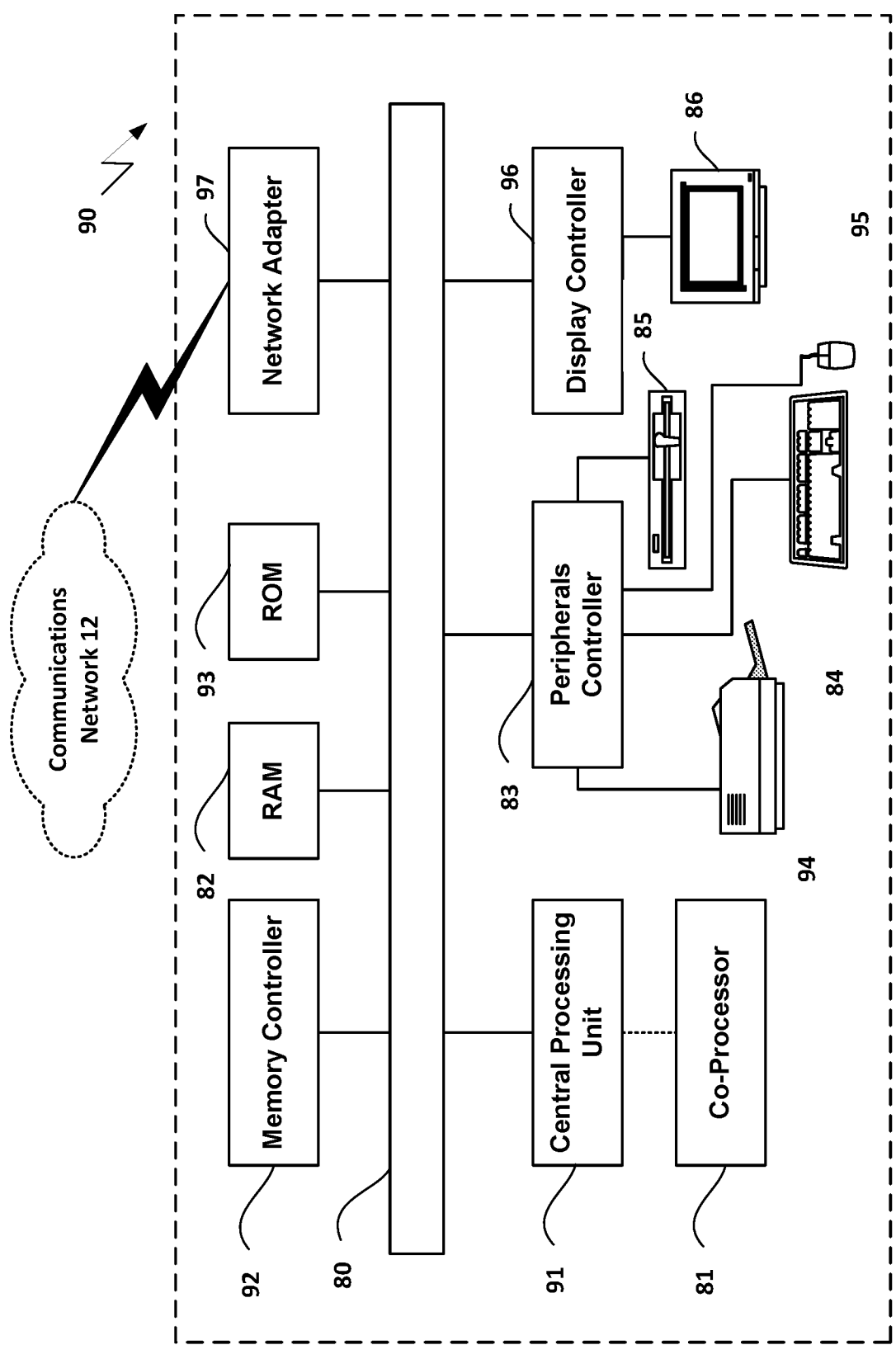
FIG. 39 is a block diagram of an example computing system in which a node of the communication system of FIGS. 36 and 37 may be embodied.

FIG. 39 is a block diagram of an exemplary computing system 90 which may also be used to implement one or more nodes of a network, such as the clients, servers, or proxies illustrated in FIGS. 1-6, 8-34, and 36-39, which may operate as an M2M server, gateway, device, or other node in an M2M network such as that illustrated in FIGS. 1-5, 8-34, 36, and 37.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 36-39, to enable the computing system 90 to communicate with other nodes of the network.

We claim:

1. A user equipment (UE), comprising a processor, a memory, and communication circuitry, the UE being connected to a network via its communication circuitry, the UE further comprising computer-executable instructions stored in the memory of the UE which, when executed by the processor of the UE, cause the UE to perform operations comprising:

receiving, from a first Public Land Mobile Network (PLMN), a first indication signifying that the first PLMN supports PLMN retargeting at a subscriber registration process, the first indication pertaining to one or more Internet-of Things (IoT) and/or enhanced Mobile Broadband (eMBB) services available on a second PLMN that are not available on the first PLMN;

sending, to the first PLMN and in response to the first indication, a first registration request to initiate the subscriber registration process, wherein the first registration request comprises a second indication signifying that public land mobile network retargeting is requested;

receiving, from the first PLMN and in response to the first registration request, a registration reject message comprising an identification of the second PLMN and an updated subscription profile including an updated Subscriber Permanent Identity (SUPI) value;

sending a second registration request to the second PLMN, wherein the second registration request comprises the updated SUPI value;

receiving, from the second PLMN, a registration accept message comprising a cellular operating profile; and using, via the registration to the second PLMN, the one or more Internet-of Things (IoT) and/or enhanced Mobile Broadband (eMBB) services available on the second PLMN.

2. The UE of claim 1, wherein the operations further comprise searching for a cell that matches the identification of the second PLMN.

* * * * *